US012694209B2

(12) United States Patent　　　　(10) Patent No.:　US 12,694,209 B2
Pan et al.　　　　　　　　　　　　　(45) Date of Patent:　Jul. 28, 2026

(54) DETECTING UNRELATED UTTERANCES IN A CHATBOT SYSTEM

(71) Applicant: Oracle International Corporation, Redwood Shores, CA (US)

(72) Inventors: Crystal C. Pan, Palo Alto, CA (US); Guatam Singaraju, Dublin, CA (US); Vishal Vishnoi, Redwood City, CA (US); Srinivasa Phani Kumar Gadde, Belmont, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 18/428,817

(22) Filed: Jan. 31, 2024

(65) Prior Publication Data

US 2024/0169153 A1　　May 23, 2024

Related U.S. Application Data

(63) Continuation of application No. 17/017,076, filed on Sep. 10, 2020, now Pat. No. 11,928,430.
(Continued)

(51) Int. Cl.
*G06F 40/284*　　　(2020.01)
*G06F 18/23213*　　(2023.01)
(Continued)

(52) U.S. Cl.
CPC ...... *G06F 40/284* (2020.01); *G06F 18/23213* (2023.01); *G06F 18/24* (2023.01);
(Continued)

(58) Field of Classification Search
CPC ...... G06F 40/284; G06F 40/35; G06F 40/216; G06F 18/24; G06F 18/23213; G06N 20/00; H04L 51/02
See application file for complete search history.

(56) References Cited

U.S. PATENT DOCUMENTS

| | | | |
|---|---|---|---|
| 5,692,100 A | 11/1997 | Tsuboka et al. | |
| 6,393,460 B1 * | 5/2002 | Gruen ................ | H04L 12/1827 |
| | | | 709/204 |

(Continued)

FOREIGN PATENT DOCUMENTS

| | | |
|---|---|---|
| CA | 2068041 A1 | 1/1993 |
| CN | 106062871 A | 10/2016 |

(Continued)

OTHER PUBLICATIONS

Guo, Shang, et al. "Conversational bootstrapping and other tricks of a concierge robot." Proceedings of the 2017 ACM/IEEE international conference on human-robot interaction. (Year: 2017).*
(Continued)

*Primary Examiner* — Shahid K Khan
(74) *Attorney, Agent, or Firm* — Kilpatrick Townsend & Stockton LLP

(57) ABSTRACT

Techniques are described to determine whether an input utterance is unrelated to a set of skill bots associated with a master bot. In some embodiments, a system described herein includes a training system and a master bot. The training system trains a classifier of the master bot. The training includes accessing training utterances associated with the skill bots and generating training feature vectors from the training utterances. The training further includes generating multiple set representations of the training feature vectors, where each set representation corresponds to a subset of the training feature vectors, and configuring the classifier with the set representations. The master bot accesses an input utterance and generates an input feature vector. The master bot uses the classifier to compare the input feature vector to the multiple set representations so as to determine whether the input feature falls outside and, thus, cannot be handled by the skill bots.

20 Claims, 26 Drawing Sheets

Related U.S. Application Data

(60) Provisional application No. 62/899,700, filed on Sep. 12, 2019.

(51) Int. Cl.

| | |
|---|---|
| *G06F 18/24* | (2023.01) |
| *G06F 40/216* | (2020.01) |
| *G06F 40/35* | (2020.01) |
| *G06N 20/00* | (2019.01) |
| *H04L 51/02* | (2022.01) |

(52) U.S. Cl.
CPC ............ *G06F 40/216* (2020.01); *G06F 40/35* (2020.01); *G06N 20/00* (2019.01); *H04L 51/02* (2013.01)

(56) References Cited

U.S. PATENT DOCUMENTS

| | | | | |
|---|---|---|---|---|
| 7,970,766 | B1* | 6/2011 | Shamsi | G06N 20/00 707/803 |
| 10,616,148 | B2 | 4/2020 | Akbulut et al. | |
| 10,715,470 | B1 | 7/2020 | Rolia et al. | |
| 10,726,830 | B1 | 7/2020 | Mandal et al. | |
| 10,812,424 | B1 | 10/2020 | Bommaraju et al. | |
| 11,004,454 | B1 | 5/2021 | Srinivasan et al. | |
| 11,151,988 | B1 | 10/2021 | Yavagal et al. | |
| 2002/0188681 | A1 | 12/2002 | Gruen et al. | |
| 2005/0044487 | A1 | 2/2005 | Bellegarda et al. | |
| 2005/0131932 | A1 | 6/2005 | Weare | |
| 2005/0182625 | A1 | 8/2005 | Azara et al. | |
| 2013/0325759 | A1 | 12/2013 | Rachevsky et al. | |
| 2014/0288917 | A1* | 9/2014 | Orsini | G06Q 30/0201 704/2 |
| 2015/0317383 | A1 | 11/2015 | Alkov et al. | |
| 2017/0180284 | A1 | 6/2017 | Smullen et al. | |
| 2018/0025069 | A1 | 1/2018 | Kataria | |
| 2018/0114313 | A1 | 4/2018 | Feng et al. | |
| 2018/0181558 | A1* | 6/2018 | Emery | H04L 51/02 |
| 2018/0247648 | A1 | 8/2018 | Nadimpalli et al. | |
| 2018/0331839 | A1 | 11/2018 | Gao et al. | |
| 2019/0108836 | A1 | 4/2019 | Kato et al. | |
| 2019/0266287 | A1 | 8/2019 | Chen et al. | |
| 2019/0327103 | A1 | 10/2019 | Niekrasz | |
| 2019/0362712 | A1 | 11/2019 | Karpukhin | |
| 2019/0392826 | A1 | 12/2019 | Lee et al. | |
| 2020/0042613 | A1* | 2/2020 | Jiang | G06N 3/0455 |
| 2020/0126533 | A1 | 4/2020 | Doyle et al. | |
| 2020/0185102 | A1 | 6/2020 | Leventhal et al. | |
| 2020/0259891 | A1* | 8/2020 | Abraham | H04L 67/1008 |
| 2020/0336802 | A1* | 10/2020 | Russell | H04N 21/26603 |
| 2020/0395008 | A1 | 12/2020 | Cohen et al. | |
| 2021/0083994 | A1 | 3/2021 | Pan et al. | |
| 2021/0280185 | A1 | 9/2021 | Tan et al. | |
| 2021/0311973 | A1 | 10/2021 | Radhakrishnan et al. | |
| 2022/0164542 | A1 | 5/2022 | Silverstein et al. | |

FOREIGN PATENT DOCUMENTS

| | | | |
|---|---|---|---|
| CN | 107766559 | A | 3/2018 |
| CN | 108829818 | A | 11/2018 |
| CN | 108960402 | A | 12/2018 |
| JP | 2000347685 | A | 12/2000 |
| JP | 2005164836 | A | 6/2005 |
| JP | 2006039575 | A | 2/2006 |
| JP | 2017534941 | A | 11/2017 |
| JP | 2019070957 | A | 5/2019 |
| JP | 6555838 | B1 | 7/2019 |
| KR | 20190058256 | A | 5/2019 |
| WO | 2018061774 | A1 | 4/2018 |

OTHER PUBLICATIONS

Worswick, Steve, Dealing with Off Topic Input (Sep. 5, 2019) (available at https://medium.com/pandorabots-blog/dealing-with-off-topic-input-3857af3e5024) (Year: 2019).*

Xu, Lin, et al. "End-to-end knowledge-routed relational dialogue system for automatic diagnosis." Proceedings of the AAAI conference on artificial intelligence. vol. 33. No. 01. 2019 (Year: 2019).*

U.S. Appl. No. 17/017,076 , First Action Interview Office Action Summary, Mailed on Oct. 18, 2023, 33 pages.

U.S. Appl. No. 17/017,076 , First Action Interview Pilot Program Pre-Interview Communication, Mailed on Sep. 25, 2023, 33 pages.

U.S. Appl. No. 17/017,076 , Notice of Allowance, Mailed on Dec. 28, 2023, 10 pages.

European Application No. EP20797238.1 , Office Action, Mailed on Jun. 22, 2023, 6 pages.

Gowda et al., "Semi-Supervised Text Categorization Using Recursive K-means Clustering", Communications in Computer and Information Science, vol. 709, 2017, 10 pages.

Kim et al., "Joint Learning of Domain Classification and Out-of-Domain Detection with Dynamic Class Weighting for Satisficing False Acceptance Rates", Available Online at :https://arxiv.org/pdf/1807.00072.pdf, Jun. 29, 2018, 5 pages.

Li et al., "Distributed Open-Domain Conversational Understanding Framework With Domain Independent Extractors", IEEE Spoken Language Technology Workshop, Dec. 7, 2014, pp. 566-571.

Nakano et al., "A Two-Stage Domain Selection Framework for Extensible Multi-Domain Spoken Dialogue Systems", Proceedings of the Sigdial 2011: The 12th Annual Meeting of the Special Interest Group on Discourse and Dialogue, 2011, pp. 18-29.

International Application No. PCT/US2020/050429 , International Preliminary Report on Patentability, Mailed on Mar. 24, 2022, 15 pages.

International Application No. PCT/US2020/050429 , International Search Report and Written Opinion, Mailed on Jan. 20, 2021, 20 pages.

Singaraju "Introduction to Embedding in Natural Language Processing", Oracle AI & Data Science Blog, Available Online at: https://blogs.oracle.com/datascience/introduction-to-embedding-in-natural-language-processing, Jan. 31, 2019, 8 pages.

Stockl , "Classification of Chatbot Inputs", Available Online at https://www.researchgate.net/profile/Andreas-Stoeckl/publication/318661551_Classification_of_Chatbot_Inputs/links/597642e8a6fdcc8348aa52e4/Classification-of-Chatbot-Inputs.pdf, Jul. 24, 2017, 39 pages.

EP20797238.1 , "Summons to Attend Oral Proceedings", Feb. 26, 2024, 8 pages.

JP2022-516179 , "Office Action", Nov. 5, 2024, 4 pages.

CN202080063757.9, "Office Action", May 12, 2025, 25 pages.

IN202247007973, "First Examination Report", Feb. 28, 2025, 8 pages.

JP2022-516179, "Notice of Decision to Grant", Feb. 18, 2025, 3 pages.

JP2025-040153, "Office Action", Mar. 31, 2026, 7 pages.

\* cited by examiner

200

INITIALIZE CLASSIFIER MODEL WITH SKILL BOT DATA — 205

RECEIVE USER INPUT IN THE FORM OF AN INPUT UTTERANCE — 210

DETERMINE WHETHER INPUT UTTERANCE CAN BE HANDLED BY ANY SKILL BOT OR ELSE NONE CLASS — 215

500

| ACCESS TRAINING UTTERANCES FOR CHATBOTS | 505 |

| GENERATE TRAINING FEATURE VECTORS FROM THE TRAINING UTTERANCES | 510 |

| GENERATE MULTIPLE SET REPRESENTATIONS, EACH CORRESPONDING TO A RESPECTIVE SUBSET OF THE TRAINING FEATURE VECTORS | 515 |

| CONFIGURING A CLASSIFICATION MODEL OF A MASTER BOT TO COMPARE INPUT FEATURE VECTORS TO THE SET REPRESENTATIONS | 520 |

700

ACCESS INPUT UTTERANCE PROVIDED AS USER INPUT — 705

GENERATE INPUT FEATURE VECTOR FROM INPUT UTTERANCE — 710

MATCHES SKILLS OF ANY SKILL BOT? — 715

No          Yes

FORWARD THE INPUT UTTERANCE TO THE MATCHED SKILL BOT FOR PROCESSING — 720

INDICATE THAT THE UTTERANCE CANNOT BE PROCESSED — 725

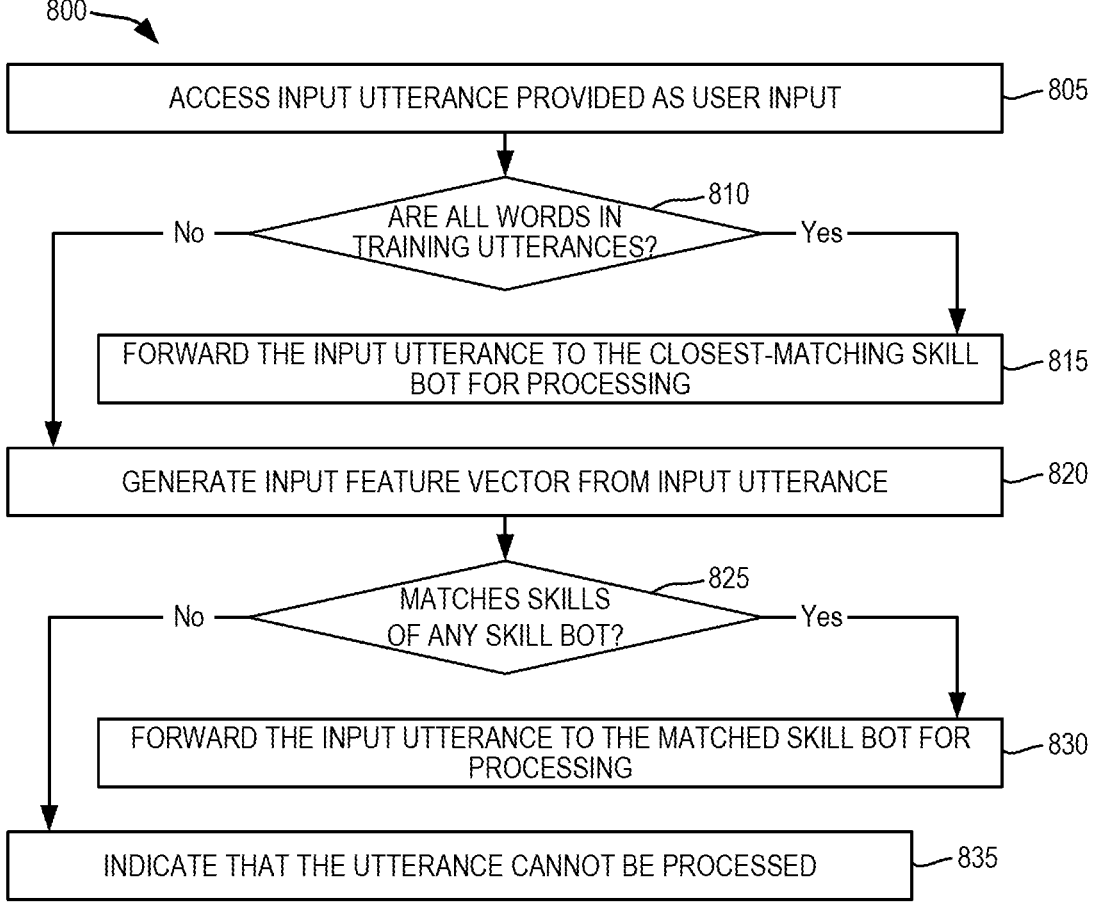

800

ACCESS INPUT UTTERANCE PROVIDED AS USER INPUT — 805

ARE ALL WORDS IN TRAINING UTTERANCES? — 810

No

Yes

FORWARD THE INPUT UTTERANCE TO THE CLOSEST-MATCHING SKILL BOT FOR PROCESSING — 815

GENERATE INPUT FEATURE VECTOR FROM INPUT UTTERANCE — 820

MATCHES SKILLS OF ANY SKILL BOT? — 825

No

Yes

FORWARD THE INPUT UTTERANCE TO THE MATCHED SKILL BOT FOR PROCESSING — 830

INDICATE THAT THE UTTERANCE CANNOT BE PROCESSED — 835

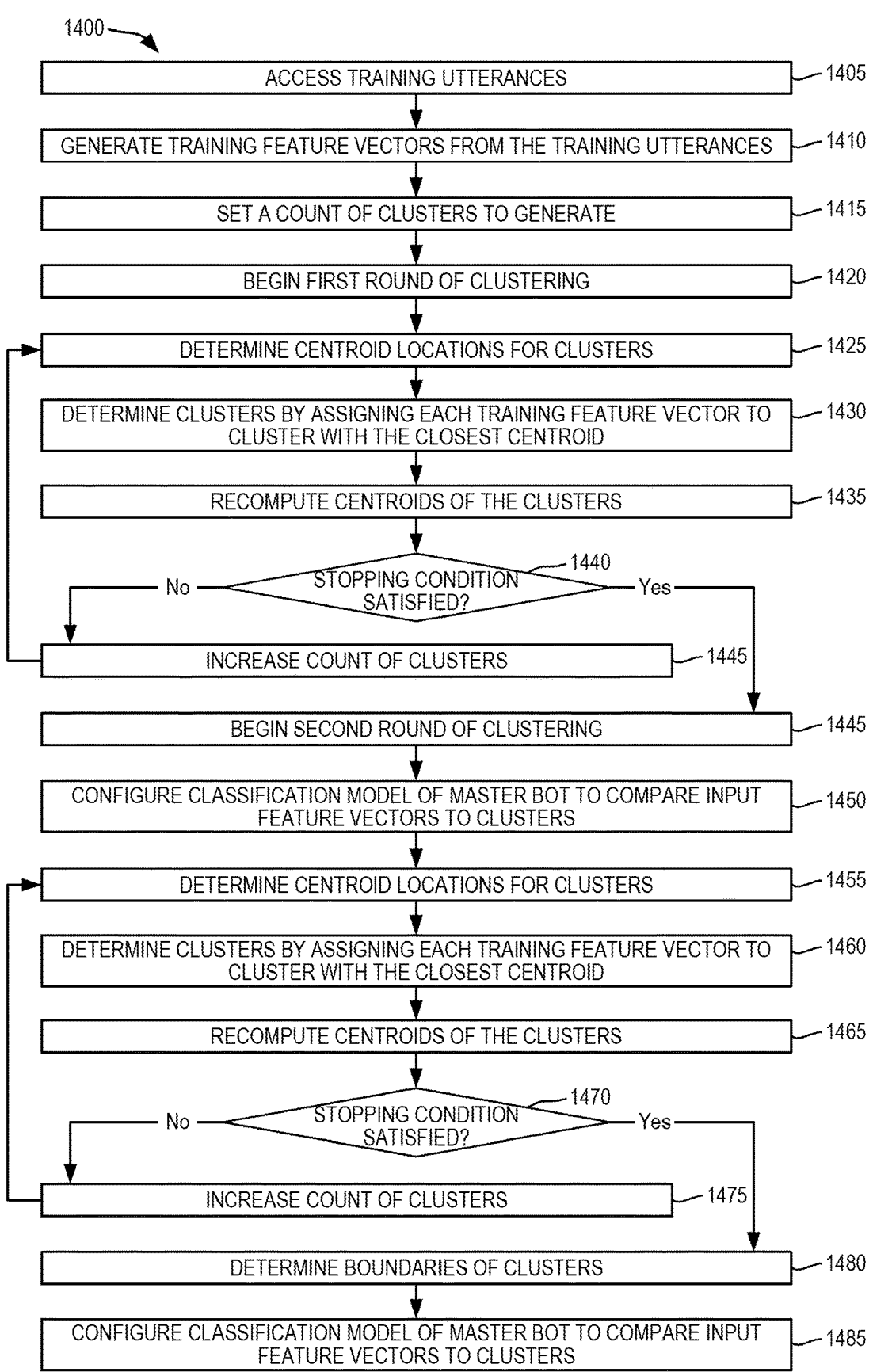

ACCESS TRAINING UTTERANCES — 1405

GENERATE TRAINING FEATURE VECTORS FROM THE TRAINING UTTERANCES — 1410

SET A COUNT OF CLUSTERS TO GENERATE — 1415

BEGIN FIRST ROUND OF CLUSTERING — 1420

DETERMINE CENTROID LOCATIONS FOR CLUSTERS — 1425

DETERMINE CLUSTERS BY ASSIGNING EACH TRAINING FEATURE VECTOR TO CLUSTER WITH THE CLOSEST CENTROID — 1430

RECOMPUTE CENTROIDS OF THE CLUSTERS — 1435

STOPPING CONDITION SATISFIED? — 1440   No   Yes

INCREASE COUNT OF CLUSTERS — 1445

BEGIN SECOND ROUND OF CLUSTERING — 1445

CONFIGURE CLASSIFICATION MODEL OF MASTER BOT TO COMPARE INPUT FEATURE VECTORS TO CLUSTERS — 1450

DETERMINE CENTROID LOCATIONS FOR CLUSTERS — 1455

DETERMINE CLUSTERS BY ASSIGNING EACH TRAINING FEATURE VECTOR TO CLUSTER WITH THE CLOSEST CENTROID — 1460

RECOMPUTE CENTROIDS OF THE CLUSTERS — 1465

STOPPING CONDITION SATISFIED? — 1470   No   Yes

INCREASE COUNT OF CLUSTERS — 1475

DETERMINE BOUNDARIES OF CLUSTERS — 1480

CONFIGURE CLASSIFICATION MODEL OF MASTER BOT TO COMPARE INPUT FEATURE VECTORS TO CLUSTERS — 1485

*FIG. 14*

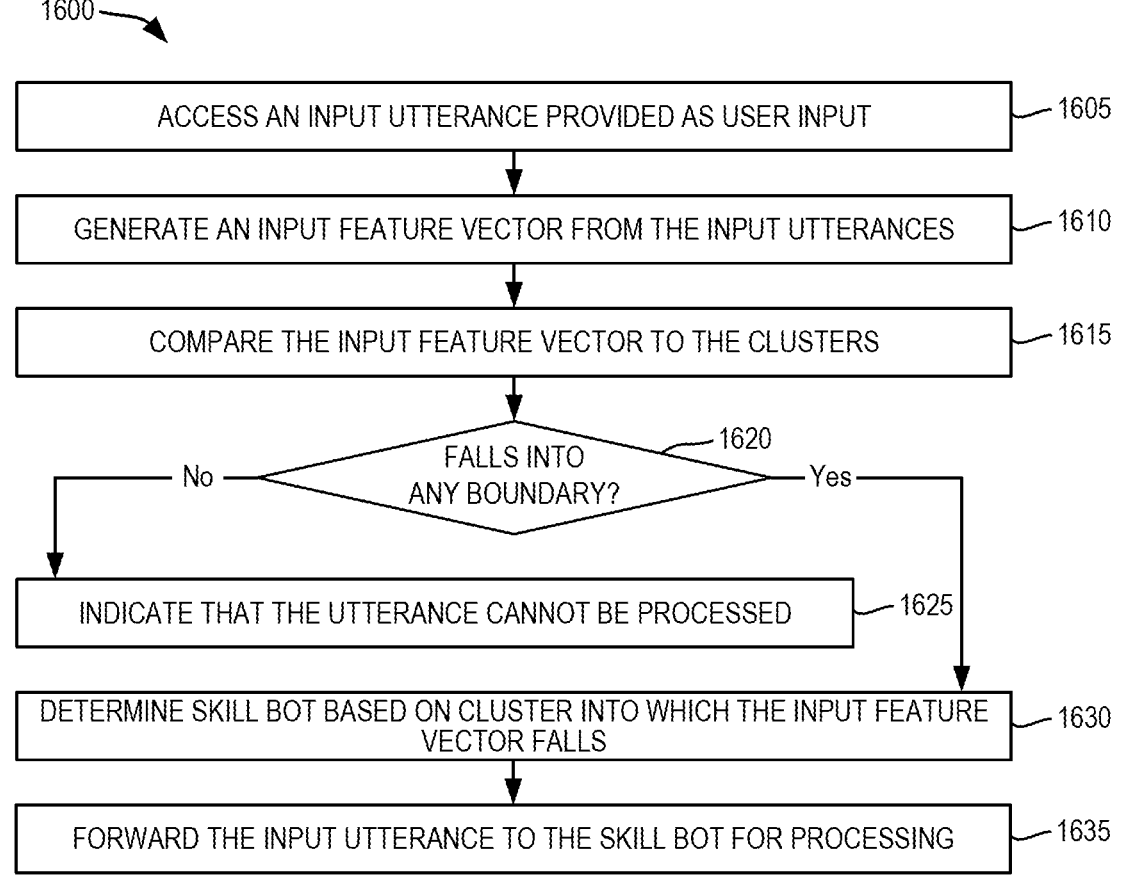

1600

ACCESS AN INPUT UTTERANCE PROVIDED AS USER INPUT — 1605

GENERATE AN INPUT FEATURE VECTOR FROM THE INPUT UTTERANCES — 1610

COMPARE THE INPUT FEATURE VECTOR TO THE CLUSTERS — 1615

FALLS INTO ANY BOUNDARY? — 1620

No

Yes

INDICATE THAT THE UTTERANCE CANNOT BE PROCESSED — 1625

DETERMINE SKILL BOT BASED ON CLUSTER INTO WHICH THE INPUT FEATURE VECTOR FALLS — 1630

FORWARD THE INPUT UTTERANCE TO THE SKILL BOT FOR PROCESSING — 1635

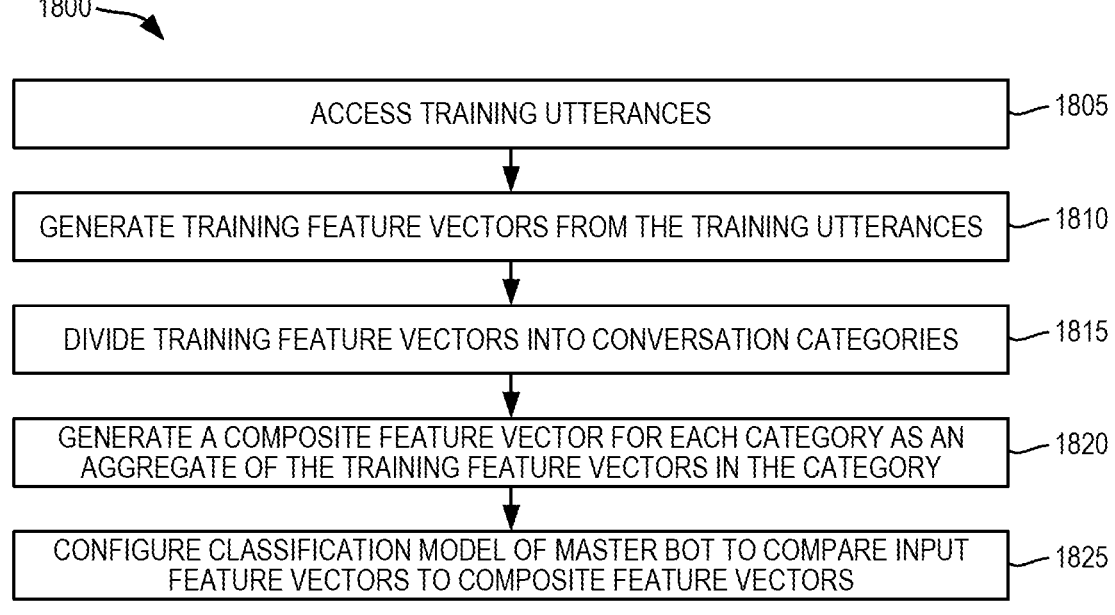

ACCESS TRAINING UTTERANCES — 1805

GENERATE TRAINING FEATURE VECTORS FROM THE TRAINING UTTERANCES — 1810

DIVIDE TRAINING FEATURE VECTORS INTO CONVERSATION CATEGORIES — 1815

GENERATE A COMPOSITE FEATURE VECTOR FOR EACH CATEGORY AS AN AGGREGATE OF THE TRAINING FEATURE VECTORS IN THE CATEGORY — 1820

CONFIGURE CLASSIFICATION MODEL OF MASTER BOT TO COMPARE INPUT FEATURE VECTORS TO COMPOSITE FEATURE VECTORS — 1825

| DETERMINE A VALUE FOR k | — 2205 |

| DETERMINE A SET OF k TRAINING FEATURE VECTORS CLOSEST TO THE INPUT FEATURE VECTOR | — 2210 |

| SELECT, TO PROCESS THE INPUT UTTERANCE, THE SKILL BOT HAVING THE MOST TRAINING FEATURE VECTORS IN THE SET | — 2215 |

2300

DETECTING UNRELATED UTTERANCES IN A CHATBOT SYSTEM

CROSS-REFERENCE TO RELATED APPLICATIONS

This application is a continuation of U.S. Ser. No. 17/017,076, filed Sep. 10, 2020, titled "DETECTING UNRELATED UTTERANCES IN A CHATBOT SYSTEM," which claims the benefit of and priority to U.S. Provisional Application No. 62/899,700, filed Sep. 12, 2019, titled "DETECTING UNRELATED UTTERANCES IN A CHATBOT SYSTEM," the contents of which are herein incorporated by reference for all purposes.

BACKGROUND

Chatbots are artificial-intelligence-based software applications or devices that provide an interface for conversations with human users. Chatbots can be programmed to perform various tasks in response to user input provided during a conversation. The user input can be supplied in various forms including, for example, audio input and text input. Thus, natural language understanding, speech-to-text, and other linguistic processing techniques may be employed as part of the processing performed by a chatbot. In some computing environments, multiple chatbots are available to converse with a user, with each chatbot handling a different set of tasks.

SUMMARY

Techniques described herein are for determining that an input utterance from a user is not related to any skill bot, also referred to as a chatbot, in a set of one or more skill bots that are available to a master bot. In some embodiments, the master bot can evaluate the input utterance and either determine that the input utterance is unrelated to the skill bots or route the input utterance to an appropriate skill bot.

In some embodiments, a system described herein includes a training system and a master bot. The training system is configured to train a classifier model. Training the classifier model includes accessing training utterances associated with skill bots, where the training utterances comprising respective training utterances associated with each skill bot of the skill bots. Each skill bot is configured to provide a dialog with a user. The training further includes generating training feature vectors from the training utterances. The training feature vectors include respective training feature vectors associated with each skill bot. The training further includes generating multiple set representations of the training feature vectors, where each set representation of the multiple set representations corresponds to a subset of the training feature vectors, and configuring the classifier model to compare input feature vectors to the multiple set representations. The master bot is configured to access an input utterance as a user input and to generate an input feature vector from the input utterance. The master bot is further configured to use the classifier model to compare the input feature vector to the multiple set representations of the training feature vectors and to output an indication that the user input cannot be handled by the skill bots, based on the input feature vector falling outside the multiple set representations.

In additional or alternative embodiments, a method described herein includes accessing, by a computer system, training utterances associated with skill bots, where the training utterances include a respective subset of training utterances for each skill bot of the skill bots. Each skill bot is configured to provide a dialog with a user. The method further includes generating training feature vectors from the training utterances, where the training feature vectors include a respective training feature vector for each training utterance. The method further includes determining centroid locations for clusters in a feature space and assigning each training feature vector to a respective cluster having a respective centroid location to which the training feature vector is closest from among the clusters. The method further includes repeatedly modifying the clusters until a stopping condition is met. Modifying the clusters includes increasing a count of the clusters to an updated count, determining new centroid locations for the clusters in a quantity equal to the updated count, and reassigning the training feature vectors to the clusters based on closeness to the new centroid locations. The method further includes determining boundaries of the clusters, where the boundaries include a respective boundary for each cluster of the clusters. The method further includes accessing an input utterance, converting the input utterance to an input feature vector, and determining that the input feature vector falls outside the boundaries of the clusters by comparing the input feature vector to the boundaries of the clusters. Additionally, the method includes outputting an indication that the input utterance cannot be handled by the skill bots, based on the input feature vector falling outside the clusters in the feature space.

In still additional or alternative embodiments, a method described herein includes accessing, by a computer system, training utterances associated with skill bots. The training utterances include a respective subset of training utterances for each skill bot of the skill bots. Each skill bot is configured to provide a dialog with a user. The method further includes generating training feature vectors from the training utterances, where the training feature vectors include a respective training feature vector for each training utterance of the training utterances, and dividing the training utterances into conversation categories. The method further includes generating composite feature vectors corresponding to the conversation categories. Generating the composite feature vectors includes, for each conversation category of the conversation categories, generating a respective composite feature vector as an aggregate of respective training feature vectors of the training utterances in the conversation category. The method further includes accessing an input utterance, converting the input utterance to an input feature vector and determining that the input feature vector is not sufficiently similar to the composite feature vectors by comparing the input feature vector to the composite feature vectors. Additionally, the method includes outputting an indication that the input utterance cannot be handled by the skill bots, based on the input feature vector not being sufficiently similar to the composite feature vectors.

In still additional or alternative embodiments, a system described herein includes a master bot. The master bot is configured to perform operations including: accessing an input utterance as a user input; generating an input feature vector from the input utterance; comparing, using a classifier model, the input feature vector to the multiple set representations of the training feature vectors; outputting an indication that the user input cannot be handled by skill bots, based on the input feature vector falling outside the multiple set representations. Each skill bot of the skill bots is configured to provide a dialog with a user.

In still additional or alternative embodiments, a method described herein includes accessing an input utterance. The method further includes converting the input utterance to an input feature vector. The method further includes determining that the input feature vector falls outside boundaries of clusters in a feature space by comparing the input feature vector to the boundaries of the clusters. The method further includes outputting an indication that the input utterance cannot be handled by the skill bots, based on the input feature vector falling outside the clusters in the feature space. Each skill bot of the skill bots is configured to provide a dialog with a user.

In still additional or alternative embodiments, a method described herein includes accessing an input utterance. The method further includes converting the input utterance to an input feature vector. The method further includes determining that the input feature vector is not sufficiently similar to composite feature vectors by comparing the input feature vector to the composite feature vectors. The composite feature vectors correspond to conversation categories. The method further includes outputting an indication that the input utterance cannot be handled by skill bots, based on the input feature vector not being sufficiently similar to the composite feature vectors. Each skill bot of the skill bots is configured to provide a dialog with a user.

In still additional or alternative embodiments, a method described herein includes accessing an input utterance as a user input. The method further includes generating an input feature vector from the input utterance. The method further includes comparing, using a classifier model, the input feature vector to multiple set representations of the training feature vectors. The method further includes outputting an indication that the user input cannot be handled by skill bots, based on the input feature vector falling outside the multiple set representations. Each skill bot of the skill bots is configured to provide a dialog with a user.

In still additional or alternative embodiments, a method described herein is used for training a classifier model. The method includes accessing training utterances associated with skill bots, the training utterances including respective training utterances associated with each skill bot of the skill bots. Each skill bot of the skill bots is configured to provide a dialog with a user. The method further includes generating training feature vectors from the training utterances, the training feature vectors including respective training feature vectors associated with each skill bot of the skill bots. The method further includes generating multiple set representations of the training feature vectors. Each set representation of the multiple set representations corresponds to a subset of the training feature vectors. The method further includes configuring the classifier model to compare input feature vectors to the multiple set representations of the training feature vectors.

In still additional or alternative embodiments, a method described herein is used for generating clusters that can be used for determining whether an input utterance can be handled by skill bots. The method includes accessing, by a computer system, training utterances associated with skill bots, the training utterances including a respective subset of training utterances for each skill bot of the skill bots. Each skill bot of the skill bots is configured to provide a dialog with a user. The method further includes generating training feature vectors from the training utterances, the training feature vectors including a respective training feature vector for each training utterance of the training utterances. The method further includes determining centroid locations for clusters in a feature space. The method further includes assigning each training feature vector, of the training feature vectors, to a respective cluster, of the clusters, having a respective centroid location to which the training feature vector is closest from among the clusters; and repeatedly modifying the clusters until a stopping condition is met. Modifying the clusters includes increasing a count of the clusters to an updated count; determining new centroid locations for the clusters in a quantity equal to the updated count; and reassigning the training feature vectors to the clusters based on closeness to the new centroid locations. The method further includes determining boundaries of the clusters, the boundaries including a respective boundary for each cluster of the clusters.

In still additional or alternative embodiments, a method described herein is used for generating composite feature vectors that can be used for determining whether an input utterance can be handled by skill bots. The method further includes accessing, by a computer system, training utterances associated with skill bots, the training utterances including a respective subset of training utterances for each skill bot of the skill bots. Each skill bot of the skill bots is configured to provide a dialog with a user. The method further includes generating training feature vectors from the training utterances, the training feature vectors including a respective training feature vector for each training utterance of the training utterances. The method further includes dividing the training utterances into conversation categories. The method further includes generating composite feature vectors corresponding to the conversation categories. Generating the composite feature vectors includes, for each conversation category of the conversation categories, generating a respective composite feature vector as an aggregate of respective training feature vectors of the training utterances in the conversation category.

In still additional or alternative embodiments, a system described herein includes means for performing any of the above mentioned methods.

The foregoing, together with other features and embodiments will become more apparent upon referring to the following specification, claims, and accompanying drawings.

BRIEF DESCRIPTION OF THE DRAWINGS

FIG. 8 is a flow diagram of another example of a method of using the classifier model of the master bot to determine whether the input utterance is unrelated to any available skill bot associated with the master bot, according to some embodiments described herein.

FIG. 14 is a flow diagram of a method of initializing the classifier model of the master bot to utilize clusters to determine whether input utterances are unrelated to available skill bots, according to some embodiments described herein.

FIG. 16 is a flow diagram of a method of using the classifier model of the master bot to determine whether the input utterance is unrelated to any available skill bot associated with the master bot, according to some embodiments described herein.

FIG. 18 is a flow diagram of a method of initializing the classifier model of the master bot to utilize composite feature vectors to determine whether input utterances are unrelated to available skill bots, according to some embodiments described herein.

DETAILED DESCRIPTION

Figure 1:
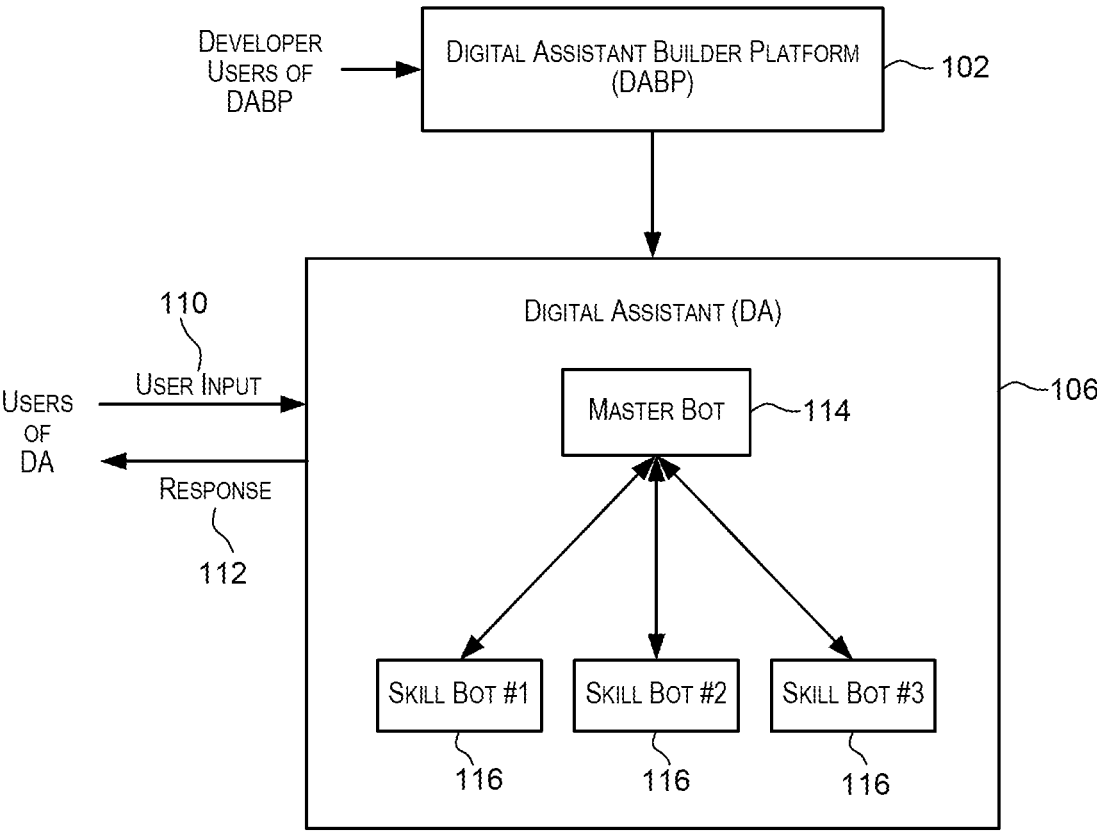
FIG. 1 is a block diagram of an environment including a master bot in communication with various skill bots, also referred to as chatbots, according to some embodiments described herein.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Various embodiments are described herein, including methods, systems, non-transitory computer-readable storage media storing programs, code, or instructions executable by one or more processors, and the like.

As described above, certain environments include multiple chatbots, also referred to herein as skill bots, such that each chatbot is specialized to handle a respective set of tasks, or skills. In that case, it would be advantageous to automatically direct user input from a user to the chatbot that is most suited for handling that user input and, further, to quickly identify when a user input is unrelated to the chatbots and thus cannot be handled by any of the available chatbots. Some embodiments described herein enable a computing system, such as a master bot, to perform preliminary processing on user input to determine whether the user input is unrelated to the chatbots (i.e., cannot be handled by the chatbots). As a result, computing resources are not wasted by a chatbot in attempting to process an unrelated user input. Thus, certain embodiments described herein conserve computing resources of chatbots to providing early detection of unrelated user inputs so as to prevent chatbots in an environment from processing such user inputs. Further, certain embodiments conserve network resources by preventing the master bot from transmitting such user inputs to one or more chatbots that are incapable of handling them.

In an environment that includes multiple chatbots, a master bot might include a classifier that determines which chatbot should process an input utterance. For instance, the classifier could be implemented as a neural network, or some other ML model, that outputs a set of probabilities, each probability associated with a chatbot and indicating a confidence level that the chatbot can handle the input utterances. This type of master bot selects the chatbot with the highest confidence level and forwards the input utterance to that chatbot. However, the master bot might provide falsely high confidence scores for input utterances that are unrelated, because the confidence is essentially divided among the available chatbot without consideration for whether the chatbot are configured to handle the input utterance at all. This could result in the chatbot processing an input utterance that the chatbot is not equipped to handle. The chatbot may eventually provide an indication that it cannot handle the input utterance or a request to the user for clarification; however, this would occur after the chatbot has expended resources to process the input utterance.

Alternatively, a developer could train the master bot in an attempt to help the master bot recognize utterances that cannot be handled by any available chatbot. For instance, the master bot could be trained with labeled training data that includes related utterances (i.e., that can be handled by the chatbots) as well as unrelated utterances (i.e., that cannot be handled by the chatbots), to teach the master bot to recognize unrelated utterances. However, it is unlikely that the scope of training data could be sufficient to enable the master bot to recognize all unrelated utterances. An input utterance that is not similar to any of the unrelated utterances used during training might still end up being forwarded to a chatbot for processing. As a result, the computational resources for training the master bot would be increased, and the master bot would still fail at recognizing a broad swath of unrelated utterances.

Certain embodiments described herein address the drawbacks of the techniques described above and may be used instead of or in conjunction with such techniques. In certain embodiments, a determination is made, using a trained machine-learning (ML) model, referred to herein as a classifier model, as to whether an input utterance (i.e., a natural language phrase potentially in textual form) provided as user input is related to any skill bot in a set of available skill bots. This determination can be performed, for instance, by a master bot that utilizes the classifier model. The master bot generates an input feature vector from the input utterance. In one example, the classifier model of the master bot compares the feature vector to a set of clusters of training feature vectors, which are feature vectors of training data, to determine whether the input feature vector falls into any of the clusters. If the input feature vector falls outside all the clusters, then the master bot decides that the input utterances is unrelated to the skill bots. In another example, the classifier model of the master bot compares the input feature vectors to a set of composite feature vectors, each composite feature vector representing one or multiple training feature vectors belonging to a respective category. If the input feature vector is not sufficiently similar to any of the composite feature vectors, then the master bot decides that the input utterances is unrelated to the skill bots. If the input utterance is determined to be unrelated to any bot, then the input utterance may be deemed a "none class" and is not routed to any bot for handling. Instead, processing of the input utterance may end, or the master bot may prompt the user for clarification as to what the user intended.

This improved routing may prevent computational resources from being committed to handle a query that ultimately would not be handled effectively by the system. This may improve the overall responsiveness of the system. Additionally, user experience may be improved as the user may be guided into rephrasing or clarifying their query in a manner that is more readily handled by an appropriately trained specialist chatbot or set of chatbots. In addition to processing and network resources being saved, the average time for a user query to be handled may thus be reduced by this improved routing through the bot network.

If the input utterance is determined to be related to at least one bot, then the input utterance may undergo intent classification, in which the intent that most closely matches the input utterance is determined in order to start a conversation flow associated with that intent. For example, each intent of a skill bot may have associated with it a state machine that defines various conversation states for a conversation with the user. Intent classification can be performed at the individual bot level. For instance, each skill bot registered with a master bot may have its own classifier (e.g., an ML-based classifier) that is trained on predefined utterances associated with that particular bot. The input utterance may be input to the intent classifier of the bot that most closely relates to the input utterance for determining which of the bot's intents best matches the utterance.

This may result in an improved user experience as the user's query may be rapidly routed to a selected skill bot or selected set of skill bots that may be better equipped to handle the user's query than a non-specialist generic bot or may handle the user's query more rapidly than a non-specialist generic bot. The improved routing may additionally or alternatively result in fewer computational resources being used as the selected skill bot or selected set of skill bots may consume fewer processing resources when handling a user query than a non-specialist generic bot.

Overview of Example Chatbot System

FIG. 1 is a block diagram of an environment including a master bot 114 in communication with various skill bots 116, also referred to as chatbots, according to some embodiments described herein. The environment includes a digital assistant builder platform (DABP) 102 that enables developers to program and deploy digital assistants (DAs) 106, or chatbot systems. A DA 106 includes or has access to a master bot 114, which includes or has access to one or more skill bots 116, where each skill bot 116 is configured to provide one or more skills, or tasks, to users. In some embodiments, the master bot 114 and the skill bots 116 run on the DA 106 itself; alternatively, however, only the master bot 114 runs on the DA 106 and communicates with skill bots 116 running elsewhere (e.g., on another computing devices).

In some embodiments, the DABP 102 can be used to program one or more DAs 106. For example, as shown in FIG. 1, a developer can use DABP 102 to create and deploy a digital assistant 106 for users to access. For example, the DABP 102 can be used by a bank to create one or more digital assistants for use by the bank's customers. The same DABP 102 platform can be used by multiple enterprises to create digital assistants 106. As another example, an owner of a restaurant (e.g., a pizza shop) may use DABP 102 to create and deploy a digital assistant that enables customers of the restaurant to order food (e.g., order pizza). Additionally or alternatively, for example, the DABP 102 can be used by a developer to deploy one or more skill bots 116 such that the one or more skill bots 116 become accessible to a master bot 114 of an existing digital assistant 106.

Additionally or alternatively, in some embodiments, as described further below, the DABP 102 is configured to train a master bot 114 of a digital assistant to enable the master bot 114 to recognize when an input utterance is unrelated to any of the available skill bots 116.

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices that can include generic or specialized hardware, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

In some embodiments, a digital assistant 106 can be used to perform various tasks via natural language-based conversations between the digital assistant and its users 108. As part of a conversation, a user may provide a user input 110 to the digital assistant 106, which may provide a response 112 to the user input 110 and may optionally perform one or more additional tasks related to the user input 110 (e.g., if the user input includes an instruction to perform a task). A conversation, or dialog, can include one or more user inputs 110 and responses 112. Via a conversation, a user can request one or more tasks to be performed by the digital assistant 106, and the digital assistant 106 is configured, in response, to perform the user-requested tasks and respond with appropriate responses to the user.

A user input 110 can be in a natural language form, referred to as an utterance. An utterance can be in text form, such as when a user types a phrase, such as sentence, a question, a text fragment, or even a single word, and provides the text as input to digital assistant 106. In some embodiments, a user utterance can be in audio input or speech form, such as when a user speaks something that is provided as input to digital assistant 106, which may include or have access to a microphone for capturing such speech. An utterance is typically in a language spoken by the user. When an utterance is in the form of speech input, the speech input may be converted to a textual utterance in the same language, and the digital assistant 106 may process the text utterance as user input. Various speech-to-text processing techniques may be used to convert a speech input to a text utterance. In some embodiments, the speech-to-text conversion is performed by digital assistant 106 itself, but various implementations are within the scope of this disclosure. For purposes of this disclosure, it is assumed that input utterances (i.e., utterances provided as user input) are text utterances that have been provided directly by a user 108 of digital assistant 106 or are the result of conversion of input speech utterances to text form. This, however, is not intended to be limiting or restrictive in any manner.

An utterance can be a fragment, a sentence, multiple sentences, one or more words, one or more questions, combinations of the aforementioned types, or the like. In some embodiments, the digital assistant 106, including its master bot 114 and skill bots 116, is configured to apply natural language understanding (NLU) techniques to an utterance to understand the meaning of the user input. As part of the NLU processing for an utterance, the digital assistant 106 may perform processing to understand the meaning of the utterance, which involves identifying one or more intents and one or more entities corresponding to the utterance. Upon understanding the meaning of an utterance, the digital assistant 106, including its master bot 114 and skill bots 116, may perform one or more actions or operations responsive to the understood meaning or intents.

For example, a user input may request a pizza to be ordered by providing an input utterance such as "I want to order a pizza." Upon receiving such an utterance, the digital assistant 106 determines the meaning of the utterance and takes appropriate actions. The appropriate actions may involve, for example, responding to the user with questions requesting user input on the type of pizza the user desires to order, the size of the pizza, any toppings for the pizza, or the like. The responses 112 provided by the digital assistant 106 may also be in natural language form and typically in the same language as the input utterance. As part of generating these responses 112, the digital assistant 106 may perform natural language generation (NLG). For the user ordering a pizza, via the conversation between the user and the digital assistant 106, the digital assistant may guide the user to provide all the requisite information for the pizza order and then, at the end of the conversation, cause the pizza to be ordered. The digital assistant 106 may end the conversation by outputting information to the user indicating that the pizza has been ordered.

At a conceptual level, the digital assistant 106, along with its master bot 114 and associated skill bots 116, performs various processing in response to an utterance received from a user. In some embodiments, this processing involves a series or pipeline of processing steps including, for example, understanding the meaning of the input utterance (using NLU), determining an action to be performed in response to the utterance, causing the action to be performed when appropriate, generating a response to be output to the user responsive to the utterance, and outputting the response to the user. The NLU processing can include parsing the received input utterance to understand the structure and meaning of the utterance, refining and reforming the utterance to develop a form that is more easily parsed and understood (e.g., a logical form). Generating a response may include using NLG techniques. Thus, the natural language processing performed by a digital assistant 106 can include a combination of NLU and NLG processing.

The NLU processing performed by the digital assistant 106 can include various NLU processing such as sentence parsing (e.g., tokenizing, lemmatizing, identifying part-of-speech tags, identifying named entities, generating dependency trees to represent a sentence structure, splitting a sentence of the utterance into clauses, analyzing individual clauses, resolving anaphoras, performing chunking, or the like). In certain embodiments, the NLU processing or portions thereof is performed by the digital assistant 106 itself. Additionally or alternatively, the digital assistant 106 may use other resources to perform portions of the NLU processing. For example, the syntax and structure of an input utterance may be identified by processing the input utterance using a parser, a part-of-speech tagger, or a named entity recognizer separate from the digital assistant 106.

While the various examples provided in this disclosure show utterances in the English language, this is meant only as an example. In certain embodiments, the digital assistant 106 is additionally, or alternatively, capable of handling utterances in languages other than English. The digital assistant 106 may provide subsystems (e.g., components implementing NLU functionality) that are configured for performing processing for different languages. These subsystems may be implemented as pluggable units that can be called using service calls from an NLU core server, which may run on the digital assistant 106. This makes the NLU processing flexible and extensible for each language, including allowing different orders of processing. A language pack may be provided for individual languages, where a language pack can register a list of subsystems that can be served from the NLU core server.

In some embodiments, the digital assistant 106 can be made available or accessible to its users 108 through a variety of different channels, such as via certain applications, via social media platforms, via various messaging services and applications (e.g., an instant messaging application), or other applications or channels. A single digital assistant can have several channels configured for it so that it can be run on and be accessed by different services simultaneously. Additionally or alternatively, the digital assistant 106 may be implemented on a device that is local to a user and, thus, may be a personal digital assistant for use by the user or other nearby users.

The digital assistant 106 may be associated with one or more skills. In certain embodiments, these skills are implemented through individual chatbots, referred to as skill bots 116, each of which is configured to interact with users to fulfill specific types of tasks, such as tracking inventory, submitting timecards, creating expense reports, ordering food, checking a bank account, making reservations, buying a widget, or other tasks. For example, for the embodiment depicted in FIG. 1, the digital assistant 106 includes, or otherwise has access to, three skill bots 116, each implementing a particular skill or set of skills. However, various quantities of skill bots 116 could be supported by the digital assistant 106. Each skill bot 116 may be implemented as hardware, software, or a combination of both.

Each skill associated with a digital assistant 106, and thus implemented as a skill bot 116, is configured to help a user of the digital assistant 106 complete a task through a conversation with the user. The conversation can include a combination of text or audio user inputs 110 provided by the user and responses 112 provided by the skill bots 116 by way of the digital assistant 106. These responses 112 may be in the form of text or audio messages to the user or may be provided using simple user interface elements (e.g., select lists) that are presented to the user for the user to make selections.

There are various ways in which a skill bot 116 can be associated or added to a digital assistant. In some instances, a skill bot 116 can be developed by an enterprise and then added to a digital assistant 106 using the DABP 102, e.g., through a user interface provided by the DABP 102 for registering the skill bot 116 with the digital assistant 106. In other instances, a skill bot 116 can be developed and created using the DABP 102 and then added to a digital assistant 106 using the DABP 102. In yet other instances, the DABP 102 provides an online digital store (referred to as a "skills store") that offers multiple skills directed to a wide range of tasks. The skills offered through the skills store may also expose various cloud services. To add a skill to a digital assistant 106 using the DABP 102, a developer can access the skills store via the DABP 102, select a desired skill, and indicate that the selected skill is to be added to the digital assistant 106. A skill from the skills store can be added to a digital assistant as is or in a modified form. To add the skill, in the form of a skill bot 116, is added to the digital assistant 106, the DABP 102 may configure the master bot 114 of the digital assistant 106 to communicate with the skill bot 116. Additionally, the DABP 102 may configure the master bot 114 with skill bot data enabling the master bot 114 to recognize utterances that the skill bot 116 is capable of handling and, thus, updating data used by the master bot 114 to determine whether an input utterance is unrelated to any of the skill bots 116 of the digital assistant 106. Activities to configure the master bot 114 in this manner are described in more detail below.

Skill bots 116, and thus skills, useable with a digital assistant 106 can vary widely. For example, for a digital assistant 106 developed for an enterprise, the master bot 114 of the digital assistant may interface with skill bots 116 with specific functionalities, such as a CRM bot for performing functions related to customer relationship management (CRM), an ERP bot for performing functions related to enterprise resource planning (ERP), an HCM bot for performing functions related to human capital management (HCM), or others. Various other skills could also be available to a digital assistant and may depend on the intended use of the digital assistant 106.

Various architectures may be used to implement a digital assistant 106. In certain embodiments, the digital assistant 106 may be implemented using a master-child paradigm or architecture. According to this paradigm, a digital assistant 106 acts as the master bot 114, either by including the master bot 114 or by accessing the master bot 114, and interacts with one or more child bots that are skill bots 116. The skill bots 116 may or may not run directly on the digital assistant 106. In the example depicted in FIG. 1, the digital assistant 106 includes (i.e., accesses and uses) a master bot 114 and three skill bots 116; however, over quantities of skill bots 116 can be used, and the quantity can vary over time as skills are added or removed from the digital assistant 106.

A digital assistant 106 implemented according to the master-child architecture enables users of the digital assistant 106 to interact with multiple skill bots 116, and thus to utilize multiple skills that may be implemented separately, through a unified user interface, namely via the master bot 114. In some embodiments, when a user engages with the digital assistant 106, the user input is received by the master bot 114. The master bot 114 then performs preliminary processing to determine the meaning of the input utterance acting as the user input, where the input utterance can be, for instance, the user input itself or a textual version of the user input. The master bot 114 determines whether the input utterance is unrelated to the skill bots 116 available to it, which may be the case, for instance, if the input utterances requires a skill outside those of the skill bots 116. If the input utterance is unrelated to the skill bots 116, then the master bot 114 may return to the user an indication that the input utterance is unrelated to the skill bots 116; for instance, the digital assistant 106 can ask the user for clarification or can report that the input utterance is not understood. However, if the master bot 114 identifies a suitable skill bot 116, master bot 114 may route the input utterance, and thus the ongoing conversation, to that skill bot 116. This enables a user to converse with the digital assistant 106 having multiple skill bots 116 through a common interface.

Although the embodiment in FIG. 1 shows digital assistant 106 including a master bot 114 and skill bots 116, this is not intended to be limiting. In some embodiments, the digital assistant 106 can include various other components, such as other systems or subsystems, that provide functionalities of the digital assistant 106. These systems and subsystems may be implemented only in software (e.g., as code stored on a computer-readable medium and executable by one or more processors), in hardware, or in an implementation that uses a combination of software and hardware.

In certain embodiments, the master bot 114 is configured to be aware of the available skill bots 116. For instance, the master bot 114 may have access to metadata that identifies the various available skill bots 116, and for each skill bot 116, the capabilities of the skill bot 116 including the tasks that can be performed by the skill bot 116. Upon receiving a user request in the form of an input utterance, the master bot 114 is configured to, from the multiple available skill bots 116, identify or predict a specific skill bot 116 that can best serve or handle the user request or, in the alternative, determine that the input utterance is unrelated to any of the skill bots 116. If it is determined that a skill bot 116 can handle the input utterance, the master bot 114 may route the input utterance, or at least a portion of the input utterance, to that skill bot 116 for further handling. Control thus flows from the master bot 114 to the skill bots 116.

In some embodiments, the DABP 102 provides an infrastructure and various services and features that enable a developer user of DABP 102 to create a digital assistant 106 including one or more skill bots 116. In some instances, a skill bot 116 can be created by cloning an existing skill bot 116, for example, by cloning a skill bot 116 provided in a skills store. As previously indicated, the DABP 102 can provide a skills store that offers multiple skill bots 116 for performing various tasks. A user of the DABP 102 can clone a skill bot 116 from the skills store, and as needed, modifications or customizations may be made to the cloned skill bot 116. In some other instances, a developer user of the DABP 102 creates a skill bot 116 from scratch, such as by using tools and services offered by DABP 102.

In certain embodiments, at a high level, creating or customizing a skill bot 116 involves the following activities:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot
Each of the above activities is briefly described below.

(1) Configuring settings for a new skill bot 116: Various settings may be configured for the skill bot 116. For example, a skill bot developer can specify one or more invocation names for the skill bot 116 being created. These invocation names, which serve as identifiers for the skill bot 116, can then be used by users of a digital assistant 106 to explicitly invoke the skill bot 116. For example, a user can include an invocation name in the user's input utterance to explicitly invoke the corresponding skill bot 116.

(2) Configuring one or more intents and associated example utterances for the skill bot 116: The skill bot 116 designer specifies one or more intents, also referred to as chatbot intents, for a skill bot 116 being created. The skill bot 116 is then trained based upon these specified intents. These intents represent categories or classes that the skill bot 116 is trained to infer for input utterances. Upon receiving an utterance, a trained skill bot 116 infers (i.e., determines) an intent for the utterance, where the inferred intent is selected from the predefined set of intents used to train the skill bot 116. The skill bot 116 then takes an appropriate action responsive to an utterance based upon the intent inferred for that utterance. In some instances, the intents for a skill bot 116 represent tasks that the skill bot 116 can perform for users of the digital assistant. Each intent is given an intent identifier or intent name. For example, for a skill bot 116 trained for a bank, the intents specified for the skill bot 116 may include "CheckBalance," "TransferMoney," "DepositCheck," or the like.

For each intent defined for a skill bot 116, the skill bot 116 designer may also provide one or more example utterances that are representative of and illustrate the intent. These example utterances are meant to represent utterances that a user may input to the skill bot 116 for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances, also referred to as training utterances, are used as training data to train the skill bot 116. Various different training techniques may be used. As a result of this training, a predictive model is generated that is configured to take an utterance as input and output an intent inferred for the utterance. In some instances, input utterances provided as user input are input to an intent analysis engine (e.g., a rules-based or ML-based classifier executed by the skill bot 116), which is configured to use the trained model to predict or infer an intent for the input utterance. The skill bot 116 may then take one or more actions based on the inferred intent.

(3) Configuring entities for one or more intents of the skill bot 116: In some instances, additional context may be needed to enable the skill bot 116 to properly respond to an input utterance. For example, there may be situations where multiple input utterances resolve to the same intent in a skill bot 116. For instance, the utterances "What's my savings account balance?" and "How much is in my checking account?" both resolve to the same CheckBalance intent, but these utterances are different requests asking for different things. To clarify such requests, one or more entities can be added to an intent. Using an example of a banking skill bot 116, an entity called Account_Type, which defines values called "checking" and "saving" may enable the skill bot 116 to parse the user request and respond appropriately. In the above example, while the utterances resolve to the same intent, the value associated with the Account_Type entity is different for the two utterances. This enables the skill bot 116 to perform possibly different actions for the two utterances in spite of them resolving to the same intent. One or more entities can be specified for certain intents configured for the skill bot 116. Entities are thus used to add context to the intent itself. Entities help describe an intent more fully and enable the skill bot 116 to complete a user request.

In certain embodiments, there are two types of entities: (a) built-in entities, which may be provided by the DABP 102, and (2) custom entities that can be specified by a developer. Built-in entities are generic entities that can be used with a wide variety of skill bots 116. Examples of built-in entities include entities related to time, date, addresses, numbers, email addresses, duration, recurring time periods, currencies, phone numbers, uniform resource locators (URLs), or the like. Custom entities are used for more customized applications. For example, for a banking skill, an Account_Type entity may be defined by the developer to support various banking transactions by checking the user input for keywords like checking, savings, or credit cards.

(4) Training the skill bot 116: A skill bot 116 is configured to receive user input in the form of utterances, parse or otherwise process the received user input, and identify or select an intent that is relevant to the received user input. In some embodiments, as indicated above, the skill bot 116 has to be trained for this. In certain embodiments, a skill bot 116 is trained based on the intents configured for the skill bot 116 and the example utterances (i.e., training utterances) associated with the intents, so that the skill bot 116 can resolve an input utterance to one of its configured intents. In certain embodiments, the skill bot 116 uses a predictive model that is trained using the training data and allows the skill bot 116 to discern what users say or, in some cases, are trying to say. The DABP 102 may provide various different training techniques that can be used by a developer to train a skill bot 116, including various ML-based training techniques, rules-based training techniques, or combinations thereof. In certain embodiments, a portion (e.g., 80%) of the training data is used to train a skill bot model and another portion (e.g., the remaining 20%) is used to test or verify the model. Once trained, the trained model, also referred to as the trained skill bot 116, can then be used to handle and respond to input utterances. In certain cases, an input utterance may be a question that requires only a single answer and no further conversation. In order to handle such situations, a question-and-answer (Q&A) intent may be defined for a skill bot 116. In some embodiments, Q&A intents are created in a similar manner as other intents, but the dialog flow for Q&A intents can be different from that for regular intents. For example, unlike for other intents, the dialog flow for a Q&A intent may not involve prompts for soliciting additional information (e.g., the value for a particular entity) from the user.

(5) Creating a dialog flow for the skill bot 116: A dialog flow specified for a skill bot 116 describes how the skill bot 116 reacts as different intents for the skill bot 116 are resolved responsive to received user input 110. The dialog flow defines operations or actions that a skill bot 116 will take, such as how the skill bot 116 responds to user utterances, how the skill bot 116 prompts users for input, and how the skill bot 116 returns data. A dialog flow is similar to a flowchart that is followed by the skill bot 116. The skill bot 116 designer specifies a dialog flow using a language, such as markdown language. In certain embodiments, a version of YAML called OBotML may be used to specify a dialog flow for a skill bot 116. The dialog flow definition for a skill bot 116 acts as a model for the conversation itself, one that lets the skill bot 116 designer choreograph the interactions between a skill bot 116 and the users that the skill bot 116 services.

In certain embodiments, the dialog flow definition for a skill bot 116 contains three sections, which are described below:

(a) a context section;

(b) a default transitions section; and (c) a states section.

Context section: The developer of the skill bot 116 can define variables that are used in a conversation flow in the context section. Other variables that may be named in the context section include, for instance: variables for error handling, variables for built-in or custom entities, user variables that enable the skill bot 116 to recognize and persist user preferences, or the like.

Default transitions section: Transitions for a skill bot 116 can be defined in the dialog flow states section or in the default transitions section. The transitions defined in the default transition section act as a fallback and get triggered when there are no applicable transitions defined within a state, or when the conditions required to trigger a state transition cannot be met. The default transitions section can be used to define routing that allows the skill bot 116 to gracefully handle unexpected user actions.

States section: A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states section. For example, there might be times when it is desirable to provide users the option to temporarily leave a first skill they are engaged with to do something in a second skill within the digital assistant 106. For example, if a user is engaged in a conversation with a shopping skill (e.g., the user has made some selections for purchase), the user may want to jump to a banking skill (e.g., the user may want to ensure that the user has enough money for the purchase) and then return to the shopping skill to complete the user's order.

To address this, the states section in the dialog flow definition of the first skill can be configured to initiate an interaction with the second different skill in the same digital assistant and then return to the original dialog flow.

(6) Adding custom components to the skill bot 116: As described above, states specified in a dialog flow for a skill bot 116 name components that provide the functionality needed corresponding to the states. Components enable a skill bot 116 to perform functions. In certain embodiments, the DABP 102 provides a set of preconfigured components for performing a wide range of functions. A developer can select one of more of these preconfigured components and associate them with states in the dialog flow for a skill bot 116. The developer can also create custom or new components using tools provided by the DABP 102 and can associate the custom components with one or more states in the dialog flow for a skill bot 116.

(7) Testing and deploying the skill bot 116: The DABP 102 may provide several features that enable the developer to test a skill bot 116 being developed. The skill bot 116 can then be deployed and included in a digital assistant 106.

While the above describes how to create a skill bot 116, similar techniques may also be used to create a digital assistant 106 or a master bot 114. At the master bot level, or the digital assistant level, built-in system intents may be configured for the digital assistant 106. In some embodiments, these built-in system intents are used to identify general tasks that the master bot 114 can handle without invoking a skill bot 116. Examples of system intents defined for a master bot 114 include: (1) Exit: applies when the user signals the desire to exit the current conversation or context in the digital assistant; (2) Help: applies when the user asks for help or orientation; and (3) UnresolvedIntent: applies to user input that does not match well with the Exit and Help intents. The master bot 114 may store information about the one or more skill bots 116 associated with the digital assistant 106. This information enables the master bot 114 to select a particular skill bot 116 for handling an utterance or, in the alternative, to determine that the utterance is unrelated to any skill bot 116 of the digital assistant 106.

When a user inputs a phrase or utterance to the digital assistant 106, the master bot 114 is configured to perform processing to determine how to route the utterance and the related conversation. The master bot 114 determines this using a routing model, which can be rules-based, ML-based, or a combination thereof. The master bot 114 uses the routing model to determine whether the conversation corresponding to the utterance is to be routed to a particular skill bot 116 for handling, is to be handled by the digital assistant 106 or master bot 114 itself per a built-in system intent, is to be handled as a different state in a current conversation flow, or is unrelated to any of the skill bots 116 associated with the digital assistant 106.

In certain embodiments, as part of this processing, master bot 114 determines if the input utterance explicitly identifies a skill bot 116 using its invocation name. If an invocation name is present in the input utterance, then it is treated as an explicit invocation of the skill bot 116 corresponding to the invocation name. In such a scenario, the master bot 114 may route the input utterance to the explicitly invoked skill bot 116 for further handling. If there is no specific or explicit invocation, in certain embodiments, the master bot 114 evaluates the input utterance and computes confidence scores (e.g., using a logistic regression model) for the system intents and the skill bots 116 associated with the digital assistant 106. The score computed for a skill bot 116 or system intent represents how likely the input utterance is representative of a task that the skill bot 116 is configured to perform or is representative of a system intent. Any system intent or skill bot 116 with an associated computed confidence score exceeding a threshold value may be selected as a candidate for further evaluation. The master bot 114 then selects, from the identified candidates, a particular system intent or a skill bot 116 for further handling of the input utterance. In certain embodiments, after one or more skill bots 116 are identified as candidates, the intents associated with those candidate skill bots 116 are evaluated, such as by using the trained model for each skill bot 116, and confidence scores are determined for each intent. In general, any intent that has a confidence score exceeding a threshold value (e.g., 70%) is treated as a candidate intent. If a particular skill bot 116 is selected, then the input utterance is routed to that skill bot 116 for further processing. If a system intent is selected, then one or more actions are performed by the master bot 114 itself according to the selected system intent.

Figure 2:
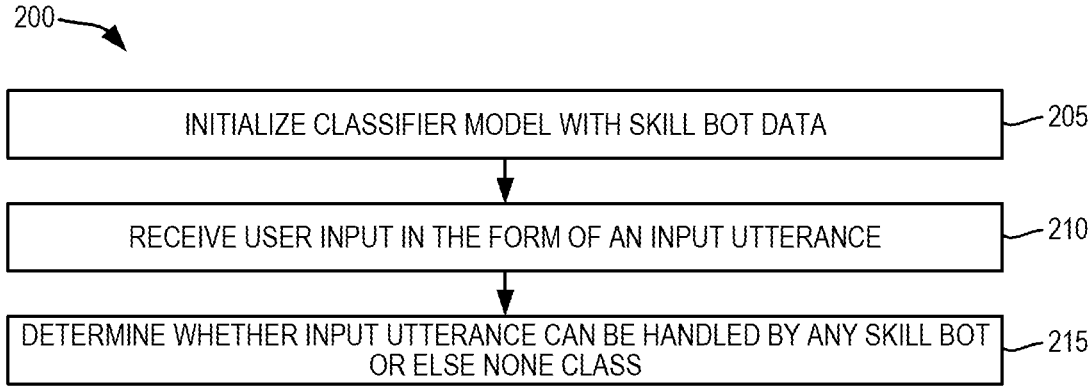
FIG. 2 is a flow diagram of a method configuring and using a master bot to direct input utterances to skill bots and, when applicable, to determine that certain input utterances are unrelated to available skill bots, according to some embodiments described herein.

Some embodiments of a master bot 114 described herein are configured not only to direct an input utterance to a suitable skill bot 116 if applicable, but also to determine when an input utterance is unrelated to the available skill bots 116, and unrelated input utterances prompt some indication of unrelatedness. FIG. 2 is a flow diagram of a method 200 of configuring and using a master bot 114 to direct input utterances to skill bots 116 and, when applicable, to determine that certain input utterances are unrelated to available skill bots 116, according to some embodiments described herein. The method 200 of FIG. 2 is a general overview of which various specific instances will be described in detail below.

The method 200 depicted in FIG. 2, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 200 is intended to be illustrative and non-limiting. Although FIG. 2 depicts various activities occurring in a particular sequence or order, this is not intended to be limiting. In certain embodiments, for instance, the activities may be performed in a different order, or one or more activities of the method 200 may be performed in parallel. In certain embodiments, the method 200 may be performed by a training system and by a master bot 114.

As shown in FIG. 2, at block 205 of the method 200, a classifier model of a master bot 114 is initialized. In some embodiments, the classifier model is configured to determine whether an input utterance is unrelated to any available skill bots 116. Additionally, in some embodiments, the classifier model may also be configured to route the input utterance to a suitable skill bot 116 for processing if the input utterance is deemed relevant to a skill bot 116.

In some embodiments, initialization of the classifier model may include teaching the classifier model how to recognize unrelated input utterances. To this end, a training system, which may be part of the DABP 102, may have access to training utterances (i.e., example utterances) for each skill bot 116. The training system may generate a respective training feature vector describing and representing each training utterances of the various skill bots 116 that are or will be available to the master bot 114. Each training feature vector is a feature vector of the corresponding training utterances. The training system may then generate various set representations from the training feature vectors.

Each set representation may be a representation of a collection of training feature vectors; for instance, such a collection may be a cluster or a composite feature vector as described in detail below. To initialize the classifier model, the training system may configure the classifier model to compare input vectors to the various set representations that represent collections of training feature vectors.

At block 210, the master bot 114 receives user input 110 in the form of an input utterance. For instance, a user may have typed the input utterance as a user input 110, or the user may have spoken a user input 110, which the digital assistant 106 converted to an input utterances. The input utterance may include a user request to be handled by the digital assistant 106 and, thus, by the master bot 114.

At block 215, the master bot 114 utilizes the classifier model to determine whether the input utterance can be handled by any skill bot 116 associated with the master bot 114. In some embodiments, the classifier model of the master bot 114 generates an input feature vector describing and representing the input utterance. The classifier model may compare the input feature vector to the set representations of the training feature vectors, and based on this comparison, the classifier model determines whether the input utterance is unrelated to any skill bots 116 available to the master bot 114 (i.e., skill bots 116 whose training utterances are represented in the set representations).

Examples of Classification at Digital Assistant or Skill Bot Level

Figure 3:
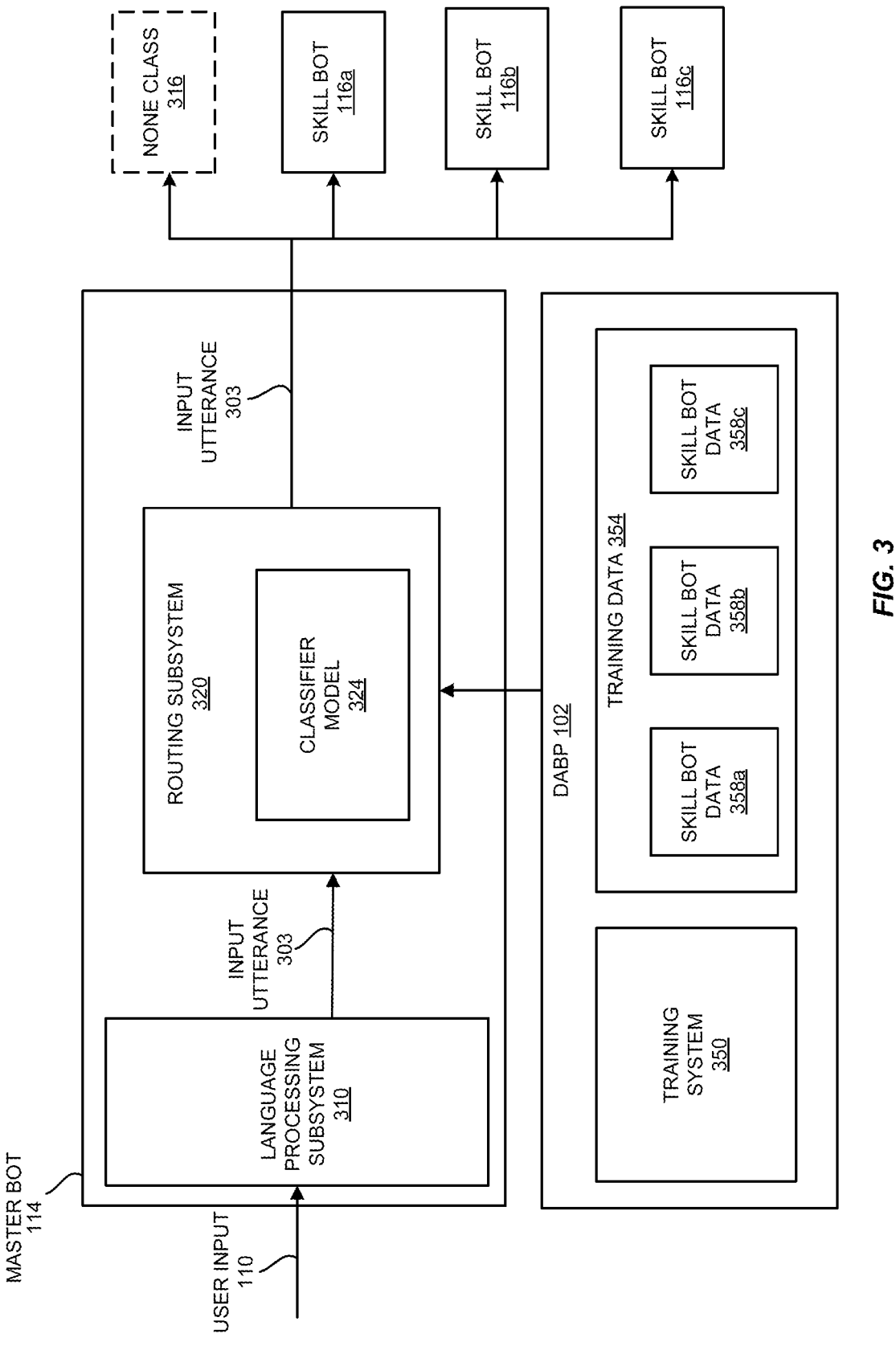
FIG. 3 is a block diagram of a master bot configured to determine whether an input utterance is unrelated to the available skill bots, according to certain embodiments described herein.

FIG. 3 is a block diagram of a master bot 114, also referred to as a master bot (MB) system, according to certain embodiments described herein. The master bot 114 can be implemented in software only, hardware only, or a combination of hardware and software. In some embodiments, the master bot 114 includes a preprocessing subsystem 310, and a routing subsystem 320. The master bot 114 depicted in FIG. 3 is merely an example of an arrangement of components in a master bot 114. One of ordinary skill in the art would recognize many possible variations, alternatives, and modifications. For example, in some implementations, the master bot 114 may have more or fewer systems or components than those shown in FIG. 3, may combine two or more subsystems, or may have a different configuration or arrangement of subsystems.

In some embodiments, the language processing subsystem 310 is configured to process a user input 110 provided by a user. Such processing can include, for instance, using automated speech recognition or some other tool to translate the user input 110 to a textual input utterance 303 if the user input is in audio form or in some other form that is not text.

In some embodiments, the routing subsystem 320 is configured to determine (a) whether the input utterance 303 is unrelated to any available skill bot 116 and, (b) if the input utterance 303 is related to at least one skill bot 116, which skill bot 116 is most suitable to handle to the input utterance 303. In particular, the classifier model 324 of the routing subsystem 320 may be rule-based or ML-based, or a combination thereof, and may be configured to determine whether the input utterance 303 is unrelated to any available skill bots 116, representative of a particular skill bot 116, or representative of a particular intent that has been configured for a particular skill bot 116. For example, as discussed earlier, a skill bot 116 may be configured with one or more chatbot intents. Each chatbot intent can have its own dialog flow and be associated with one or more tasks that the skill bot 116 can perform. Upon determining that the input utterance 303 is representative of a particular skill bot 116 or intent with which the particular skill bot 116 has been configured, the routing subsystem 320 can invoke the particular skill bot 116 and communicate the input utterance 303 as input 335 for the particular skill bot 116. However, if an input utterance 303 is deemed unrelated to any available skill bot 116, then the input utterance 303 is deemed to belong to a none class 316, which is a class of utterances that cannot be handled by the available skill bots. In that case, the digital assistant 106 may indicate to the user that the input utterance 303 cannot be handled.

In some embodiments, the classifier model 324 can be implemented using a rule-based or ML-based model, or both. For instance, in some embodiments, the classifier model 324 may include a rules-based model trained on training data 354 that includes examples utterances, such that the rules-based model is used to determine whether an input utterance is unrelated to any available skill bot 116 (i.e., any skill bot 116 associated with the digital assistant 106). Additionally or alternatively, in some embodiments, the classifier model 324 may include a neural network trained on the training data 354. The training data 354 may include, for each skill bot 116, a corresponding set of example utterances (e.g., two or more example utterances for each intent with which the skill bot 116 is configured). For instance, in the example of FIG. 3, the available skill bots 116 include a first skill bot 116*a*, a second skill bot 116*b*, and a third skill bot 116*c*, and the training data 354 includes respective skill bot data for each such skill bot 116, including first skill bot data 358*a* corresponding to the first skill bot 116*a*, second skill bot data 358*b* corresponding to the first skill bot 116*b*, and third skill bot data 358*c* corresponding to the first skill bot 116*c*. The skill bot data for a skill bot 116 may include training utterances (i.e., example utterances) that are representative of utterances that can be handled by that skill bot 116 in particular; thus, the training data 354 includes training utterances for each of the various skill bots 116. A training system 350, which may but need not be incorporated into the DABP 102, may use the training data 354 to train the classifier model 324 of the master bot 114 to perform these tasks.

In some embodiments, the training system 350 uses the training data 354 to train the classifier model 324 to determine whether an input utterance is unrelated to any available skill bot 116. Generally, the training system 350 may generate training feature vectors to describe and represent the training utterances in the training data 354. As described in detail below, the training system 350 may generate set representations, with each set representation being a representation of a collection of the training feature vectors. After training and during operation, the classifier model 324 may compare an input utterance 303 to the set representations to determine whether the input utterance 303 is unrelated to any available skill bot 116.

In some embodiments, the classifier model 324 includes one or more sub-models, each sub-model configured to perform various tasks related to classifying the input utterance 303. Additionally or alternatively to the above, for instance, the classifier model 324 may include an ML-model or other type of model configured to determine which skill bot 116 is most suitable for the input utterance in a case where the input utterance 303 is deemed related (i.e., not unrelated) to at least one available skill bot 116. In some embodiments, the classifier model 324 may determine the most suitable skill bot 116 while determining that the input utterance is related to at least one skill bot 116, and in that case, no further determination need be made to identify the most suitable skill bot 116. Alternatively, however, the classifier model 324 may determine (e.g., using a logistic regression model), for each skill bot 116, an associated confidence score indicating the likelihood that the skill bot 116 is most suitable for processing (i.e., is a best match for) the input utterance 303. To this end, a neural network included in the classifier model 324 may be trained by the training system to determine the likelihood that an input utterance 303 is representative of each skill bot 116 or of one of the intents that have been configured for the skill bots 116. For instance, the neural network may determine and output a respective confidence score associated with each skill bot 116, where a confidence score for a skill bot indicates the likelihood that the skill bot 116 can handle the input utterance 303 or is the best available skill bot 116 for handling the input utterance. Given the confidence scores, the routing subsystem 320 may then select the skill bot 116 associated with the highest confidence score and may route the input utterance 303 to that skill bot 116 for processing.

Figure 4:
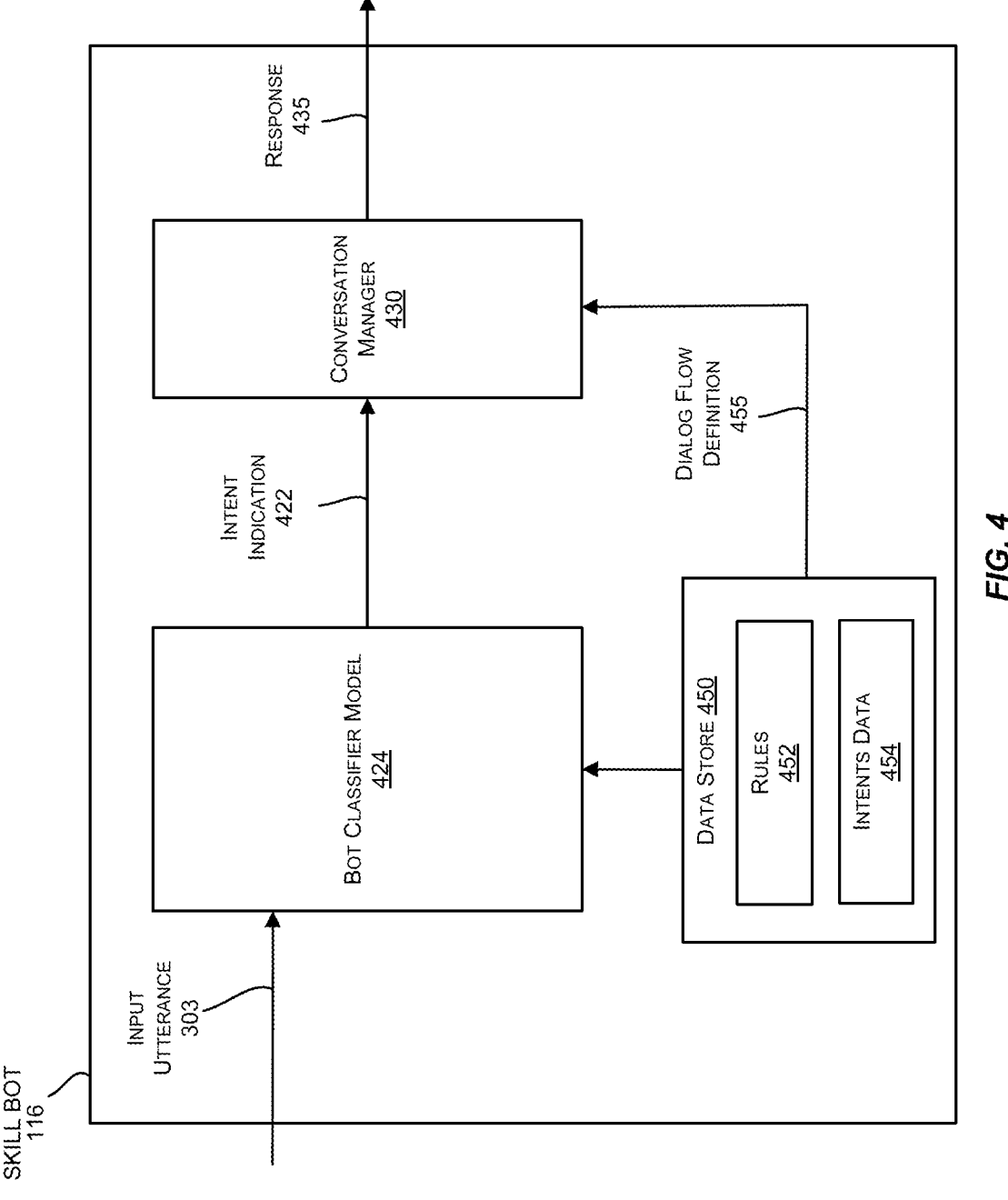
FIG. 4 is a diagram of a skill bot, according to certain embodiments described herein.

FIG. 4 is a diagram of a skill bot 116, also referred to as a skill bot system, according to certain embodiments described herein. An instance of the skill bot 116 shown in FIG. 4 can be used as a skill bot 116 in FIG. 1 and can be implemented in software only, hardware only, or a combination of hardware and software. As shown in FIG. 4, the skill bot 116 can include a bot classifier model 424, which determines an intent of the input utterance 303, and a conversation manager 430, which generates a response 435 based on the intent.

The bot classifier model 424 can be implemented using a rules-based or ML-based model, or both, and can take as input the input utterance 303 routed to the skill bot 116 by the master bot 114. The bot classifier model 424 may access rules 452 and intents data 454 in a data store 450 on the skill bot 116 or otherwise accessible to the skill bot 116. For instance, the intents data 454 may include example utterances or other data for each intent, and the rules 452 may describe how to use the intents data to determine an intent for the input utterance 303. The bot classifier model 424 may apply those rules to the input utterance 303 and the intents data 454 to determine an intent of the input utterance 303.

More specifically, in some embodiments, the bot classifier model 424 may operate in a similar manner to that by which the classifier model 324 in FIG. 3 determines a skill bot 116 to handle an input utterance 303. For instance, the bot classifier model 424 may determine (e.g., using a logistic regression model) and may assign a respective confidence level to each chatbot intent for which the skill bot 116 is configured, similar to the manner in which the classifier model 324 may assign confidence levels to skill bots 116, such that a confidence level indicates the likelihood that a respective chatbot intent is the most likely to be applicable to the input utterance 303. The bot classifier model 424 may then select the intent having to which the highest confidence level is assigned. In additional or alternative embodiments, the bot classifier model 424 determines an intent for the input utterance 303 by comparing an input feature vector describing the input utterance 303 to either or both of (a) composite feature vectors, including one composite feature vector to represent the training feature vectors for a respective intent, or (b) clusters of training feature vectors, with each cluster representing an intent or multiple intents. The use of feature vectors in this manner will be described in more detail below.

Upon identifying an intent that the utterance 202 best represents, the bot classifier model 424 may communicate an intent indication 422 (i.e., an indication of the identified intent) to the conversation manager 430. In the embodiment of FIG. 4, the conversation manager 430 is shown as being local to the skill bot 116. However, the conversation manager 430 can be shared with the master bot 114 or across multiple skill bots 116. Accordingly, in some embodiments, the conversation manager 430 is local to a digital assistant or master bot 114.

In response to receiving the intent indication 422, the conversation manager 430 may determine an appropriate response 435 to the utterance 202. For example, the response 435 could be an action or message specified in a dialog flow definition 455 configured for the skill bot 116 system 400, and the response 435 may be used as a DA responses 112 in the embodiment of FIG. 1. For instance, the data store 450 may include various dialog flow definitions, including a respective dialog flow definition for each intent, and the conversation manager 430 may access the dialog flow definition 455 based on identification of the intent corresponding to that dialog flow definition 455. Based on the dialog flow definition 455, the conversation manager 430 may determine a dialog flow state as being the next state to transition to according to the dialog flow definition 455. The conversation manager 430 may determine the response 435 based on further processing of the input utterance 303. For example, if the input utterance 303 is "Check balance in savings," then the conversation manager 430 may transition to a dialog flow state in which a dialog relating to the user's savings account is presented to the user. The conversation manager 430 may transition to this state based on the intent indication 422 indicating that the identified intent is a "CheckBalance" intent configured for the skill bot 116 and further based on recognizing that a value of "saving" has been extracted for an "Account_Type" entity.

Using Feature Vectors to Describe Utterances

As mentioned above, the classifier model 324 may use feature vectors when determining whether an input utterances if unrelated, or related, any available skill bots 116. For the purposes of this disclosure, a feature vector is a vector, or set of coordinates, that describes the features of an utterance and, thus, describes the utterance itself. A feature vector describing an utterance may be used to represent the utterance in certain circumstances, as described herein.

The concept of a feature vector is based on the concept of word embeddings. Generally, word embedding is a type of language modeling wherein words are mapping to corresponding vectors. A particular word embedding may map words that semantically similar to similar regions of a vector space, such that similar words are close together in the vector space and dissimilar words are far apart. A simple example of a word embedding uses a "one hot" encoding, in which each word in a dictionary is mapped to a vector with a quantity of dimensions equal to the size of the dictionary, such that the vector has a value of 1 in a dimension corresponding to the word itself and a value of zero in all other dimensions. For example, the first two words of the sentence "Go intelligent bot service artificial intelligence, Oracle" could be represented using the following "one hot" encoding:

| word | go | intelligent | bot | service | artificial | intelligence | oracle |
|------|----|-----|-----|---------|-----------|--------------|--------|
| Go | 1 | 0 | 0 | 0 | 0 | 0 | 0 |
| Intelligent | 0 | 1 | 0 | 0 | 0 | 0 | 0 |
| . . . | . . . | . . . | . . . | . . . | . . . | . . . | . . . |

Feature vectors can be used to represents words, sentences, or various types of phrases. Given the above simple example of a word embedding, a corresponding feature vector might map a series of words, such as an utterance, to a feature vector that is an aggregate of the word embeddings of the words in the series. That aggregate may be, for instance, a sum, an average, or a weighted average.

For utterances that are different from each other, in that such utterances include words that have very different semantic meanings, the respective feature vectors may differ as well. However, utterances that are semantically similar, and thus include words that are the same across the utterances or are semantically similar across the utterances, may have similar feature vectors (i.e., feature vectors positioned close to each other in the vector space). Each feature vector corresponds to a single point within a vector space, also referred to as a feature space, where that point is the origin of the feature space plus the feature vector. In some embodiments, points for utterances that are similar to each other semantically are located close to each other. Throughout this disclosure, a feature vector and its corresponding point will be referred to interchangeably because the two provide different visuals for the same information.

Example Method to Initialize a Classifier Model of a Master Bot

Figure 5:
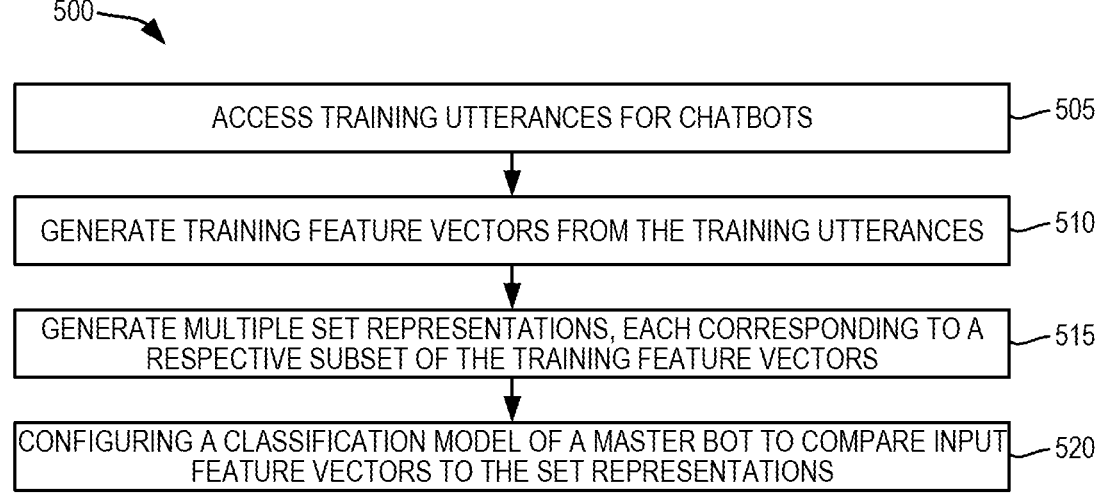
FIG. 5 is a flow diagram of a method of initializing a classifier model of a master bot to determine whether input utterances are unrelated to the available skill bots, according to some embodiments described herein.

In some embodiments, the classifier model 324 of the master bot 114 utilizes feature vectors of training utterances as a basis for determining whether an input utterance is unrelated, or related, to any available skill bots 116. FIG. 5 is a diagram of a method 500 of initializing a classifier model 324 of a master bot 114 to perform this task, according to some embodiments described herein. For instance, this method 500 or similar may be performed at block 205 of the method 200 for configuring and using a master bot 114 to route input utterances 303. FIG. 5 is a general method 500, for which instances that are more detailed are shown and described with reference to FIG. 14 and FIG. 18.

The method 500 depicted in FIG. 5, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 500 is intended to be illustrative and non-limiting. Although FIG. 5 depicts various activities occurring in a particular sequence or order, this is not intended to be limiting. In certain embodiments, for instance, the activities may be performed in a different order, or one or more activities of the method 500 may be performed in parallel. In certain embodiments, the method 500 may be performed by a training system 350, which may be part of a DABP 102.

At block 505, the training system 350 accesses training utterances, also referred to as example utterances, for the various skill bots 116 associated with the master bot 114. For instance, the training utterances may be stored as skill bot data in the training data 354 accessible to the training system 350. In some embodiments, each skill bot 116 available to the master bot 114 may be associated with a subset of training utterances, and each subset of such training utterances may include training utterances for each intent for which the skill bot 116 is configured. Thus, the full set of training utterances may include training utterances for each intent of each skill bot 116, such that every intent of every skill bot 116 is represented.

At block 510, the training system 350 generates training feature vectors from the training utterances accessed at block 505. As described above, the training utterances may include a subset associated with each skill bot 116 and, further, may include training utterances for each intent of each skill bot 116. Thus, in some embodiments, the training feature vectors may include a respective subset for each skill bot 116 and, further, may include respective feature vectors for each intent of each skill bot.

Figure 6:
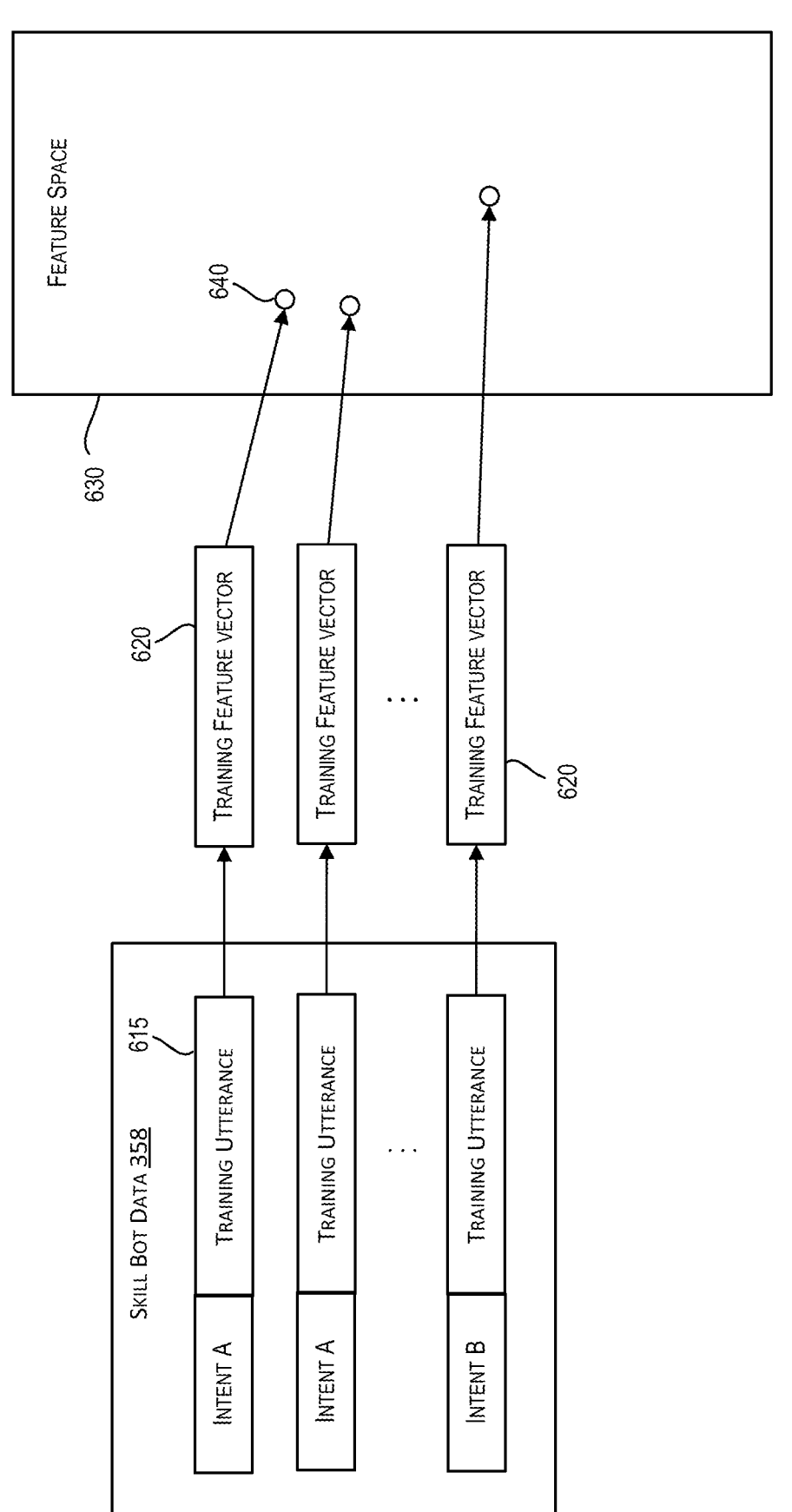
FIG. 6 illustrates generation of training feature vectors from training utterances used to train the classifier model, according to some embodiments described herein.

FIG. 6 illustrates the generation of training feature vectors 620 from training utterances 615, according to some embodiments described herein. Specifically, FIG. 6 relates to the training utterances 615 of skill bot data 358 in the training data 354, where the skill bot data 358 is associated with a particular skill bot 116. That skill bot 116 is configured to handle input utterances 303 of multiple intents, which include Intent A and Intent B, and thus, the training utterances 615 include training utterances 615 representative of Intent A as well as training utterances 615 representative of Intent B.

As described above, the training system 350 may generate a training feature vector 620 to describe and represent each respective training utterance 615. Various techniques are known for converting a sequence of words, such as a training utterance 615, into a feature vector, such as a training feature vector 620, and one or more of such techniques may be used. For instance, the training system 350 may, but need not, use a one-hot encoding or some other encoding to encode each training utterance 615 as a corresponding training feature vector 620.

As also described above, a feature vector can be represented as a point. In some embodiments, each training feature vector 620 can be represented as a point 640 in feature space 630, where the feature space has a number of dimensions equal to the number of features (i.e., the number of dimensions) in the training feature vectors 620. In the example of FIG. 6, the two training feature vectors 620 representative of the same intent, specifically Intent A, are plotted as points 640 that are close together, due to these two training feature vectors 620 being semantically similar. However, it is not required that all training feature vectors 620, or all feature vectors, for a particular intent be represented as points that are close to one another.

Returning to FIG. 5, at block 515, the training system 350 generates multiple set representations of the training feature vectors 620 generated at block 510, where each set representation represents a set of the training feature vectors 620. As described in detail below, a set representation can be, for example, a cluster of training feature vectors 620 or a composite feature vector that is an aggregate of multiple training feature vectors 620. Essentially, a set representation may be a manner of representing multiple training feature vectors 620 that have been grouped together. Each set of training feature vectors represented in a corresponding set representation may share a common intent, a common group of intents, a common skill bot 116, or a common region of the feature space 630, or alternatively, the training feature vectors represented in a single set representation need not have any commonality other than being based on the training data 354.

At block 520, the training system 350 may configure the classifier model 324 to compare input utterances 303, provided as user inputs 110, to the various set representations. For instance, the set representations may be stored on a storage device that is accessible to the classifier model 324 of the master bot 114, and the classifier model 324 may be programmed with rules for how to determine whether an input utterances matches, or fails to match, the various set representations. The definition of matching may be dependent on the specific set representations being used, as will be described below in more detail.

Figure 7:
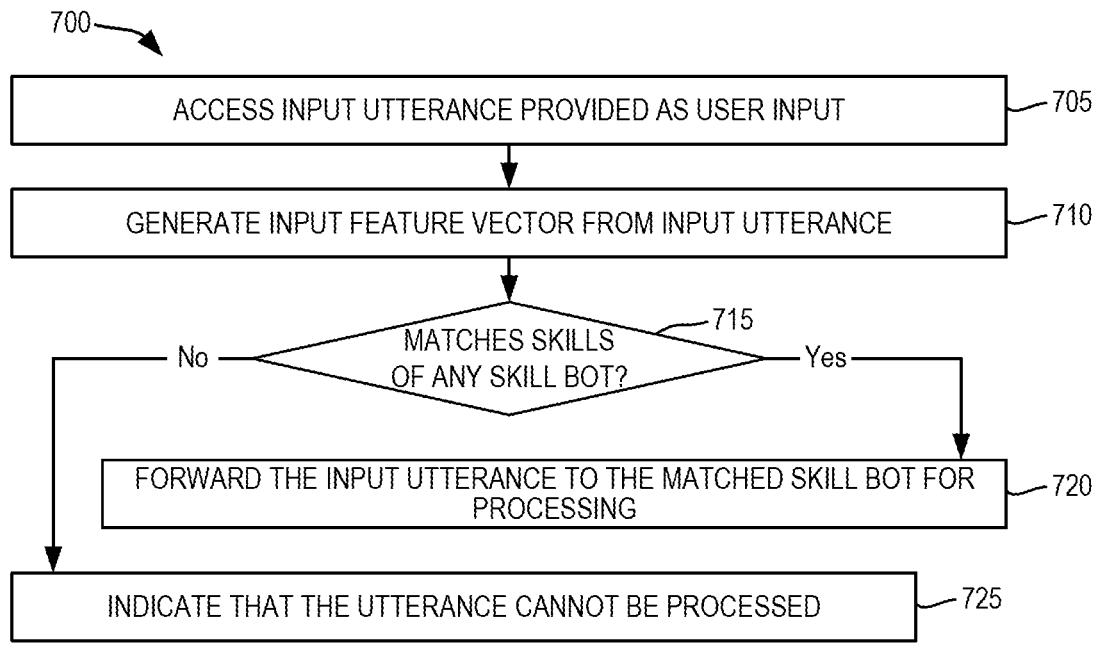
FIG. 7 is a flow diagram of an example of a method of using the classifier model of the master bot to determine whether an input utterance is unrelated to any available skill bot associated with the master bot, according to some embodiments described herein.

FIG. 7 is a diagram of a method 700 of using a classifier model 324 of a master bot 114 to determine whether an input utterance 303, provided as user input 110, is unrelated to any available skill bot 116 associated with the master bot 114, according to some embodiments described herein. This method 700 or similar may be performed after initialization of the classifier model 324 and, further, for each input utterance 303 received. For instance, this method 700 or similar may be performed at block 215 of the method 200 for configuring and using a master bot 114 to route input utterances 303. FIG. 7 is a general method 700, for which instances that are more detailed are shown and described with reference to FIG. 16 and FIG. 21.

The method 700 depicted in FIG. 7, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 700 is intended to be illustrative and non-limiting. Although FIG. 7 depicts various activities occurring in a particular sequence or order, this is not intended to be limiting. In certain embodiments, for instance, the activities may be performed in a different order, or one or more activities of the method 700 may be performed in parallel. In certain embodiments, the method 700 may be performed by a master bot 114.

At block 705 of the method 700, the master bot 114 accesses an input utterance 303 that has provided as user input 110. For instance, in some embodiments, a user may provide user input 110 in the form of speech input, and the digital assistant 106 may convert that user input 110 into a textual input utterance 303 for use by the master bot 114.

At block 710, the master bot 114 may generate an input feature vector from the input utterance 303 accessed at block 705. The input feature vector may describe and represent the input utterance 303. Various techniques are known for converting a sequence of words, such as an input utterance, into a feature vector, and one or more of such techniques may be used. For instance, the training system 350 may, but need not, use a one-hot encoding or some other encoding to encode the input utterances as a corresponding input feature vector. However, an embodiment of the master bot 114 uses the same technique as was used to generate training feature vectors 620 from training utterances when training the classifier model 324.

At decision block 715, the master bot 114 may cause the classifier model 324 to compare the input feature vector generated at block 710 to the set representations determined at block 515 of the method 500 for initializing the classifier model 324, and as such, the master bot 114 may determine whether the input feature vector matches any skill bots 116 available to the master bot 114. The specific technique for comparing and matching may depend on the nature of the set representations. For instance, as will be described below, if the set representations are clusters of training feature vectors 620, the classifier model 324 may compare the input feature vector (i.e., the point representing the input feature vector) to the clusters to determine whether the input feature vector falls inside any of the clusters and thus matches at least one skill bot 116; or if the set representations are composite vectors of training feature vectors, the classifier model 324 may compare the input feature vector to the composite feature vectors to determine whether the input feature vector is sufficiently similar to any such composite feature vector and thus matches at least one skill bot 116. Various implementations are possible and are within the scope of this disclosure.

If the input feature vector is deemed to match at least one skill bot 116 at decision block 715, then at block 720, the master bot 114 may route the input utterance to a skill bot 116 that the input feature vector is deemed to match. However, if the input feature vector is deemed not to match any skill bot 116 at decision block 715, then at block 725, the master bot 114 may indicate that the utterance cannot be processed by any skill bot 116. This indication may be passed to the digital assistant, which may provide an output to the user that indicates the user input 110 cannot be processed, or handled, by the digital assistant.

FIG. 8 is a diagram of another example of a method 800 of using a classifier model 324 of a master bot 114 to determine whether an input utterance 303, provided as user input 110, is unrelated to any available skill bot 116 associated with the master bot 114, according to some embodiments described herein. This method 800 or similar may be performed after initialization of the classifier model 324 and, further, for each input utterance 303 received. For instance, this method 800 or similar may be performed at block 215 of the method 200 for configuring and using a master bot 114 to route input utterances 303. Like the method 700 of FIG. 7, the method 800 of FIG. 8 is a general method 800, of which more detailed instances of certain method blocks are shown and described with reference to FIG. 16 and FIG. 21. In contrast to the method 700 of FIG. 7, however, this method 800 illustrates a preliminary filtering activity, at decision block 810 and block 815, which can be used to ensure that certain input utterances 303 similar to the training utterances 615 are not classified as belonging to the none class 316. In other words, this method 800 includes a filter that filters from none class consideration any input utterances 303 deemed similar enough to the training utterances 615, thus ensuring that such input utterances 303 are routed to skill bots 116.

The method 800 depicted in FIG. 8, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 800 is intended to be illustrative and non-limiting. Although FIG. 8 depicts various activities occurring in a particular sequence or order, this is not intended to be limiting. In certain embodiments, for instance, the activities may be performed in a different order, or one or more activities of the method 800 may be performed in parallel. In certain embodiments, the method 800 may be performed by a master bot 114.

At block 805 of the method 800, the master bot 114 accesses an input utterance 303 that has provided as user input 110. For instance, in some embodiments, a user may provide user input 110 in the form of speech input, and the digital assistant 106 may convert that user input 110 into a textual input utterance 303 for use by the master bot 114.

At decision block 810, the master bot 114 may cause the classifier model 324 to determine whether all words, or a predetermined percentage of words, in the input utterances 303 accessed at block 805 are found in the training utterances 615. For instance, in some embodiments, the classifier model 324 utilizes a Bloom filter based on the words of the training utterances 615 and applies this Bloom filter to the input utterance 303.

If the input utterance 303 includes only words that are found in the training utterances 615 at decision block 810, then the master bot 114 may determine that input utterance is related to at least one skill bot 116 and thus does not belong to the none class 316. In that case, at block 815, the master bot 114 may route the input utterance 303 to the skill bot 116 most closely matching the input utterance 303. For instance, as described above, the classifier model 324 may be configured assign a confidence score (e.g., using a logistic regression model) to each skill bot 116 for the input utterance. The master bot 114 may select the skill bot 116 having the highest confidence score and may route the input utterance 303 to that skill bot 116.

However, if at decision block 810 the input utterance 303 includes any words not in the training utterances 615, or includes a percentage of words greater than a threshold, then the method 800 proceeds to block 820. At block 820, the master bot 114 may generate an input feature vector from the input utterance 303 accessed at block 805. The input feature vector may describe and represent the input utterance 303. Various techniques are known for converting a sequence of words, such as an input utterance, into a feature vector, and one or more of such techniques may be used. For instance, the training system 350 may, but need not, use a one-hot encoding or some other encoding to encode each training utterance 615 as a corresponding training feature vector 620. However, an embodiment of the master bot 114 uses the same technique as was used to generate training feature vectors 620 from training utterances.

At decision block 825, the master bot 114 may cause the classifier model 324 to compare the input feature vector generated at block 820 to the set representations determined at block 515 of the method 500 for initializing the classifier model 324, and as such, the master bot 114 may determine whether the input feature vector matches any skill bots 116 available to the master bot 114. The specific technique for comparing and matching may depend on the nature of the set representations. For instance, as will be described below, if the set representations are clusters of training feature vectors 620, the classifier model 324 may compare the input feature vector (i.e., the point representing the input feature vector) to the clusters to determine whether the input feature vector falls inside any of the clusters and thus matches at least one skill bot 116; or if the set representations are composite vectors of training feature vectors, the classifier model 324 may compare the input feature vector to the composite feature vectors to determine whether the input feature vector is sufficiently similar to any such composite feature vector and thus matches at least one skill bot 116. Various implementations are possible and are within the scope of this disclosure.

If the input feature vector is deemed to match at least one skill bot 116 at decision block 825, then at block 830, the master bot 114 may route the input utterance to a skill bot 116 that the input feature vector is deemed to match. However, if the input feature vector is deemed not to match any skill bot 116 at decision block 825, then at block 835, the master bot 114 may indicate that the utterance cannot be processed by any skill bot 116. This indication may be passed to the digital assistant, which may provide an output to the user that indicates the user input 110 cannot be processed, or handled, by the digital assistant.

Examples of Types of Clusters Useable by the Classifier Model

As mentioned above, an example type of set representations that can be used by the classifier model 324 are clusters of training feature vectors 620. In general, it can be assumed that an input utterance that can be handled by an available skill bot 116, and is thus related to the available skill bots 116, has some semantic similarity to training utterances 615 for those skill bots 116. Thus, an input utterance 303 that is related to the available skill bots 116 likely can be represented as an input feature vector that is proximate to one or more training utterances 615 in the feature space 630.

Given the proximity of feature vectors of semantically similar utterances, a boundary can be defined to demarcate feature vectors, plotted at points, having a common intent or to separate feature vectors have different intents. In two-dimensional space, the boundary may be a line or a circle, such that points that fall on one side of such as line belong to a first intent class (i.e., correspond to utterances having a first intent) and points that fall on the other side of the line belong to a second intent class. In three dimensions, the boundary can be represented as a plane or a sphere. More generally, in various dimensions, the boundary can be a hyperplane, a hypersphere, or hypervolume. The boundary can have various shapes and need not be completely spherical or symmetrical.

Figure 9:
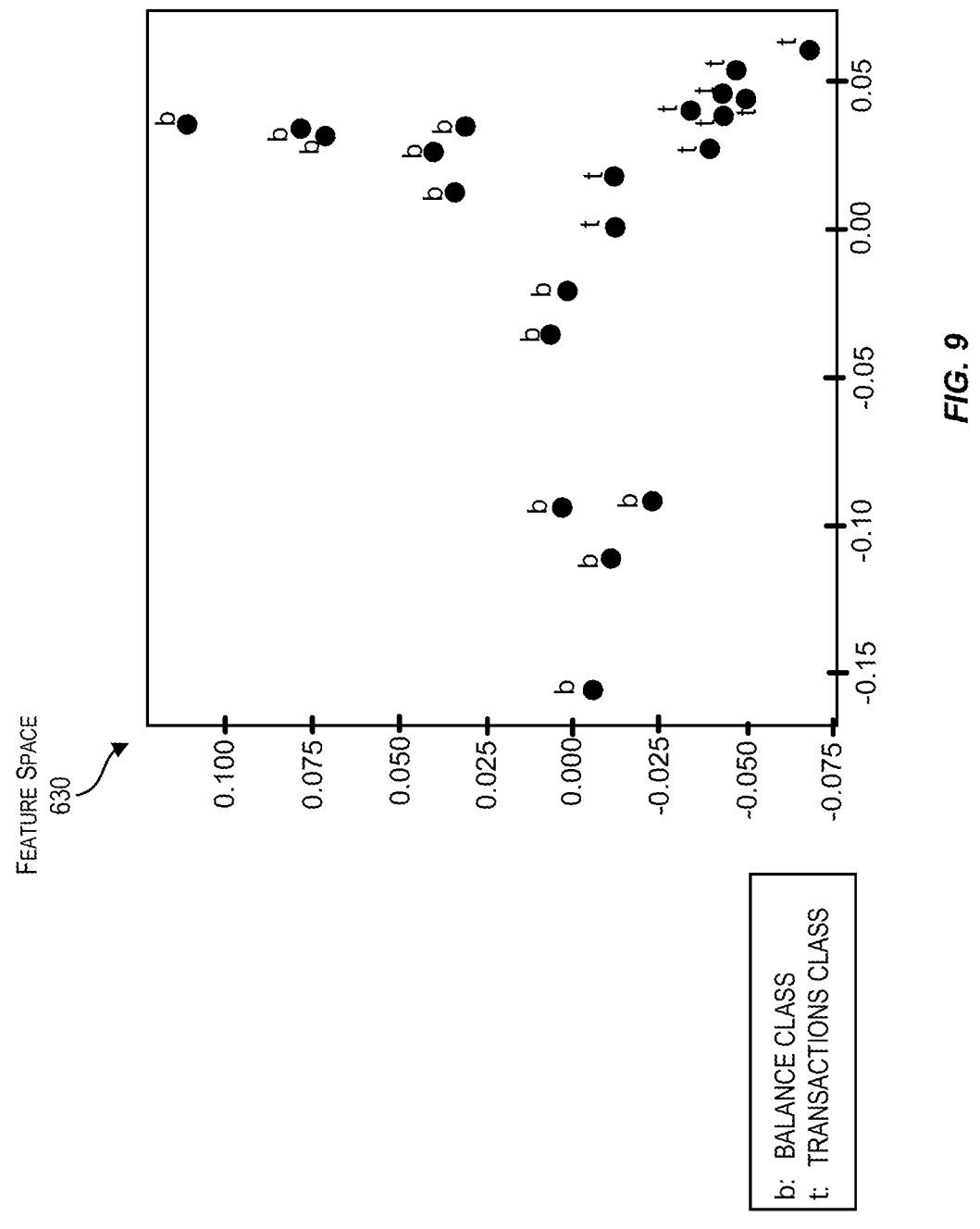
FIG. 9 illustrates an example of a feature space that includes points representing feature vectors of example utterances, according to some embodiments described herein.

FIG. 9 illustrates an example of a feature space 630 that includes points representing feature vectors of example utterances, according to some embodiments described herein. In this example, some of the example utterances belong to a balance class and are representative of a first intent relating to requests for account balance information, and the rest of the example utterances belong to a transactions class and are representative a second intent relating to requests for information about transactions. In FIG. 9, example utterances in the balance class are labeled with a b, and example utterances in the transactions class are labeled with a t. These intent classes could be defined, for example, for a finance-related skill bot 116.

For example, the example utterances in the following table may belong to the balance class, in the first column, and the transactions class, in the second column:

| BALANCE CLASS | TRANSACTIONS CLASS |
|---|---|
| What's the current value of my savings account? | Show my transactions for last weekend. |
| What's the current balance on my cc? | Show me all the checks I sent out last month. |
| Do I have enough money? | Show my last five checks. |
| What do I owe? | Show me my checking account transactions from January to May. |
| How much money do I have in all of my accounts? | Show me my last ten savings account transactions. |
| How much money do I have in checking? | Show my largest transaction in May. |
| Tell me my balance. | How much did I pay Andy last week? |
| How much do I owe on all my credit cards? | How much did I deposit in April? |
| What's my balance? | |
| What's the current balance? | |
| How much money did I save last year? | |
| How much do I have available? | |
| What's my available credit on my card? | |

Figure 10:
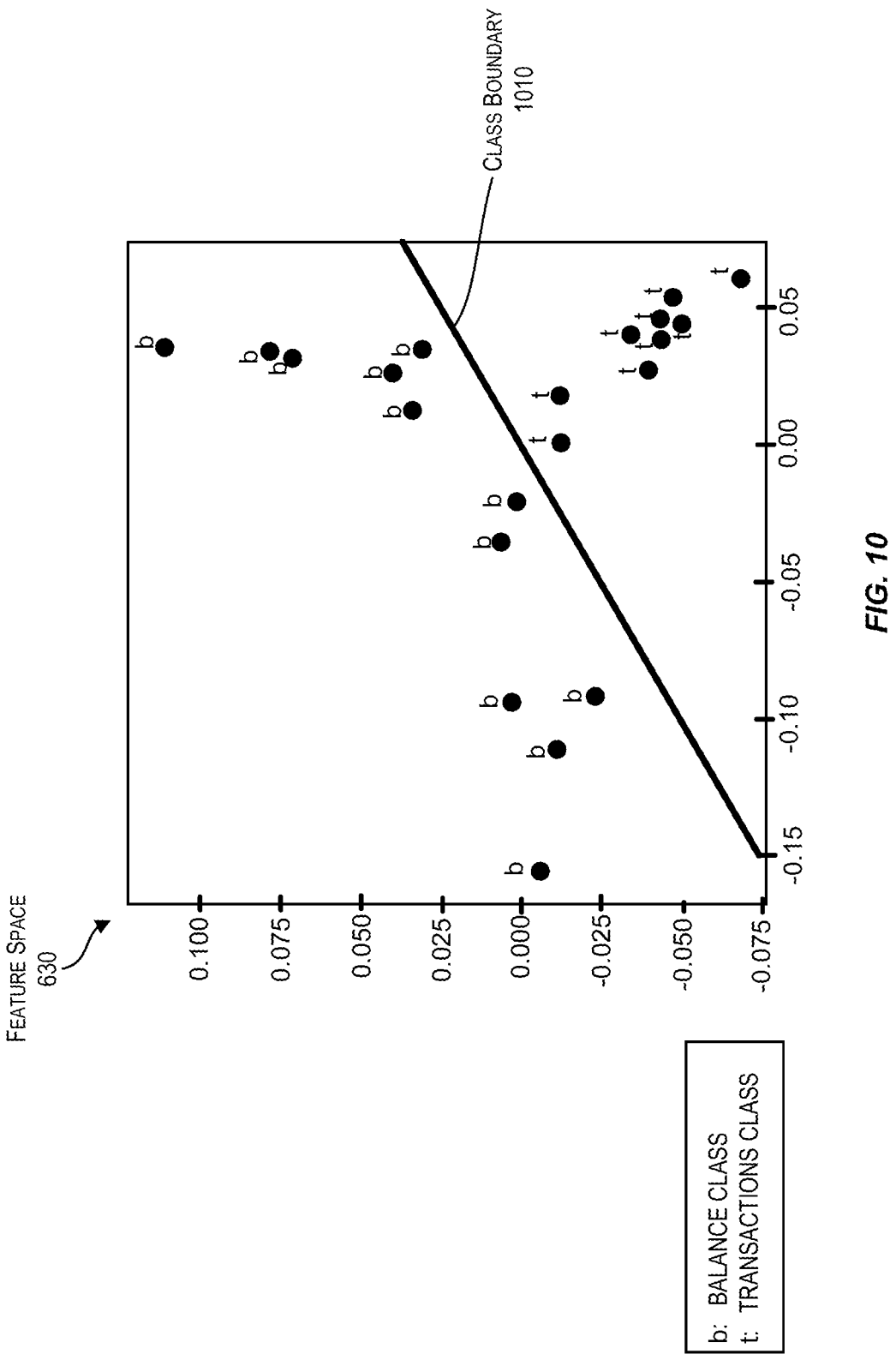
FIG. 10 illustrates an example of the feature space of FIG. 9 having a class boundary between intent classes of the feature vectors of the example utterances, according to some embodiments described herein.

FIG. 10 illustrates an example of the feature space 630 of FIG. 9 having a class boundary 1010 between intent classes of the feature vectors of the example utterances, according to some embodiments described herein. Specifically, as shown in FIG. 10, to separate points (i.e., feature vectors of example utterances) in the balance class from those in the transactions class, a line could be drawn as a class boundary

1010. This class boundary 1010 is a rough approximation of a division between the two intent classes. Creating a more precise boundary 1010 between the intent classes may involve providing circles or other geometric volumes that define clusters of feature vectors, such that each cluster includes only feature vectors within a single corresponding intent class (i.e., having the intent associated with that intent class).

Figure 11:
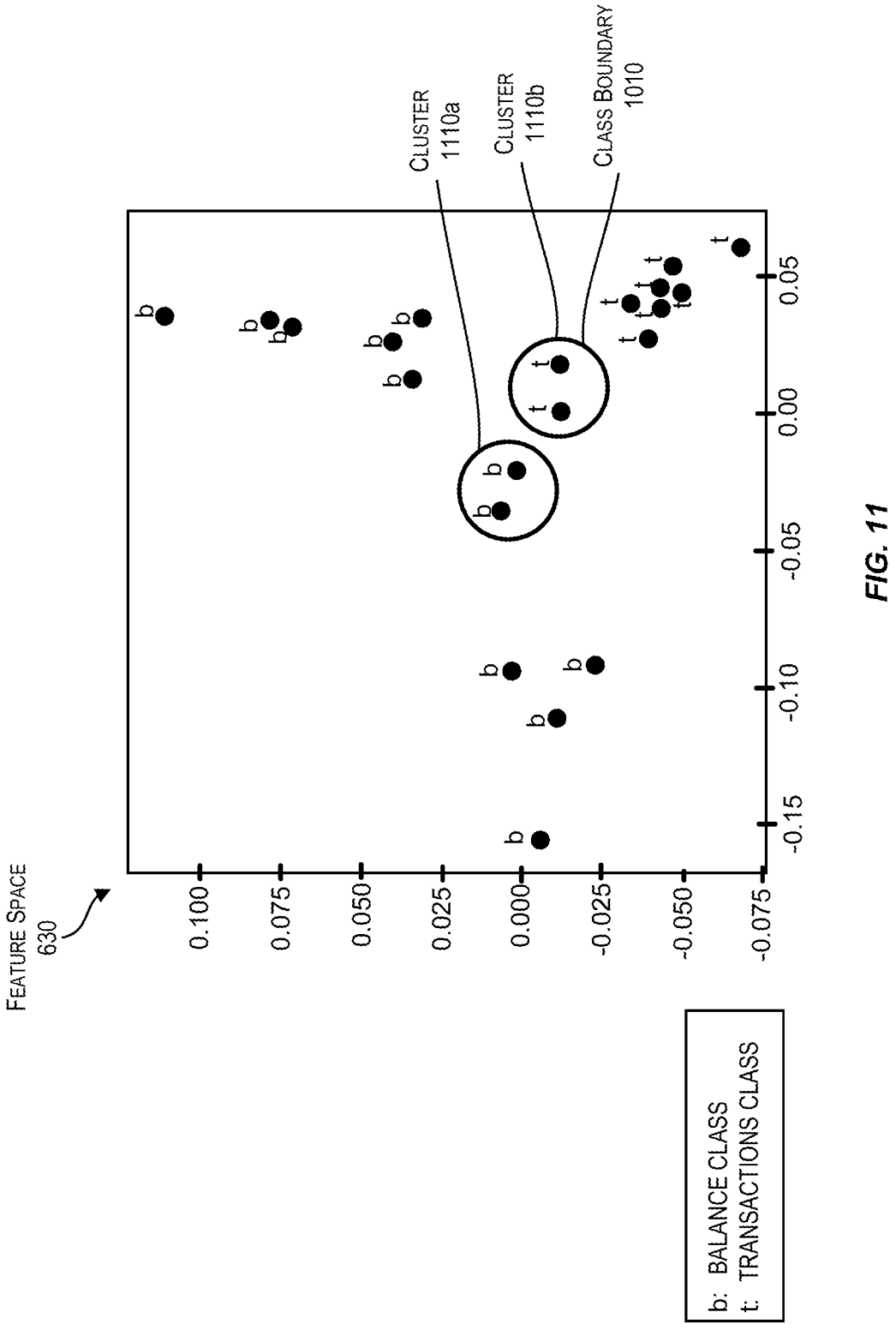
FIG. 11 illustrates an example of the feature space of FIG. 9 having class boundaries separating feature vectors associated with common intents into respective clusters, according to some embodiments described herein.

FIG. 11 illustrates an example of the feature space 630 of FIG. 9 having class boundaries 1010 separating, specifically isolating, feature vectors associated with common intents into respective clusters, according to some embodiments described herein. In this example, as in some embodiments, not all feature vectors of an intent class are within a single cluster, but no cluster includes feature vectors from more than a single intent class. Specifically, in the example shown, a first cluster 1110a defined by a first class boundary 1010 includes only feature vectors in the balance class, and a second cluster 1110b defined by a second class boundary 1010 includes only feature vectors in the transactions class. As described in detail below, some embodiments described herein can form class boundaries 1010 to create clusters such as those shown in FIG. 11.

Figure 12:
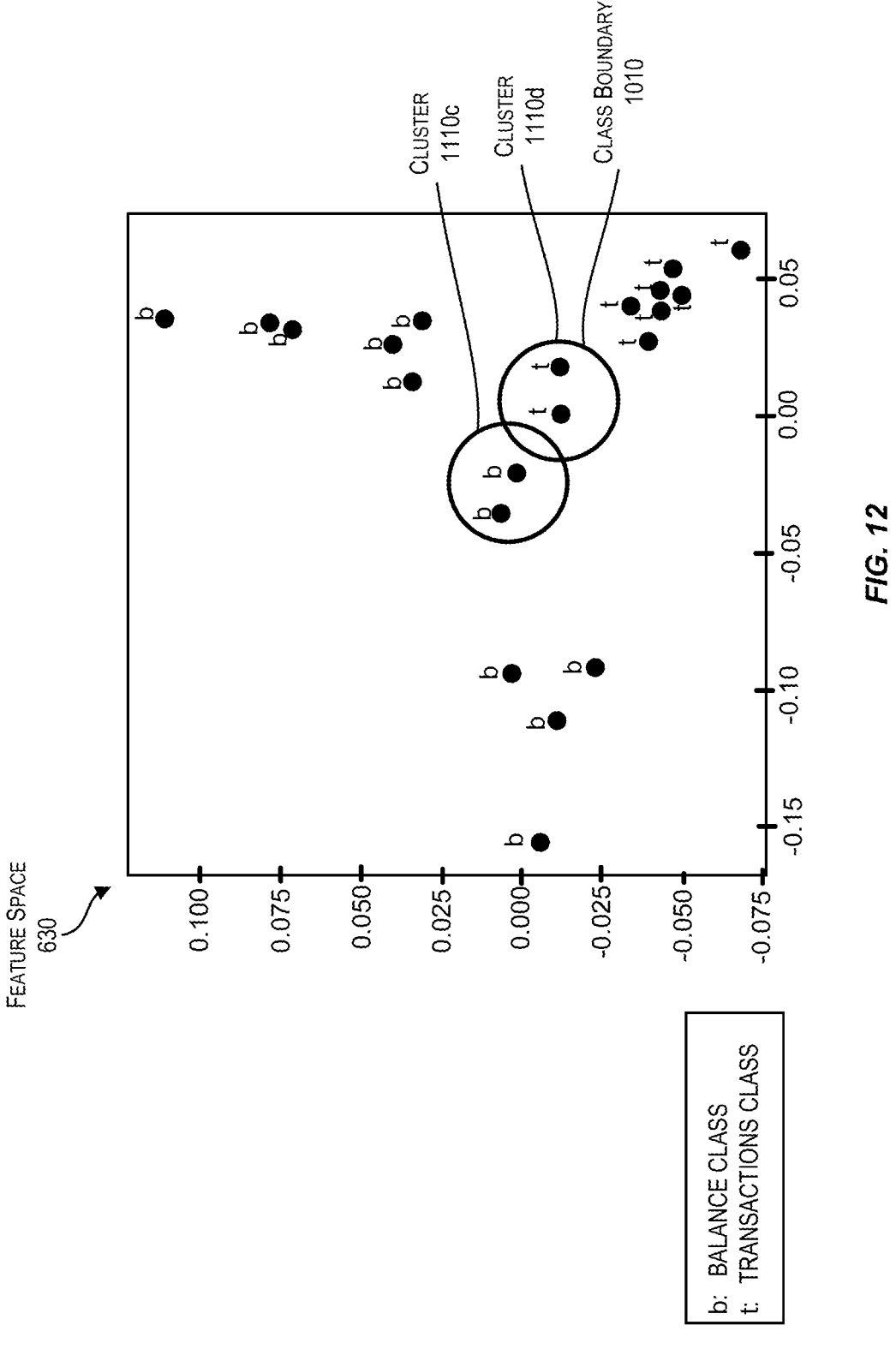
FIG. 12 illustrates an example of the feature space of FIG. 9 having overlapping class boundaries separating feature vectors associated with common intents into respective clusters, according to some embodiments described herein.

FIG. 12 illustrates another example of the feature space 630 of FIG. 9 having class boundaries 1010 separating, specifically isolating, feature vectors associated with common intents into respective clusters, according to some embodiments described herein. In this example, as in some embodiments, not all feature vectors of an intent class are within a single cluster, but no cluster includes feature vectors from more than a single intent class. Specifically, in the example shown, a first cluster 1110c defined by a first class boundary 1010 includes only feature vectors in the balance class, and a second cluster 1110d defined by a second class boundary 1010 includes only feature vectors in the transactions class. In contrast to the example of FIG. 11, however, the class boundaries 1010 and thus the clusters are overlapping. Some embodiments described herein support overlapping clusters as shown in FIG. 12. As described in detail below, some embodiments described herein can form class boundaries 1010 to create clusters such as those shown in FIG. 12.

Figure 13:
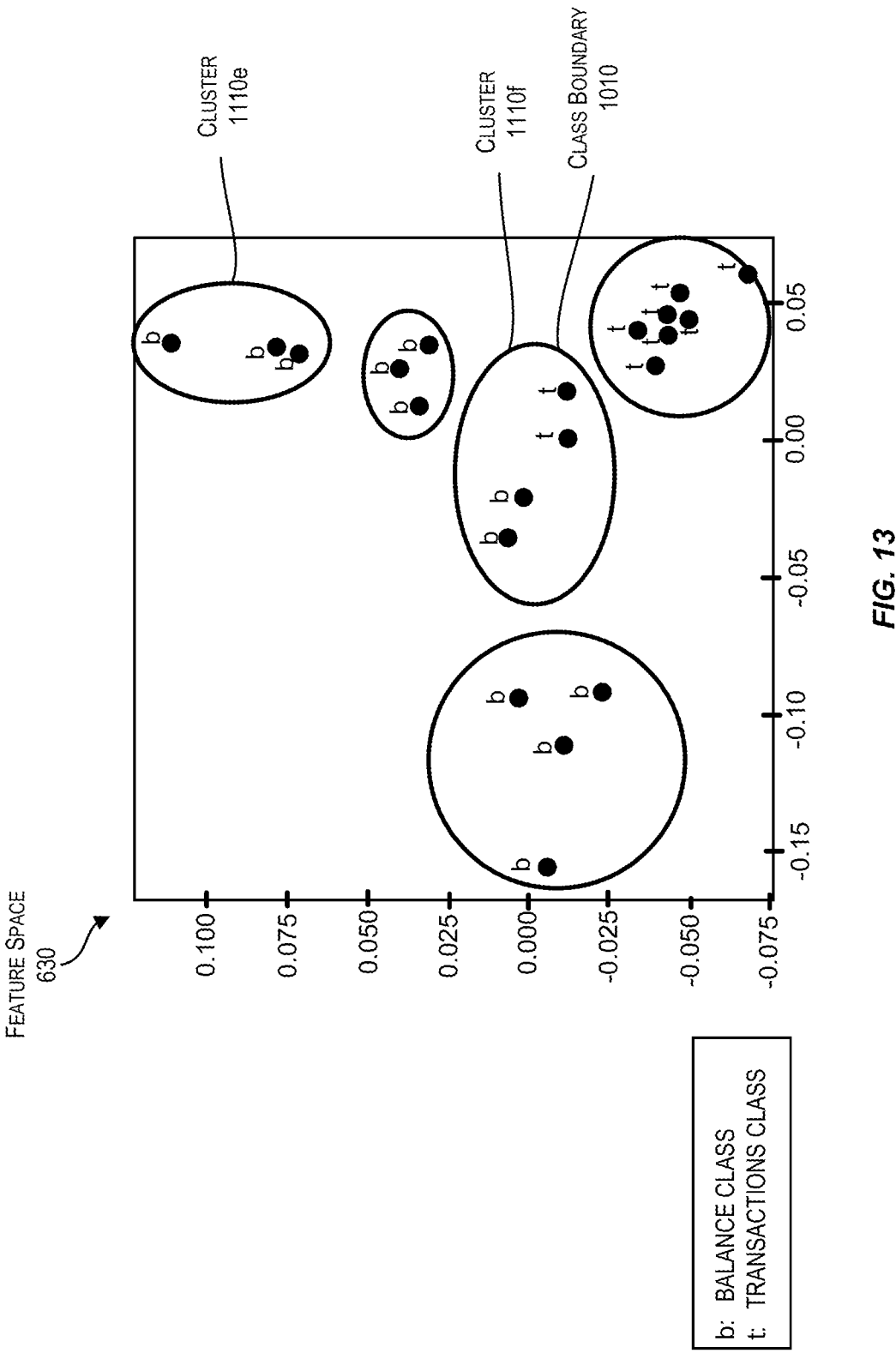
FIG. 13 illustrates another example of the feature space of FIG. 9 having class boundaries separating feature vectors into clusters, according to some embodiments described herein.

FIG. 13 illustrates another example of the feature space 630 of FIG. 9 having class boundaries 1010 separating feature vectors into clusters, according to some embodiments described herein. In this example, as in some embodiments, not all feature vectors of an intent class are within a single cluster, and further, a cluster may represent various intents by including feature vectors with varying intents. Specifically, in the example shown, a first cluster 1110e defined by a first class boundary 1010 includes only feature vectors in the balance class, and a second cluster 1110f defined by a second class boundary 1010 includes some feature vectors in the balance class (i.e., having a balance-related intent) and some feature vectors in the transactions class (i.e., having a transactions-related intent). Some embodiments described herein support clusters with varying intents as shown in FIG. 13. As described in detail below, some embodiments described herein can form class boundaries 1010 to create clusters such as those shown in FIG. 13.

Clustering to Identify Unrelated Input Utterances

FIG. 14 is a diagram of a method 1400 of initializing a classifier model 324 of a master bot 114 to utilize clusters of training feature vectors to determine whether input utterances are unrelated, or related, to available skill bots 116, according to some embodiments described herein. This method 1400 or similar can be used at block 205 of the above method 200 of configuring and using a master bot 114 to direct input utterances 303 to skill bots 116, and further, the method 1400 of FIG. 14 is a more specific variation of the method 500 of FIG. 5. In some embodiments of this method, as described below, k-means clustering is performed configure the classifier model 324. Although k-means clustering may enable more accurate formation of clusters as compared to other clustering techniques, such as k-nearest neighbors, various clustering techniques may be used instead of or in addition to k-means clustering.

The method 1400 depicted in FIG. 14, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 1400 is intended to be illustrative and non-limiting. Although FIG. 14 depicts various activities occurring in a particular sequence or order, this is not intended to be limiting. In certain embodiments, for instance, the activities may be performed in a different order, or one or more activities of the method 1400 may be performed in parallel. In certain embodiments, the method 1400 may be performed by a training system 350, which may be part of a DABP 102.

At block 1405 of the method 1400, the training system 350 accesses training utterances 615, also referred to as example utterances, for the various skill bots 116 associated with the master bot 114. For instance, the training utterances 615 may be stored as skill bot data in the training data 354 accessible to the training system 350. In some embodiments, each skill bot 116 available to the master bot 114 may be associated with a subset of the training utterances 615, and each such subset of the training utterances 615 may include training utterances 615 for each intent for which the skill bot 116 is configured. Thus, the full set of training utterances 615 may include training utterances 615 for each intent of each skill bot 116, such that every intent of every skill bot 116 is represented.

Figure 15:
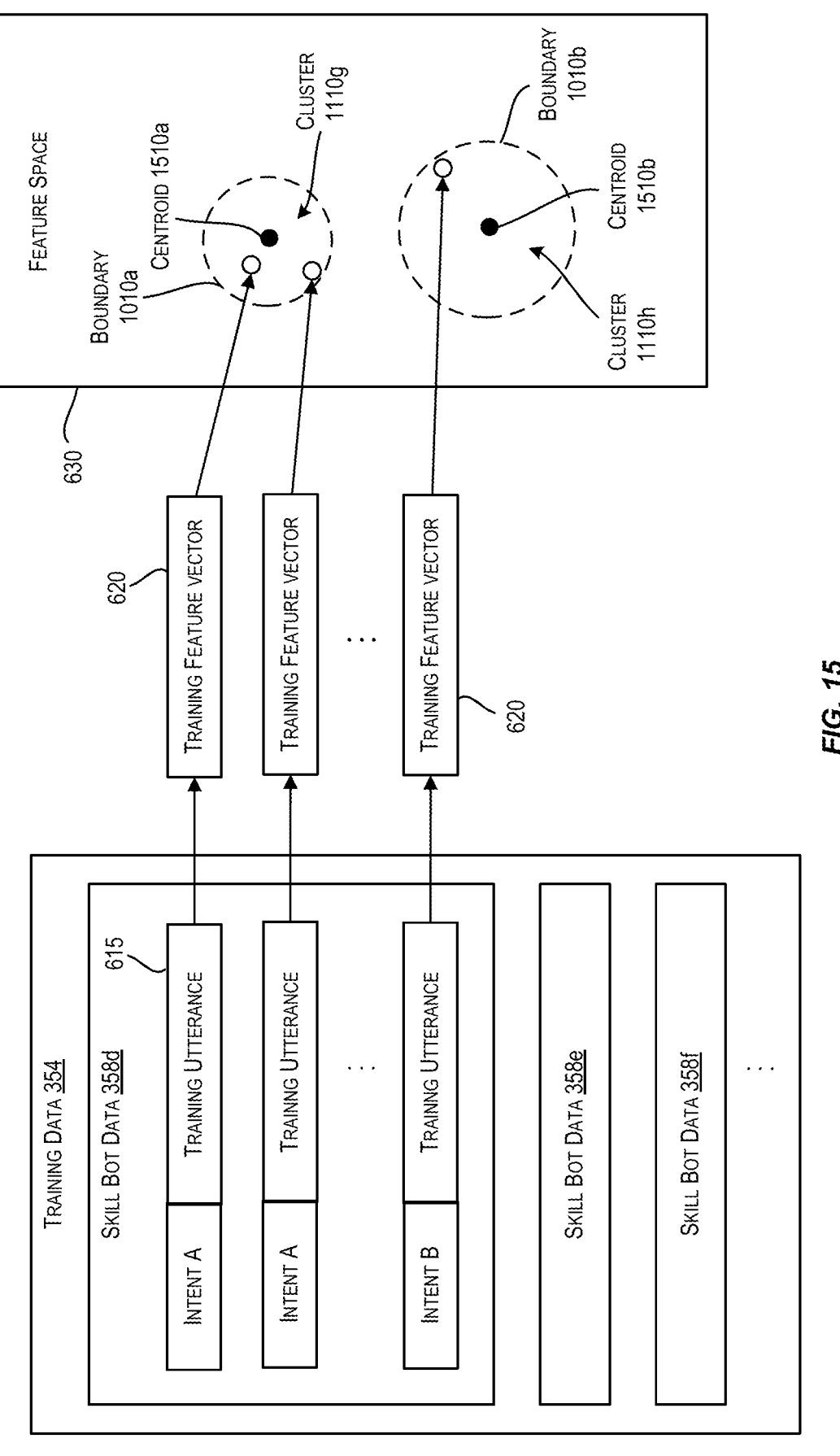
FIG. 15 illustrates an example of execution of certain aspects of the method of FIG. 14, according to some embodiments described herein.

FIG. 15 illustrates an example of execution of aspects of the method 1400 of FIG. 14, according to some embodiments described herein. As shown in FIG. 15, the training system 350 may access training data 354, which may include skill bot data related to the skill bots 116 available to the master bot 114 whose classifier model 324 is being trained. In this example, the training data 354 accessed by the training system 350 may include training utterances 615 from first skill bot data 358d, second skill bot data 358c, and third skill bot data 358f, each of which may include training utterances 615 representative of a respective skill bot 116 available to the master bot 114. Further, for a given set of skill bot data, as shown for the first skill bot data 358d in FIG. 15, each training utterance 615 may be associated with an intent that the associated skill bot 116 is configured to evaluate and handle.

At block 1410 of FIG. 14, the training system 350 generates training feature vectors 620 from the training utterances 615 accessed at block 1405. As described above, the training utterances 615 may include a subset associated with each skill bot 116 and, further, may include training utterances 615 for each intent of each skill bot 116. Thus, in some embodiments, the training feature vectors 620 may include a respective subset for each skill bot 116 and, further, may include respective feature vectors for each intent of each skill bot. As described above, the training system 350 may generate a training feature vector 620 to describe and represent each respective training utterance 615. Various techniques are known for converting a sequence of words, such as a training utterance 615, into a feature vector, such as a training feature vector 620, and one or more of such techniques may be used. For instance, the training system 350 may, but need not, use a one-hot encoding or some other encoding to encode each training utterance 615 as a corresponding training feature vector 620.

As shown in FIG. 15, for example, each training utterance 615 from the various skill bot data 358 may be converted into a respective training feature vector 620. In some embodiments, the resulting training feature vectors 620 may thus be representative of all the skill bots 116 for which training utterances 615 were provided and for all the intents for which training utterances 615 were provided.

At block 1415 of FIG. 14, the training system 350 may set (i.e., initialize) a count, which is a quantity of clusters to be generated. In some embodiments, for example, the count may initially be set to the quantity n, where n is the total number of intents across the various skill bots 116 that are available to the master bot 114. However, various other quantities can be used as the initial value of the count.

In some embodiments, the training system 350 performs one, two, or more rounds of iteratively determining a set of clusters of the training feature vectors 620. Although this method 1400 utilizes two rounds of determining clusters, a single round or a greater number of rounds may be used in some embodiments. At block 1420, the training system 350 begins a first round of determining the clusters. The first round utilizes an iterative loop, in which the training system 350 generates clusters of the training feature vectors 620 and then determines the sufficiency of such clusters. As described below, when the clusters are deemed sufficient, the training system 350 may then terminate the iterations in the first round.

In some embodiments, block 1425 is the beginning of the iterative loop of the first round for determining clusters. Specifically, at block 1425, the training system 3509 may determine respective centroid locations (i.e., a respective location for each centroid) for the various clusters to be generated in this iteration; the quantity of centroid locations is equal to the count determined at block 1415. In some embodiments, in the first iteration of this loop, the training system 350 may choose a set of randomly selected centroid locations, having quantity equal to the count, within a feature space 630 into which the training utterances 615 fall. More specifically, for instance, the training system 350 may determine a bounding box, such as a minimum bounding box, for the points corresponding to the training feature vectors 620. The training system 350 may then randomly select a set of centroid locations within that bounding box, where the number of locations selected is equal to the count determined for the clusters. During iterations other than the first one, the count has increased since the previous iteration, and thus, in some embodiments, only the centroid locations of centroids being newly added are determined randomly. The centroids being carried over the previous iteration may retain their locations. A respective centroid for a corresponding cluster may be positioned at each centroid location.

At block 1430, the training system 350 may determine clusters by assigning each training feature vector 620 to its respective closest centroid from among the various centroids whose locations were determined at block 1425. For instance, for each training feature vector 620, the training system 350 may compute the distance to each centroid location and may assign that training feature vector 620 to the centroid having the smallest such distance. The set of training feature vectors 620 assigned to a common centroid may together form a cluster associated with that centroid; thus, there may be a quantity of clusters equal to the quantity of centroids, which is the value of the count.

In the example of FIG. 15, only a portion of the feature space 630 is shown, and a first centroid 1510*a* and a second centroid 1510*b* are visible within that portion. Of the three training feature vectors 620 shown, the training system 350 determined that two were closest to the first centroid 1510*a* and one was closest to the second centroid 1510*b*. In this example, the two training feature vectors 620 closest to the first centroid 1510*a* make up a first cluster 1110*g*, and the one training feature vector 620 closest to the second centroid 1510*b* makes up a second cluster 1110*h*.

At block 1435 of FIG. 14, for the clusters determined at block 1430, the training system 350 recomputes the location of each cluster's centroid. For instance, in some embodiments, the centroid of each cluster is computed to be the average (e.g., the arithmetic mean) of the training feature vectors 620 assigned to that centroid and, thus, assigned to that cluster.

At decision block 1440, the training system 350 may determine whether a stopping condition is satisfied. In some embodiments, the training system 350 may utilize this method 1400 or similar repeatedly increase the quantity of centroids (i.e., increase the count) and assign the training feature vectors 620 to their closest respect centroids, until a convergence occurs such that no significant improvement in clustering is likely to occur. In some embodiments, the stopping condition defines the level of convergence that is sufficient.

In some embodiments, the stopping condition may be satisfied if one or both of the following conditions are true: (1) the average cluster cost satisfies a first threshold, such as the average cluster cost being less than 1.5 or some other predetermined value; or (2) the outlier ratio satisfies a second threshold, such as the outlier ratio being less than or equal to 0.25 or some other predetermined value. A cluster cost for a particular cluster may be defined as (a) the sum of the squared distances between the cluster's centroid, as recomputed in block 1435, and each training feature vector 620 assigned to that centroid (b) divided by the quantity of training feature vectors 620 assigned to that centroid. Thus, the average cluster cost may be the average of the various cluster costs of the various centroids. The outlier ratio may be defined as the total number of outliers among the clusters, divided by the quantity of clusters (i.e., the count). There are various techniques for defining an outlier, and one or more of such techniques may be used by the training system 350. In some embodiments, the stopping condition is met if and only if both (1) the average cluster cost satisfies a first threshold (e.g., lower than 1.5) and (2) the outlier ratio satisfies a second threshold (e.g., no higher than 0.25).

In general, the average cluster cost tends to decrease as the value of k (i.e., the count) increases, whereas the outlier ratio tends to increase as k increases. In some embodiments, when the above stopping condition, considering both factors, is applied, the largest k value that satisfies the respective thresholds for both the cluster count and the outlier ratio is the final k value for the classifier model 324.

If the stopping condition is not met at decision block 1440, then the method 1400 may proceed to block 1445. At block 1445, the training system increases the count for the next round of clustering. In some embodiments, the count may be increased incrementally by an amount that makes it likely the stopping condition will be satisfied after no greater than a certain number of iterations of the loop. For instance, in some embodiments the count can be increased by the value of a step size equal to $$\text{step}_1 = \max\left(n, \frac{u - n}{20}\right),$$

where n is the total number of intents across all the available skill bots 116 and u is the total number of training utterances 615 across all the available skill bots 116. This step size will ensure that the stopping condition is eventually met. Specifically, with this step size, starting at a count equal to n, the twentieth iteration will have a count that is no less than u, the quantity of utterances. When the count is no less than u, each utterance potentially has its own cluster, or if that is not the case, it is still likely that the average cluster cost will be less than 1.5 and the outlier ratio will be less than or equal to 0.25, which satisfies an example stopping condition. More generally, the step size may be chosen to ensure that the iterations do not waste computing resources by looping for an unreasonably amount of time. After the count is updated at block 1445, the method 1400 then returns to block 1425 to perform another loop iteration.

However, if the stopping condition is satisfied at decision block 1440, the method 1400 may exit the current iterative loop and may skip ahead to block 1450. At block 1450, the training system 350 begins the second round of clustering, in which the clusters may be even further defined based on the work done in the first round.

In some embodiments, block 1455 is the beginning of the iterative loop of the second round for determining clusters. Specifically, at block 1455, the training system 3509 may determine respective centroid locations (i.e., a respective location for each centroid) for the various clusters to be generated in this iteration; the quantity of centroid locations is equal to the current value of the count. In some embodiments, in the first iteration of this loop, the training system 350 uses the centroid locations as recomputed at block 1435 prior to the end of the first round. In iterations other than the first one, the count has increased since the previous iteration. In that case, the centroids from the previous iteration may retain their centroid locations, and in some embodiments, centroid locations of centroids being newly added due to an increase in the count may be determined randomly. A respective centroid for a corresponding cluster may be positioned at each centroid location.

At block 1460, the training system 350 may determine clusters by assigning each training feature vector 620 to its respective closest centroid from among the various centroids whose locations were determined at block 1455. For instance, for each training feature vector 620, the training system 350 may compute the distance to each centroid location and may assign that training feature vector 620 to the centroid having the smallest such distance. The set of training feature vectors 620 assigned to a common centroid may together form a cluster associated with that centroid; thus, there may be a quantity of clusters equal to the quantity of centroids, which is the value of the count.

At block 1465, for the clusters determined at block 1460, the training system 350 recomputes the location of each cluster's centroid. For instance, in some embodiments, the centroid of each cluster is computed to be the average (e.g., the arithmetic mean) of the training feature vectors 620 assigned to that centroid and, thus, assigned to that cluster.

At decision block 1470, the training system 350 may determine whether a stopping condition is satisfied. In some embodiments, the training system 350 may utilize this method 1400 or similar to repeatedly increase the quantity of centroids (i.e., increase the count) and assign the training feature vectors 620 to their closest respect centroids, until a convergence occurs such that no significant improvement in clustering is likely to occur. In some embodiments, the stopping condition defines the level of convergence that is sufficient.

In some embodiments, the stopping condition may be satisfied if one or both of the following conditions are true: (1) the average cluster cost satisfies a first threshold, such as the average cluster cost being less than 1.5 or some other predetermined value; or (2) the outlier ratio satisfies a second threshold, such as the outlier ratio being less than or equal to 0.25 or some other predetermined value. A cluster cost for a particular cluster may be defined as (a) the sum of the squared distances between the cluster's centroid, as recomputed in block 1465, and each training feature vector 620 assigned to that centroid (b) divided by the quantity of training feature vectors 620 assigned to that centroid. Thus, the average cluster cost may be the average of the various cluster costs of the various centroids. The outlier ratio may be defined as the total number of outliers among the clusters, divided by the quantity of clusters (i.e., the count). There are various techniques for defining an outlier, and one or more of such techniques may be used by the training system 350. In some embodiments, the stopping condition is met if and only if both (1) the average cluster cost satisfies a first threshold (e.g., lower than 1.5) and (2) the outlier ratio satisfies a second threshold (e.g., no higher than 0.25).

If the stopping condition is not met at decision block 1470, then the method 1400 may proceed to block 1475. At block 1475, the training system increases the count for the next round of clustering. In some embodiments, the count may be increased incrementally by an amount that makes it likely the stopping condition will be satisfied after no greater than a certain number of iterations of the loop. For instance, in some embodiments, the count can be increased by the value of a step size equal to $$step_2 = max\left(2, \frac{step_1}{5}\right).$$

This step size ensures that the stopping condition will eventually be met. Specifically, with this step size, the stopping condition will likely be met by the end of the fifth iteration. More generally, the step size may be chosen to ensure that the iterations do not waste computing resources by looping for an unreasonably amount of time. After the count is updated at block 1475, the method 1400 then returns to block 1455 to perform another loop iteration.

However, if the stopping condition is satisfied at decision block 1470, the method 1400 may exit the current iterative loop and may skip ahead to block 1480. At block 1480, the training system 350 determines a respective boundary 1010 for each cluster determined above. In some embodiments, the boundary 1010 for a cluster is defined to center on the centroid of the cluster and to include all the training feature vectors 620 assigned to the cluster. In some embodiments, for instance, the boundary 1010 of a cluster is a hypersphere (e.g., a circle or a sphere) having its center at the centroid. In some embodiments, the radius of the boundary 1010 may be a margin value (i.e., a padding amount) plus the larger of (1) the maximum distance from the center to the training feature vector 620, in that cluster, that is farthest from the centroid, or (2) the mean of the respective distances to the centroid from the training feature vectors 620 in the cluster, plus three times the standard deviation of such distances. In other words, the radius may be set to radius=margin+max (max(distances), mean(distances)+3σ(distances)), where distances is the set of the respective distances from the training feature vectors of the cluster to the centroid of the cluster, and where max(distances) is the maximum of that set, mean(distances) is the mean of that set, and σ(distances) is the standard deviation of that set. Further, the margin value, margin, may be a margin of error and may have a value greater than or equal to zero.

In some embodiments, the margin may be used to define a boundary 1010 that encompasses greater coverage than otherwise so as to reduce the chances of a relevant input utterance 303 falling outside all the clusters and thus being labeled as a member of the none class 316. In other words, the margin may pad the boundary 1010. For example, the margin may have a value of margin=10/u, where u is the total number of training utterances 615 being used. The margin can account for a situation in which, potentially because the quantity of training utterances is too low (e.g., twenty to thirty), the training feature vectors 620 do not cover a significant portion of the feature space 630, such that the clusters might otherwise be too small to capture relevant input utterances 303.

Returning to the example of FIG. 15, the training system 350 determines a respective boundary for each cluster determined based on assignment of the training feature vectors 620. Specifically, in this example, a first boundary 1010*a* is determined for the first cluster 1110*g*, which includes two training feature vectors 620, and a second boundary 1010*b* is determined for the second cluster 1110*h* which includes one training feature vector 620. The quantity of training feature vectors may be small, as in this example, or may be numerous, such as hundreds of training feature vectors 620 per cluster. It will be understood that this simplistic example is non-limiting and provided for illustrative purposes only.

As shown in FIG. 14, at block 1485, the training system 350 may configure the classifier model 324 of the master bot 114 to utilize the boundaries 1010, also referred to as cluster boundaries, determined at block 1480. For instance, the training system 350 may store an indication of the cluster boundaries in a storage device (e.g., on the digital assistant 106) accessible by the classifier model. The classifier model 324 may be configured to compare input utterances to such cluster boundaries 1010, which act as set representations of the training feature vectors 620.

Various modifications can be made to the above method 1400 and are within the scope of this disclosure. For instance, some examples of the training system 350 perform only a single round of refining the clusters. In that case, the activities of block 1445 to block 1475 may be skipped such that, when the stopping condition is met at decision block 1440, the method 1400 proceeds to block 1480. Some other examples of the training system 350 perform greater than two rounds of refining the clusters. In that case, the activities of block 1445 to block 1475 may be repeated for each additional round after the second one. These and other implementations are within the scope of this disclosure.

In some embodiments, the k value (i.e., the value of count and thus the number of clusters) determined in the above method 1400 depends on the total number of training utterances 615 as well as the distribution of the training feature vectors 620 throughout the feature space 630. Thus, the k value can vary from one master bot 114 to another, depending on the available skill bots 116 and the training utterances 615 available to represent the intents of those skill bots 116. An optimal k value is a value that strikes a balance such that each cluster is large enough that input utterances 303 that relate to that cluster will fall within the boundary 1010 of the cluster, while utterances that are unrelated fall outside the boundary 1010. If the clusters are too large, then the risk of false matching increases. If the clusters are too small (e.g., consisting of a single training utterance 615), the classifier model 324 may be over-fitted, and the usefulness of such clusters is limited.

In the above example of the method 1400, the training feature vectors 620 were not divided or grouped based on intent, and thus a cluster may include training feature vectors 620 representative of various skill bots 116 or various intents of one or more skill bots 116. Additionally or alternatively, an embodiment of the training system 350 may ensure that each cluster includes only training feature vectors 620 representative of a single skill bot 116, a single intent, or a single sub-bot, where a sub-bot is associated with a subset of the training utterances representative of a single skill bot 116. Various techniques may be used to limit clusters in this manner. For instance, the training utterances may be separated into groups based on intent, sub-bot, or skill bot 116, and a respective instance of the above method 1400 may be performed on each group. In this manner, a cluster determined during one instance of the method 1400 for a corresponding group (e.g., training utterances 615 representative of a particular skill bot 116) may include only training feature vectors 620 from that corresponding group, which may be limited to training utterances of a single intent, sub-bot, or skill bot 116. Various other implementations are possible and are within the scope of this disclosure.

FIG. 16 is a diagram of a method 1600 of using a classifier model 324 of a master bot 114 to determine whether an input utterance 303, provided as user input 110, is unrelated to any available skill bot 116 associated with the master bot 114, according to some embodiments described herein. This method 1600 or similar can be used at block 215 of the above method 200 of configuring and using a master bot 114 to direct input utterances 303 to skill bots 116. The method 1600 of FIG. 16 is a more specific variation of the method 700 of FIG. 7, and like that method 700 of FIG. 7, the method 1600 of FIG. 16 can be used with the preliminary filtering activity described with respect to the method 800 of FIG. 8. More specifically, as described below, the classifier model 324 of a master bot 114 may utilize clusters of training feature vectors 620 to determine whether an input utterance 303 belongs to the none class 316 (i.e., is unrelated to the available skill bots 116).

The method 1600 depicted in FIG. 16, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 1600 is intended to be illustrative and non-limiting. Although FIG. 16 depicts various activities occurring in a particular sequence or order, this is not intended to be limiting. In certain embodiments, for instance, the activities may be performed in a different order, or one or more activities of the method 1600 may be performed in parallel. In certain embodiments, the method 1600 may be performed by a master bot 114 associated with a set of available skill bots 116.

At block 1605 of the method 1600, the master bot 114 accesses an input utterance 303 that has provided as user input 110. For instance, in some embodiments, a user may provide user input 110 in the form of speech input, and the digital assistant 106 may convert that user input 110 into a textual input utterance 303 for use by the master bot 114.

At block 1610, the master bot 114 may generate an input feature vector from the input utterance 303 accessed at block 1605. More specifically, in some embodiments, the master bot 114 causes the classifier model 324 of the master bot 114 to generate the input feature vector from the input utterances 303. The input feature vector may describe and represent the input utterance 303. Various techniques are known for converting a sequence of words, such as an input utterance, into a feature vector, and one or more of such techniques may be used. For instance, the training system 350 may, but need not, use a one-hot encoding or some other encoding to encode the input utterance 303 as a corresponding input feature vector. However, an embodiment of the master bot 114 uses the same technique as was used to generate training feature vectors 620 from training utterances 615 when training the classifier model 324.

At decision block 1615, the master bot 114 compares the input feature vector generated at block 1610 to the clusters. More specifically, in some embodiments, the master bot 114 causes the classifier model 324 to compare the input feature vector generated at block 1610 to the clusters, specifically to the boundaries of the clusters, determined during training. As discussed above, each cluster may include a set of training feature vectors 620 and may include a boundary 1010 based on the training feature vectors 620 of that cluster; for instance, the boundary 1010 includes all training feature vectors 620 assigned to the cluster and potentially some additional space outside of those training feature vectors 620. Specifically, in some embodiments, the classifier model 324 determines whether the input feature vector (i.e., the point corresponding to the input feature vector) falls inside any boundary 1010 of any cluster of the training feature vectors 620. Various techniques exist in the art for determining whether a point falls inside a boundary, and one or more such techniques may be used to determine whether the input feature vector falls inside any of the boundaries 1010 of the clusters.

At decision block 1620, the classifier model 324 makes a decision based on comparing the input feature vector to the cluster boundaries. If the input feature vector does not fall inside any cluster boundary, and thus falls outside all the cluster boundaries 1010, the method 1600 proceeds to block 1625.

Figure 17:
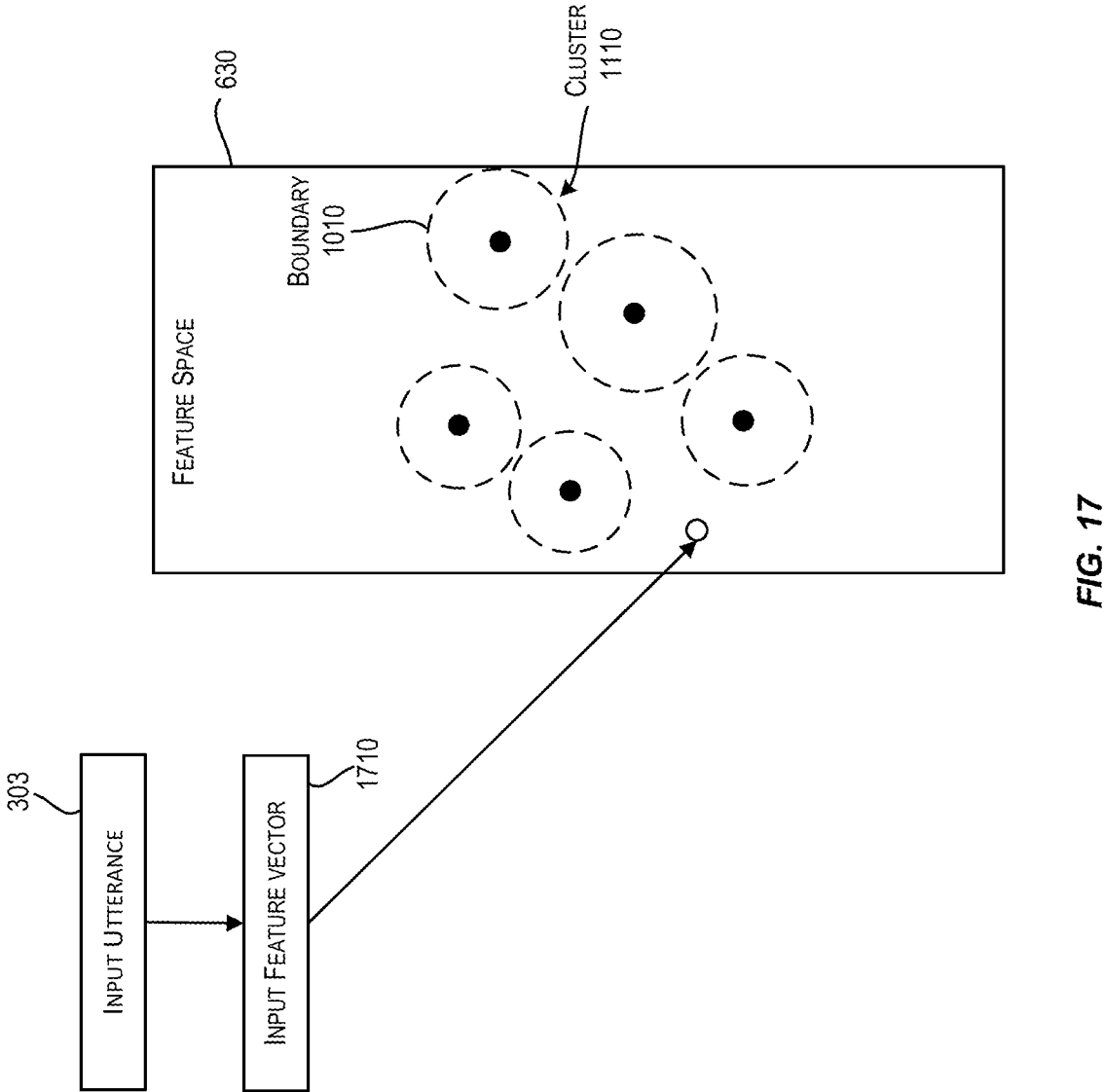
FIG. 17 illustrates an example of executing this method in a case where an input feature vector falls outside all the cluster boundaries, according to some embodiments described herein.

FIG. 17 illustrates an example of executing this method 1600 in a case where an input feature vector 1710 falls outside all the cluster boundaries, according to some embodiments described herein. In some embodiments, the master bot 114 provides an input utterance 303 to the classifier model 324, thus causing the classifier model 324 to convert the input utterance 303 to an input feature vector 1710 and to compare the input feature vector to the cluster boundaries 1010. In the example of FIG. 17, five clusters 1110 are shown in the feature space 630; however, a greater or fewer number of clusters 1110 may be used. In this example, the input feature vector 1710 falls outside all the cluster boundaries 1010, and thus, the classifier model 324 outputs to the master bot 114 an indication that the input utterance 303 belongs to the none class 316.

Returning to FIG. 16, at block 1625, the master bot 114 indicates that the input utterance 303 cannot be processed (i.e., cannot be further processed) based on the classifier model 324 indicating that the input feature vector falls outside all the cluster boundaries 1010. For instance, the digital assistant 106 may respond to the user to request clarification or to report that the user input 110 is not relevant to the skills of the digital assistant.

However, if the input feature vector falls inside one or more cluster boundaries 1010, then the method 1600 skips ahead to block 1630. At block 1630, the master bot 114 determines a skill bot 116 to handle (i.e., further process and determine a response 435 for) the input utterance 303 by selecting one of the skill bots 116 from among those available. Determining the skill bot 116 can be performed in various ways, and the technique used may depend on the makeup of the one or more cluster boundaries 1010 into which the input feature vector falls.

To select a skill bot 116 for the input utterance 303, the master bot 114 may consider the various training utterances represented by the training feature vectors 620 that share a cluster with the input feature vector 1710 (i.e., the training feature vectors that are members of a cluster 1110 into whose boundary 1010 the input feature vector 1710 falls). For instance, if the training feature vector 620 falls into two or more clusters 1110, which are overlapping, then the training utterances 615 having corresponding training feature vectors 1710 in any of those two or more clusters 1110 may be considered. Analogously, if the training feature vector 620 falls into only a single cluster 1110, then the training utterances 615 having corresponding training feature vectors 620 in that cluster 1110 are considered. If all the training utterances 615 being considered are representative of a single skill bot 116, which may be the case, for instance, if the input feature vector 1710 falls into a cluster 1110 that includes training feature vectors 620 associated with only a single skill bot 116, then the master bot 114 may select that skill bot 116 to handle the input utterance 303.

In some embodiments, the classifier model 324 may be able to identify a specific intent of a specific skill bot 116 for the handling of the input utterance. For instance, if the one or more clusters 1110 into which the training feature vector 620 falls include only training feature vectors 620 of training utterances 615 representative of a single intent of a single skill bot 116, then the classifier model 324 may identify that that particular intent is applicable to the input utterance 303. If the classifier model 324 is able to identify a particular intent of a particular skill bot 116, the master bot 114 may route the input utterance 303 to that skill bot 116 and may indicate the intent to the skill bot 116. As a result, the skill bot 116 may skip performance of its own classification of the input utterance 303 to infer an intent but, rather, may infer the intent indicated by the master bot 114.

However, if the training utterances 615 being considered are representative of multiple skill bots 116, which may be the case, for instance, if the input feature vector 1710 falls into a cluster 1110 made up of training feature vectors 620 representative of multiple skill bots 116 or if the input feature vector 1710 falls into multiple overlapping clusters 1110, then the master bot 114 may need to further classify the input utterance 303 to select a skill bot 116. Various techniques may be used to further classify the input utterance 303. In some embodiments, the classifier model 324 implements a machine learning mode to compute a confidence score (e.g., using a logistic regression model) with respect to the input utterance 303 for each skill bot 116 having associated training feature vectors 620 in the one or more clusters 1110 into which the input feature vector 1710 falls. For instance, the machine-learning model may be trained with the composite feature vectors. The master bot 114 may then select the skill bot 116 with the highest confidence score to handle the input utterance 303. In contrast to the conventional use of confidence scores to identify a relevant skill bot 116, in some embodiments, it has already been determined that the input utterances 303 is related to the skill bots 116; thus, the risk of routing the input utterance 303 to an unrelated skill bot 116 is reduced or eliminated.

In additional or alternative embodiments, the classifier model 324 may utilize a k-nearest neighbors technique to select a skill bot 116 from among two or more skill bots 116 whose associated training feature vectors 620 share one or more clusters 1110 with the input feature vector 1710. For instance, the classifier model 324 may select a value of k and may identify the k-nearest training feature vectors 620 to the input feature vector 1710 from among the training feature vectors 620 that fall into the one or more clusters 1110 of the input feature vector 1710. The classifier model 324 may identify the skill bot 116 that has the greatest number of associated training feature vectors 620 in that set of k-nearest training feature vectors 620, and the master bot 114 may select that skill bot 116 to handle the input utterance. Various other implementations for selecting a skill bot 116 are possible and are within the scope of this disclosure.

At lock 1635, the master bot 114 may forward the input utterance 303 to the skill bot selected at block 1630. The skill bot 116 may then process the input utterance 303 to respond to the user input 110.

Using Composite Vectors to Identify Unrelated Input Utterances

As discussed above, generally, some embodiments described herein utilize set representations of training feature vector 620 to determine whether an input utterance 303 is related to a set of available skill bots 116. As also discussed above, the set representations may be clusters 1110. Additionally or alternatively, however, the set representations can be higher-level feature vectors, referred to herein as composite feature vectors.

FIG. 18 is a diagram of a method 1800 of initializing a classifier model 324 of a master bot 114 to utilize composite feature vectors to determine whether input utterances 303 are unrelated, or related, to available skill bots 116, according to some embodiments described herein. This method 1800 or similar can be used at block 205 of the above method 200 of configuring and using a master bot 114 to direct input utterances 303 to skill bots 116, and further, the method 1800 of FIG. 18 is a more specific variation of the method 500 of FIG. 5.

The method 1800 depicted in FIG. 18, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 1800 is intended to be illustrative and non-limiting. Although FIG. 18 depicts various activities occurring in a particular sequence or order, this is not intended to be limiting. In certain embodiments, for instance, the activities may be performed in a different order, or one or more activities of the method 1800 may be performed in parallel. In certain embodiments, the method 1800 may be performed by a training system 350, which may be part of a DABP 102.

At block 1805 of the method 1800, the training system 350 accesses training utterances 615, also referred to as example utterances, for the various skill bots 116 associated with the master bot 114. For instance, the training utterances 615 may be stored as skill bot data in the training data 354 accessible to the training system 350. In some embodiments, each skill bot 116 available to the master bot 114 may be associated with a subset of the training utterances 615, and each such subset of the training utterances 615 may include training utterances 615 for each intent for which the skill bot 116 is configured. Thus, the full set of training utterances 615 may include training utterances 615 for each intent of each skill bot 116, such that every intent of every skill bot 116 is represented.

At block 1810, the training system 350 generates training feature vectors 620 from the training utterances 615 accessed at block 1805. As described above, the training utterances 615 may include a subset associated with each skill bot 116 and, further, may include training utterances 615 for each intent of each skill bot 116. Thus, in some embodiments, the training feature vectors 620 may include a respective subset for each skill bot 116 and, further, may include respective feature vectors for each intent of each skill bot. As described above, the training system 350 may generate a training feature vector 620 to describe and represent each respective training utterance 615. Various techniques are known for converting a sequence of words, such as a training utterance 615, into a feature vector, such as a training feature vector 620, and one or more of such techniques may be used. For instance, the training system 350 may, but need not, use a one-hot encoding or some other encoding to encode each training utterance 615 as a corresponding training feature vector 620.

At block 1815, the training system 350 divides the training feature vectors 620, and thus the corresponding training utterance 615, into conversation categories. The conversation categories can be defined, for example, based on intent, sub-bot, or skill bot 116. In some embodiments, if the conversation categories are based on intent, then each conversation category includes training feature vectors 620 representative of a single corresponding intent for which a skill bot 116 is configured; in that case, the number of conversation categories may equal the number of intents across the various skill bots 116 available to the master bot 114. In some embodiments, if the conversation categories are based on skill bots 116, then each conversation category includes training feature vectors 620 representative of a single corresponding skill bot 116; in that case, the number of conversation categories may equal the number of skill bots 116 available to the master bot 114. In some embodiments, if the conversation categories are based on sub-bots, then each conversation category includes a subset of the training feature vectors 620 representative of a single corresponding skill bot 116; in that case, the number of conversation categories may be no fewer than the number of skill bots 116 available to the master bot 114.

At block 1820, the training system 350 generates composite feature vectors from the training feature vectors 620, such that the respective training feature vectors 620 in a conversation category are aggregated into a composite feature vector representative and, and corresponding to, that conversation category. In other words, for each conversation category to which training feature vectors 620 were assigned at block 1815, the training system 350 may combine the respective training feature vectors 620 into a composite feature vector for the conversation category. Various techniques can be used for aggregation; for instance, a composite feature vector may be the average (e.g., the arithmetic mean) of the training feature vectors 620 in the respective category. Depending on the basis of the conversation categories, the composite feature vectors may be intent vectors, and sub-bot vectors, or bot vectors according to whether the conversation categories are defined based on intents, sub-bots, or skill bots 116 respectively.

Although composite feature vectors can be generated as an arithmetic mean of training feature vectors 620, other mathematical functions, including other types of linear combinations, may be used additionally or alternatively to generate composite feature vectors. For example, in some embodiments, a composite feature vector can be a weighted average of training feature vectors 620 in a conversation category. The weighting can be based on various factors, such as priority of certain key words in the corresponding training utterances 615, such that greater weight is given to training utterances 615 with certain key words. In the case of generating sub-bot vectors or bot vectors, the training feature vectors 620 can be aggregated as a weighted average such that training feature vectors 620 corresponding to certain intents are given greater weight than other training feature vectors 620. For instance, training feature vectors 620 corresponding to an intent having a greater number of representative training utterances 615 may be given greater weight in the aggregate compared to training feature vectors 620 corresponding to an intent having a fewer number of representative training utterances 615. Various implementations are possible and are within the scope of this disclosure.

Figure 19:
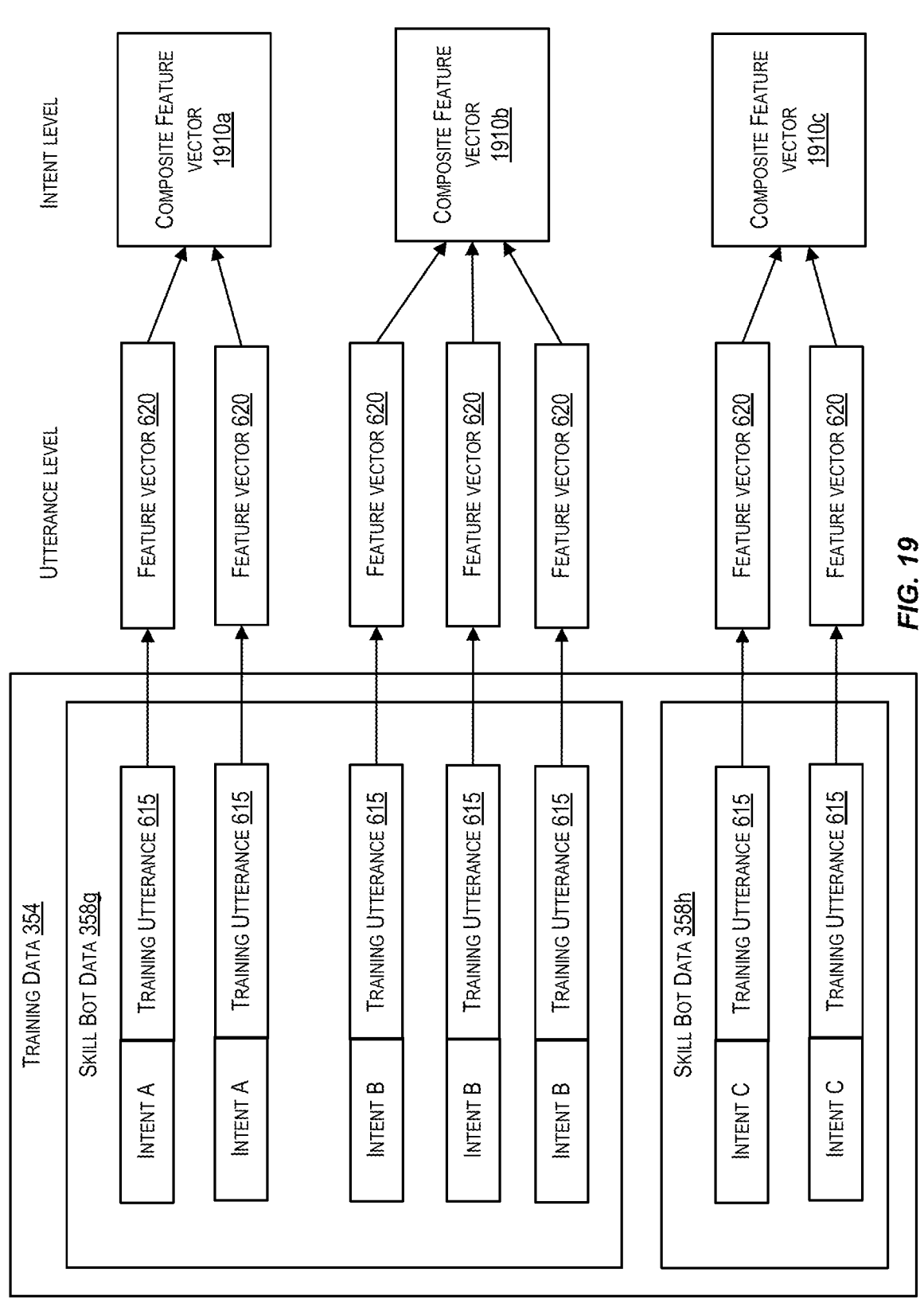
FIG. 19 illustrates generation of composite feature vectors using intent-based conversation categories, according to some embodiments described herein.
Figure 20:
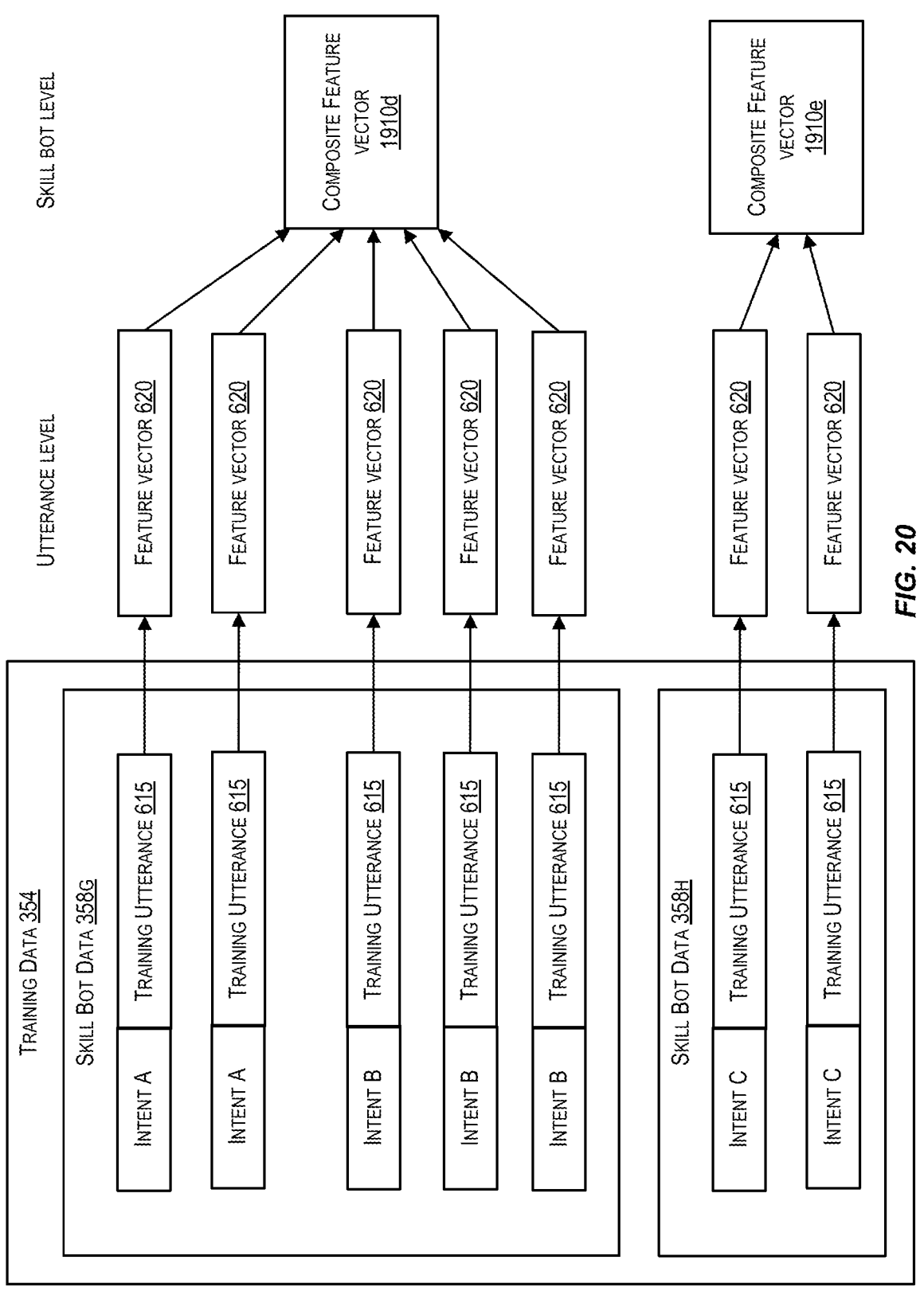
FIG. 20 illustrates the generation of composite feature vectors using bot-based conversation categories, according to some embodiments described herein.

FIG. 19 and FIG. 20 illustrate the concept of composite feature vectors. Specifically, FIG. 19 illustrates the generation of composite feature vectors using intent-based conversation categories, according to some embodiments described herein. As a result, the composite feature vectors shown in FIG. 19 are at the intent level and are thus intent vectors. In the example of FIG. 19, at least two skill bots 116 are available to the master bot 114. A first skill bot 116 is associated with first skill bot data 358g, which includes training utterances 615 representative of a first intent, Intent A, and other training utterances 615 representative of a second intent, Intent B. The first skill bot 116 is thus configured to handle input utterances associated with Intent A or Intent B. A second skill bot 116 is associated with second skill bot data 358h, which includes training utterances 615 representative of a third intent, Intent C. The second skill bot 116 is thus configured to handle input utterances associated with Intent C.

In the example of FIG. 19, the training system 350 converts all the training utterances 615 for the skill bots 116 to respective feature vectors 620. The training system 350 groups the training feature vectors into intent-based conversation categories. As such, the training feature vectors 620 corresponding to the training utterances 615 for Intent A form a first conversation category, the training feature vectors 620 corresponding to the training utterances 615 for Intent B form a second conversation category, and the training feature vectors 620 corresponding to the training utterances 615 for Intent C form a third conversation category. In this example, as described above, the training feature vectors 620 of a given intent-based conversation category are aggregated (e.g., averaged) into a composite feature vector for the conversation category and, thus, for the associated intent. Specifically, the training system 350 aggregates the training feature vectors 620 corresponding to the training utterances 615 for Intent A into a first composite feature vector 1910a, the training system 350 aggregates the training feature vectors 620 corresponding to the training utterances 615 for Intent B into a second composite feature vector 1910b, and the training system 350 aggregates the training feature vectors 620 corresponding to the training utterances 615 for Intent C into a third composite feature vector 1910c. Thus, in this example, each composite feature vector is representative of a respective intent of a skill bot 116.

FIG. 20 illustrates the generation of composite feature vectors using skill-bot-based, also referred to as bot-based, conversation categories, according to some embodiments described herein. As a result, the composite feature vectors shown in FIG. 20 are at the skill bot level and are thus bot vectors. In the example of FIG. 20, at least two skill bots 116 are available to the master bot 114. A first skill bot 116 is associated with first skill bot data 358g, which includes training utterances 615 representative of a first intent, Intent A, and other training utterances 615 representative of a second intent, Intent B. The first skill bot 116 is thus configured to handle input utterances associated with Intent A or Intent B. A second skill bot 116 is associated with second skill bot data 358h, which includes training utterances 615 representative of a third intent, Intent C. The second skill bot 116 is thus configured to handle input utterances associated with Intent C.

In the example of FIG. 20, the training system 350 converts all the training utterances 615 for the skill bots 116 to respective feature vectors 620. The training system 350 groups the training feature vectors into skill-bot-based conversation categories. As such, the training feature vectors 620 corresponding to the training utterances 615 for Intent A along with the training feature vectors 620 corresponding to the training utterances 615 for Intent B form a first conversation category, and the training feature vectors 620 corresponding to the training utterances 615 for Intent C form a second conversation category. In this example, as described above, the training feature vectors 620 of a given skill-bot-based conversation category are aggregated (e.g., averaged) into a composite feature vector for the conversation category and, thus, for the associated skill bot 116. Specifically, the training system 350 aggregates the training feature vectors 620 corresponding to the training utterances 615 for Intent A and the training feature vectors 620 corresponding to the training utterances 615 for Intent B into a first composite feature vector 1910d, and the training system 350 aggregates the training feature vectors 620 corresponding to the training utterances 615 for Intent C into a second composite feature vector 1910e. Thus, in this example, each composite feature vector is representative of a respective skill bot 116.

In some embodiments, the training system 350 is not limited to generating only one type of composite feature vector. For instance, the training system 350 may generate intent vectors, sub-bot vectors, and skill bot vectors, or the training system 350 may generate some other combination of these or other types of composite feature vectors.

Returning to FIG. 18, at block 1825, the training system 350 may configure the classifier model 324 of the master bot 114 to utilize the composite feature vectors determined at block 1820. For instance, the training system 350 may store an indication of the composite feature vectors in a storage device (e.g., on the digital assistant 106) accessible by the classifier model 324. The classifier model 324 may be configured to compare input utterances to such composite feature vectors, which act as set representations of the training feature vectors 620.

Figure 21:
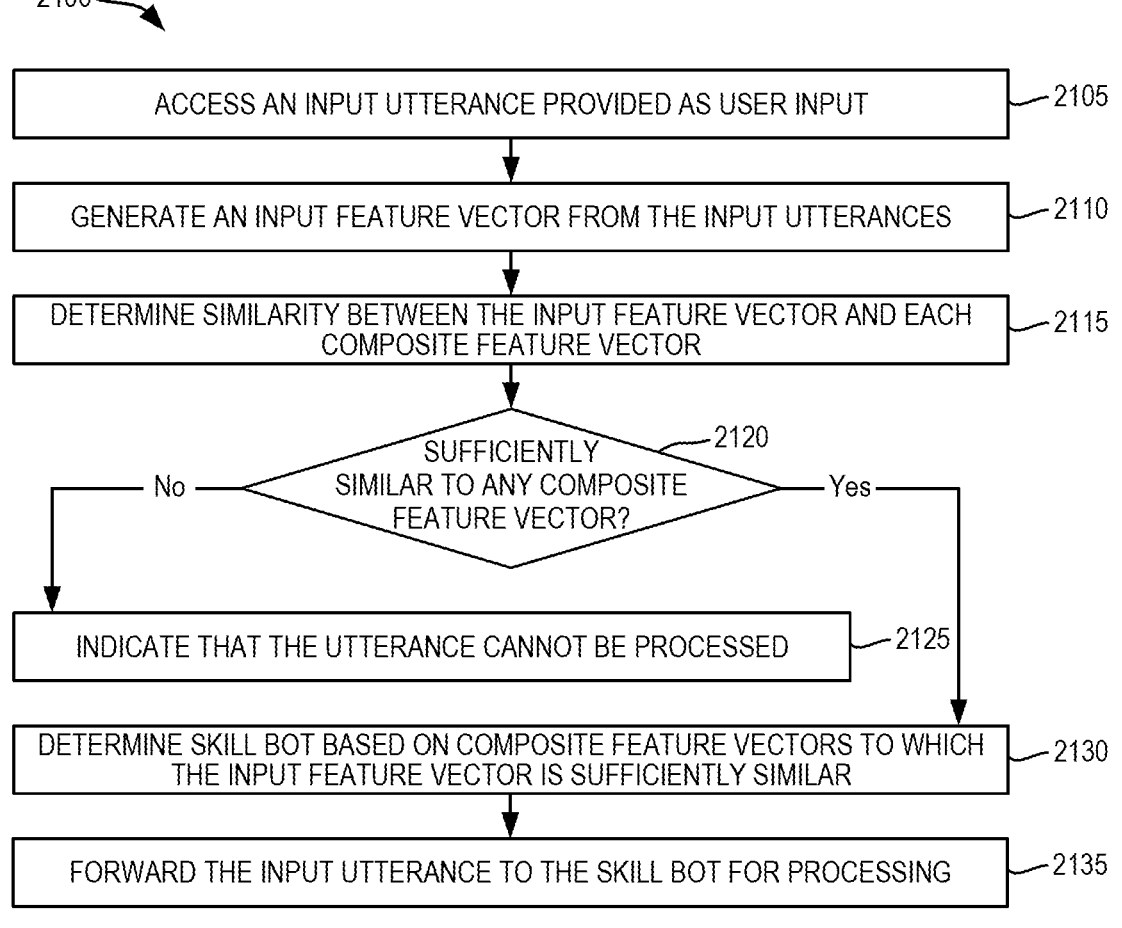
FIG. 21 is a flow diagram of a method of using the classifier model of the master bot to determine whether the input utterance is unrelated to any available skill bot associated with the master bot, according to some embodiments described herein.

FIG. 21 is a diagram of a method 2100 of using a classifier model 324 of a master bot 114 to determine whether an input utterance 303, provided as user input 110, is unrelated to any available skill bot 116 associated with the master bot 114, according to some embodiments described herein. This method 2100 or similar can be used at block 215 of the above method 200 of configuring and using a master bot 114 to direct input utterances 303 to skill bots 116. The method 2100 of FIG. 21 is a more specific variation of the method 700 of FIG. 7, and like that method 700 of FIG. 7, the method 2100 of FIG. 21 can be used with the preliminary filtering activity described with respect to the method 800 of FIG. 8. More specifically, as described below, the classifier model 324 of a master bot 114 may utilize composite feature vectors to determine whether an input utterance 303 belongs to the none class 316 (i.e., is unrelated to the available skill bots 116).

The method 2100 depicted in FIG. 21, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 2100 is intended to be illustrative and non-limiting. Although FIG. 21 depicts various activities occurring in a particular sequence or order, this is not intended to be limiting. In certain embodiments, for instance, the activities may be performed in a different order, or one or more activities of the method 2100 may be performed in parallel. In certain embodiments, the method 2100 may be performed by a master bot 114 associated with a set of available skill bots 116.

At block 2105 of the method 2100, the master bot 114 accesses an input utterance 303 that has provided as user input 110. For instance, in some embodiments, a user may provide user input 110 in the form of speech input, and the digital assistant 106 may convert that user input 110 into a textual input utterance 303 for use by the master bot 114.

At block 2110, the master bot 114 may generate an input feature vector 1710 from the input utterance 303 accessed at block 2105. More specifically, in some embodiments, the master bot 114 causes the classifier model 324 of the master bot 114 to generate the input feature vector 1710 from the input utterances 303. The input feature vector 1710 may describe and represent the input utterance 303. Various techniques are known for converting a sequence of words, such as an input utterance 303, into a feature vector, and one or more of such techniques may be used. For instance, the training system 350 may, but need not, use a one-hot encoding or some other encoding to encode the input utterance 303 as a corresponding input feature vector 1710. However, an embodiment of the master bot 114 uses the same technique as was used to generate training feature vectors 620 from training utterances 615 when training the classifier model 324.

At block 2115, the master bot 114 compares the input feature vector 1710 generated at block 2110 to the composite feature vectors. More specifically, in some embodiments, the master bot 114 causes the classifier model 324 to compare the input feature vector 1710 determined at block 2110 to the composite feature vectors, which may be determined as described above with respect to FIG. 18. In comparing the input feature vector 1710 to the composite feature vectors, the classifier model 324 may determine a similarity, or a distance, between the input feature vector 1710 and each composite feature vector previously constructed for the classifier model 324.

The similarity, or distance, between the input feature vector 1710 and another feature vector, specifically a composite feature vector, can be calculated in various ways. For example, to determine the similarity, the classifier model 324 may compute the absolute value of the arithmetic difference between the composite feature vector and the input feature vector 1710 (i.e., the Euclidean distance) by subtracting one from the other and taking the absolute value. For another example, the classifier model 324 may multiple the input feature vector 1710 with the composite feature vector; for instance, if a one-hot encoding is used for the input feature vector 1710 and for the composite feature vector, each vector entry (i.e., each dimension) will have a value of 1 or 0, where a value of 1 may represent the presence of a certain feature. If the input feature vector 1710 and the composite feature vector have mostly the same features, then the result of the vector-vector multiplication would be a vector having approximately the same number of 1 values as either of the two vectors being multiplied. Otherwise, the resulting vector would be mostly 0s. For another example, a cosine similarity can be used; for instance, the cosine similarity between the input feature vector 1710 and the composite feature vector can be calculated as the dot product of the two vectors divided by the product of the Euclidean norm of both vectors. Various other techniques for measuring similarity are possible and are within the scope of this disclosure.

At decision block 2120, the classifier model 324 of the master bot 114 determines whether the input feature vector 1710 is sufficiently similar to any of the composite feature vectors. The classifier model 324 may use a predetermined threshold, such that a similarity is deemed sufficient if it meets the threshold. If the similarity metric used provides a small value when two vectors are similar, as in the case of a distance metric, then the threshold may be an upper threshold such that the input feature vector 1710 is sufficiently close to a composite feature vector, for instance, if the similarity is no greater than the threshold. However, if the similarity metric used provides a large value when two vectors are similar, then the threshold may be a lower threshold such that the input feature vector 1710 is sufficiently close to a composite feature vector, for instance, if the similarity is no less than the threshold.

In some embodiments, the determination of sufficient similarity may be determined using a hierarchy of composite feature vectors. For instance, the input feature vector 1710 may be compared to bot vectors and then, if needed, to sub-bot vectors and then, if needed, to intent vectors until a sufficient similarity is found or until it is determined that the input feature vector 1710 is not sufficiently similar to any such composite feature vector. Because there are fewer bot vectors than intent vectors, and fewer intent vectors than sub-bot vectors, the computing resources needed for determining similarities to bot vectors may be less than the computing resources needed for determining similarities to sub-bot vectors, which may be less than the computing resourced needed for determining similarities to intent vectors. Thus, by comparing the input feature vector 1710 to composite feature vectors at different levels, starting at the highest level available (e.g., the skill bot level), the classifier model 324 can determine which skill bot 116, if any, is best suited to handle the input utterance 303 while using less computationally intensive processing before resorting to more computationally intensive processing.

In some embodiments, the input utterance 303 may be deemed unrelated to any of the available skill bots 116 if the input feature vector 1710 is far enough away (e.g., exceeding a predetermined distance deemed to be excessive) from every bot vector. However, in additional or alternative embodiments, an input utterance 303 is not deemed unrelated based on dissimilarity to bot vectors alone. For instance, if the input feature vector 1710 is dissimilar (i.e., not sufficiently similar) to all the bot vectors, this is not necessarily a dispositive indication that the input utterance 303 belongs in the none class 316. There may be situations where the input feature vector 1710 is far from (i.e., dissimilar to) any bot vector but still close to an intent vector, due to the corresponding intent being dissimilar to other intents for which the skill bot 116 is configured. In some embodiments, comparing the input feature vector 1710 to both bot vectors and intent vectors is typically sufficient to identify unrelated input utterances 303. Thus, the input utterance 303 may be deemed unrelated to the available skill bots 116 if the input feature vector 1710 is dissimilar to all bot vectors as well as dissimilar to all intent vectors. In some embodiments, the input feature vector 1710 may additionally or alternatively be compared to sub-bot vectors or other composite feature vectors as part of determining whether the input utterance 303 is a member of the none class. Various implementations are possible and are within the scope of this disclosure.

If the classifier model 324 determines that the input feature vector 1710 is not sufficiently similar to any composite feature vector at decision block 2120, based on whatever comparisons are performed, the method 2100 proceeds to block 2125. At block 2125, master bot 114 determines that the input utterance is unrelated to any available skill bot 116, and thus, the master bot 114 may indicate that the input utterance 303 cannot be processed. As a result, for example, the digital assistant may ask the user to clarify the user input 110.

However, if the classifier model 324 determines that the input feature vector 1710 is sufficiently similar to one or more composite feature vectors at decision block 2120, then the method 2100 skips ahead to block 2130. At block 2130, based on the comparisons with the composite feature vectors, the master bot 114 determines (i.e., selects) a skill bot 116 to handle the input utterance 303. For example, the master bot 114 may select the skill bot 116 related to the composite feature vector deemed most similar to the input feature vector 1710. For instance, if the most similar composite feature vector is an intent vector, then the master bot 114 may select the skill bot 116 configured to handle the intent corresponding to the intent vector; and if the most similar composite feature vector is a sub-bot vector or a bot vector, then the master bot 114 may select the skill bot 116 to which the sub-bot vector or bot vector corresponds. For another example, the master bot 114 may use a k-nearest neighbors technique to select the skill bot 116, as will be described further below.

At block 2135, the master bot 114 may route the input utterance to the skill bot 116 selected at block 2130. In some embodiments, if the master bot 114 identified a particular intent for the input utterance (e.g., if the input feature vector 1710 was deemed sufficiently close to a single intent vector), the master bot 114 may indicate that intent to the skill bot 116, thus enabling the skill bot 116 to skip the process of inferring an intent. The skill bot 116 may then process the input utterance 303 to respond to the user input 110.

Figure 22:
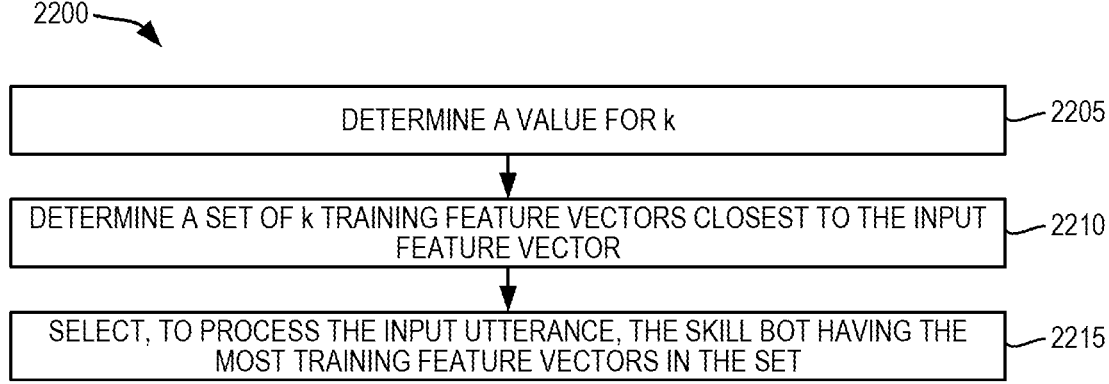
FIG. 22 is a flow diagram of an example of a method of selecting a skill bot to handle the input utterance, according to some embodiments described herein.

FIG. 22 is a diagram of a method 2200 of selecting a skill bot 116 to handle an input utterance, according to some embodiments described herein. This method 2200 or similar may be used at block 2130 of the above method 2100, after determination that the input utterance 303 is related to at least one available skill bot 116. This method 2200 provides a k-nearest neighbors approach to selecting a skill bot 116, but other techniques may be used additionally or alternatively to this approach. Specifically, this method 2200 utilizes the k-nearest training feature vectors 620 to the input feature vector 1710 to determine which skill bot 116 to select.

The method 2200 depicted in FIG. 22, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 2200 is intended to be illustrative and non-limiting. Although FIG. 22 depicts various activities occurring in a particular sequence or order, this is not intended to be limiting. In certain embodiments, for instance, the activities may be performed in a different order, or one or more activities of the method 2200 may be performed in parallel. In certain embodiments, the method 2200 may be performed by a master bot 114.

As shown in FIG. 22, at block 2205, the master bot 114 determines a value for k, where k is the number of neighbors that will be considered. In some embodiments, the value of k may be a factor of the total number of training feature vectors 620 (i.e., the total number of training utterances 615).

At block 2210, using the value of k determined at block 2205, the master bot 114 determines a set of k training feature vectors 620 that are the closest (i.e., the most similar) to the input feature vector 1710. The master bot 114 may use the same, or a different, similarity metric as the one used above when determining whether the input feature vector 1710 was sufficiently similar to any composite feature vectors. For example, the similarity metric used may be Euclidean distance, vector multiplication, or cosine similarity.

At block 2215, the master bot 114 selects the skill bot 116 having the most training feature vectors 620 in the set determined at block 2210. In some embodiments, it is not necessary that training feature vectors 620 of the skill bot 116 make up the majority of the set but, rather, only that no other skill bot 116 has a greater quantity of training feature vectors 620 in the set. As described above, after selection of this skill bot 116, the master bot 114 may route the input utterance 303 to the selected skill bot 116 for processing.

Figure 23:
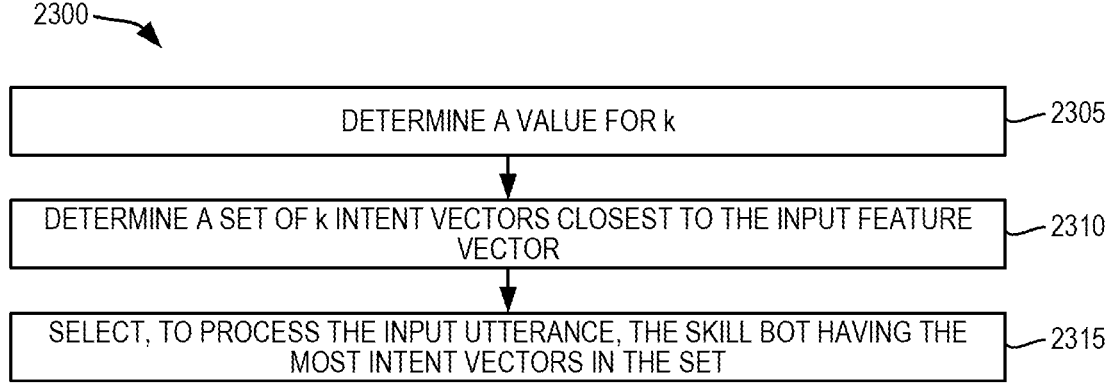
FIG. 23 is a diagram of another example of a method of selecting a skill bot to handle the input utterance, according to some embodiments described herein.

Additionally or alternatively to considering the nearest training feature vectors 620 to the input feature vector 1710, some embodiments of a master bot 114 may consider the nearest composite feature vectors, such as the nearest intent vectors. FIG. 23 is a diagram of another example method 2300 of selecting a skill bot 116 to handle an input utterance, according to some embodiments described herein. This method 2300 or similar may be used at block 2130 of the above method 2100, after determination that the input utterance 303 is related to at least one available skill bot 116. This method 2300 provides a k-nearest neighbors approach to selecting a skill bot 116, but other techniques may be used additionally or alternatively to this approach. Specifically, in contrast to the method 2200 of FIG. 22, this method 2300 utilizes the k-nearest intent vectors to the input feature vector 1710 to determine which skill bot 116 to select.

The method 2300 depicted in FIG. 23, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 2300 is intended to be illustrative and non-limiting. Although FIG. 23 depicts various activities occurring in a particular sequence or order, this is not intended to be limiting. In certain embodiments, for instance, the activities may be performed in a different order, or one or more activities of the method 2300 may be performed in parallel. In certain embodiments, the method 2300 may be performed by a master bot 114.

As shown in FIG. 23, at block 2305, the master bot 114 determines a value for k, where k is the number of neighbors that will be considered. In some embodiments, the value of k may be a factor of the total number of intent vectors. The total number of intent vectors may be equal to the total number of intents represented in the training utterances 615 and may be equal to the total number of intents that the available skill bots 116 are configured to handle, and the value of k may be selected as a factor of that quantity.

At block 2310, using the value of k determined at block 2305, the master bot 114 determines a set of k intent vectors that are the closest (i.e., the most similar) to the input feature vector 1710. The master bot 114 may use the same, or a different, similarity metric as the one used above when determining whether the input feature vector 1710 was sufficiently similar to any composite feature vectors in the above method 2100. For example, the similarity metric used may be Euclidean distance, vector multiplication, or cosine similarity.

At block 2315, the master bot 114 selects the skill bot 116 having the most intent vectors in the set determined at block 2310. In some embodiments, it is not necessary that intent vectors of the skill bot 116 make up the majority of the set but, rather, only that no other skill bot 116 has a greater quantity of intent vectors in the set. As described above, after selection of this skill bot 116, the master bot 114 may route the input utterance 303 to the selected skill bot 116 for processing.

Example Implementation

Figure 24:
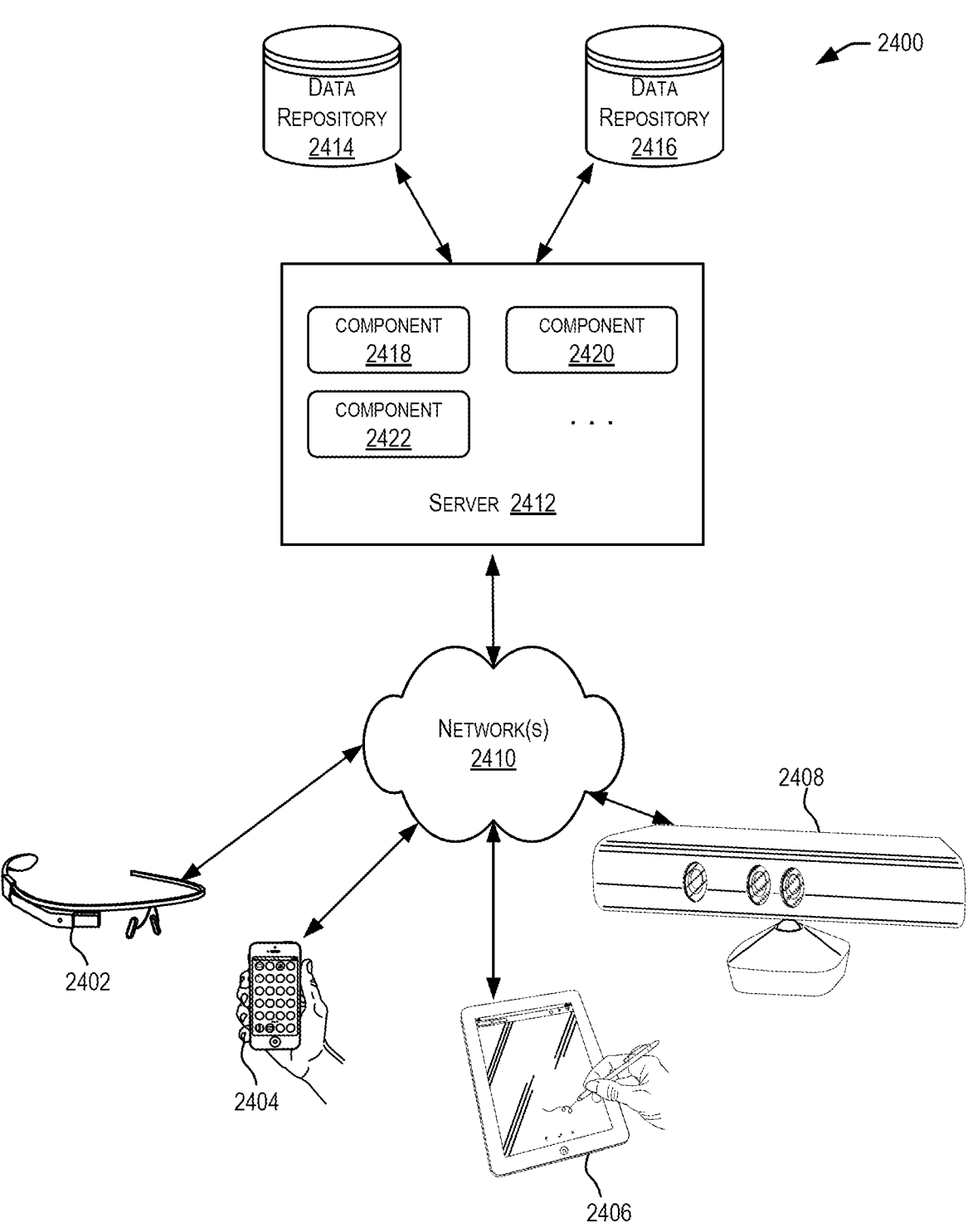
FIG. 24 is a diagram of a distributed system for implementing some embodiments described herein.

FIG. 24 depicts a simplified diagram of a distributed system 2400 for implementing an embodiment. In the illustrated embodiment, distributed system 2400 includes one or more client computing devices 2402, 2404, 2406, and 2408, coupled to a server 2412 via one or more communication networks 2410. Clients computing devices 2402, 2404, 2406, and 2408 may be configured to execute one or more applications.

In various embodiments, server 2412 may be adapted to run one or more services or software applications that enable the processing described in this disclosure.

In certain embodiments, server 2412 may also provide other services or software applications that can include non-virtual and virtual environments. In some embodiments, these services may be offered as web-based or cloud services, such as under a Software as a Service (SaaS) model to the users of client computing devices 2402, 2404, 2406, and/or 2408. Users operating client computing devices 2402, 2404, 2406, and/or 2408 may in turn utilize one or more client applications to interact with server 2412 to utilize the services provided by these components.

In the configuration depicted in FIG. 24, server 2412 may include one or more components 2418, 2420 and 2422 that implement the functions performed by server 2412. These components may include software components that may be executed by one or more processors, hardware components, or combinations thereof. It should be appreciated that various different system configurations are possible, which may be different from distributed system 2400. The embodiment shown in FIG. 24 is thus one example of a distributed system for implementing an embodiment system and is not intended to be limiting.

Users may use client computing devices 2402, 2404, 2406, and/or 2408 to interact with server 2412 in accordance with the teachings of this disclosure. A client device may provide an interface that enables a user of the client device to interact with the client device. The client device may also output information to the user via this interface. Although FIG. 24 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 2410 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 2410 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 2412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2412 can include one or more virtual machines running virtual operating systems, or other computing architectures involving virtualization such as one or more flexible pools of logical storage devices that can be virtualized to maintain virtual storage devices for the server. In various embodiments, server 2412 may be adapted to run one or more services or software applications that provide the functionality described in the foregoing disclosure.

The computing systems in server 2412 may run one or more operating systems including any of those discussed above, as well as any commercially available server operating system. Server 2412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 2412 may include one or more applications to analyze and consolidate data feeds and/or event updates received from users of client computing devices 2402, 2404, 2406, and 2408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 2412 may also include one or more applications to display the data feeds and/or real-time events via one or more display devices of client computing devices 2402, 2404, 2406, and 2408.

Distributed system 2400 may also include one or more data repositories 2414, 2416. These data repositories may be used to store data and other information in certain embodiments. For example, one or more of the data repositories 2414, 2416 may be used to store data or information generated by the processing described herein and/or data or information used for the processing described herein. Data repositories 2414, 2416 may reside in a variety of locations. For example, a data repository used by server 2412 may be local to server 2412 or may be remote from server 2412 and in communication with server 2412 via a network-based or dedicated connection. Data repositories 2414, 2416 may be of different types. In certain embodiments, a data repository used by server 2412 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 2414, 2416 may also be used by applications to store application data. The data repositories used by applications may be of different types such as, for example, a key-value store repository, an object store repository, or a general storage repository supported by a file system.

Figure 25:
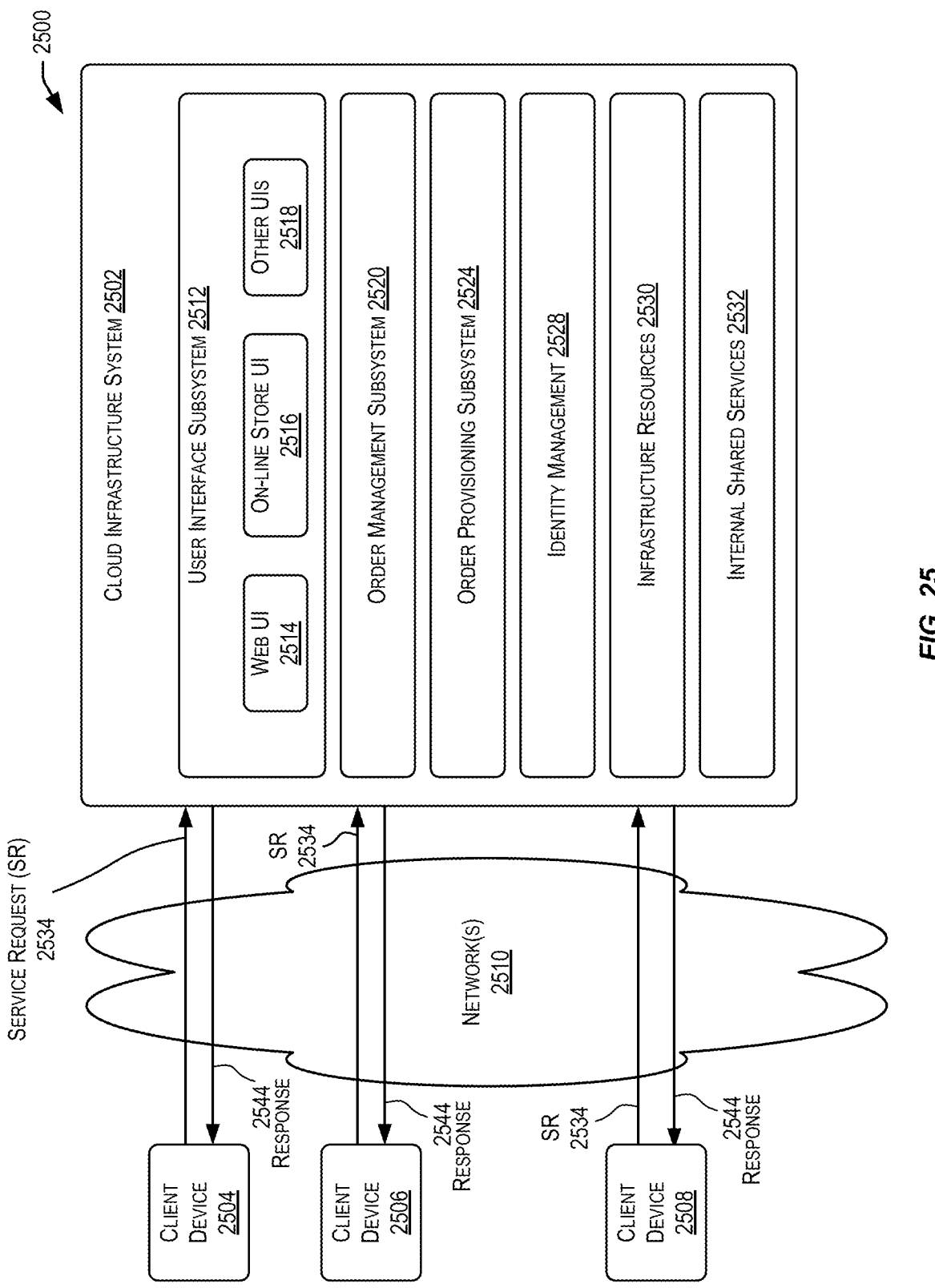
FIG. 25 is a diagram of a cloud-based system environment in which various chatbot-related services may be offered as cloud services, according to some embodiments described herein.

In certain embodiments, the functionalities described in this disclosure may be offered as services via a cloud environment. FIG. 25 is a simplified block diagram of a cloud-based system environment in which functionalities described herein may be offered as cloud services, in accordance with certain embodiments. In the embodiment depicted in FIG. 25, cloud infrastructure system 2502 may provide one or more cloud services that may be requested by users using one or more client computing devices 2504, 2506, and 2508. Cloud infrastructure system 2502 may comprise one or more computers and/or servers that may include those described above for server 2412. The computers in cloud infrastructure system 2502 may be organized as general purpose computers, specialized server computers, server farms, server clusters, or any other appropriate arrangement and/or combination.

Network(s) 2510 may facilitate communication and exchange of data between clients 2504, 2506, and 2508 and cloud infrastructure system 2502. Network(s) 2510 may include one or more networks. The networks may be of the same or different types. Network(s) 2510 may support one or more communication protocols, including wired and/or wireless protocols, for facilitating the communications.

The embodiment depicted in FIG. 25 is only one example of a cloud infrastructure system and is not intended to be limiting. It should be appreciated that, in some other embodiments, cloud infrastructure system 2502 may have more or fewer components than those depicted in FIG. 25, may combine two or more components, or may have a different configuration or arrangement of components. For example, although FIG. 25 depicts three client computing devices, any number of client computing devices may be supported in alternative embodiments.

The term cloud service is generally used to refer to a service that is made available to users on demand and via a communication network such as the Internet by systems (e.g., cloud infrastructure system 2502) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 2502 may provide one or more cloud services using different models such as under a Software as a Service (SaaS) model, a Platform as a Service (PaaS) model, an Infrastructure as a Service (IaaS) model, and others, including hybrid service models. Cloud infrastructure system 2502 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 2502. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 2502. Cloud infrastructure system 2502 then performs processing to provide the services requested in the customer's subscription order. For example, in certain embodiments, the chatbots-related functions described herein may be provided as cloud services that are subscribed to by a user/subscriber. Cloud infrastructure system 2502 may be configured to provide one or even multiple cloud services.

Cloud infrastructure system 2502 may provide the cloud services via different deployment models. In a public cloud model, cloud infrastructure system 2502 may be owned by a third party cloud services provider and the cloud services are offered to any general public customer, where the customer can be an individual or an enterprise. In certain other embodiments, under a private cloud model, cloud infrastructure system 2502 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 2502 and the services provided may be shared by several organizations in a related community. Various other models such as hybrids of the above mentioned models may also be used.

Client computing devices 2504, 2506, and 2508 may be of different types (such as devices 2402, 2404, 2406, and 2408 depicted in FIG. 24) and may be capable of operating one or more client applications. A user may use a client device to interact with cloud infrastructure system 2502, such as to request a service provided by cloud infrastructure system 2502. For example, a user may use a client device to request a chatbot-related service described in this disclosure.

In some embodiments, the processing performed by cloud infrastructure system 2502 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 25, cloud infrastructure system 2502 may include infrastructure resources 2530 that are utilized for facilitating the provision of various cloud services offered by cloud infrastructure system 2502. Infrastructure resources 2530 may include, for example, processing resources, storage or memory resources, networking resources, and the like.

In certain embodiments, to facilitate efficient provisioning of these resources for supporting the various cloud services provided by cloud infrastructure system 2502 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 2502 may itself internally use services 2532 that are shared by different components of cloud infrastructure system 2502 and that facilitate the provisioning of services by cloud infrastructure system 2502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 2502 may comprise multiple subsystems. These subsystems may be implemented in software, or hardware, or combinations thereof. As depicted in FIG. 25, the subsystems may include a user interface subsystem 2512 that enables users or customers of cloud infrastructure system 2502 to interact with cloud infrastructure system 2502. User interface subsystem 2512 may include various different interfaces such as a web interface 2514, an online store interface 2516 where cloud services provided by cloud infrastructure system 2502 are advertised and are purchasable by a consumer, and other interfaces 2518. For example, a customer may, using a client device, request (service request 2534) one or more services provided by cloud infrastructure system 2502 using one or more of interfaces 2514, 2516, and 2518. For example, a customer may access the online store, browse cloud services offered by cloud infrastructure system 2502, and place a subscription order for one or more services offered by cloud infrastructure system 2502 that the customer wishes to subscribe to. The service request may include information identifying the customer and one or more services that the customer desires to subscribe to.

In certain embodiments, such as the embodiment depicted in FIG. 25, cloud infrastructure system 2502 may comprise an order management subsystem (OMS) 2520 that is configured to process the new order. As part of this processing, OMS 2520 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 2520 may then invoke the order provisioning subsystem (OPS) 2524 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 2524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 2502 may send a response or notification 2544 to the requesting customer to indicate when the requested service is now ready for use. In some instances, information (e.g., a link) may be sent to the customer that enables the customer to start using and availing the benefits of the requested services.

Cloud infrastructure system 2502 may provide services to multiple customers. For each customer, cloud infrastructure system 2502 is responsible for managing information related to one or more subscription orders received from the customer, maintaining customer data related to the orders, and providing the requested services to the customer. Cloud infrastructure system 2502 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 2502 may provide services to multiple customers in parallel. Cloud infrastructure system 2502 may store information for these customers, including possibly proprietary information. In certain embodiments, cloud infrastructure system 2502 comprises an identity management subsystem (IMS) 2528 that is configured to manage customers information and provide the separation of the managed information such that information related to one customer is not accessible by another customer. IMS 2528 may be configured to provide various security-related services such as identity services, such as information access management, authentication and authorization services, services for managing customer identities and roles and related capabilities, and the like.

Figure 26:
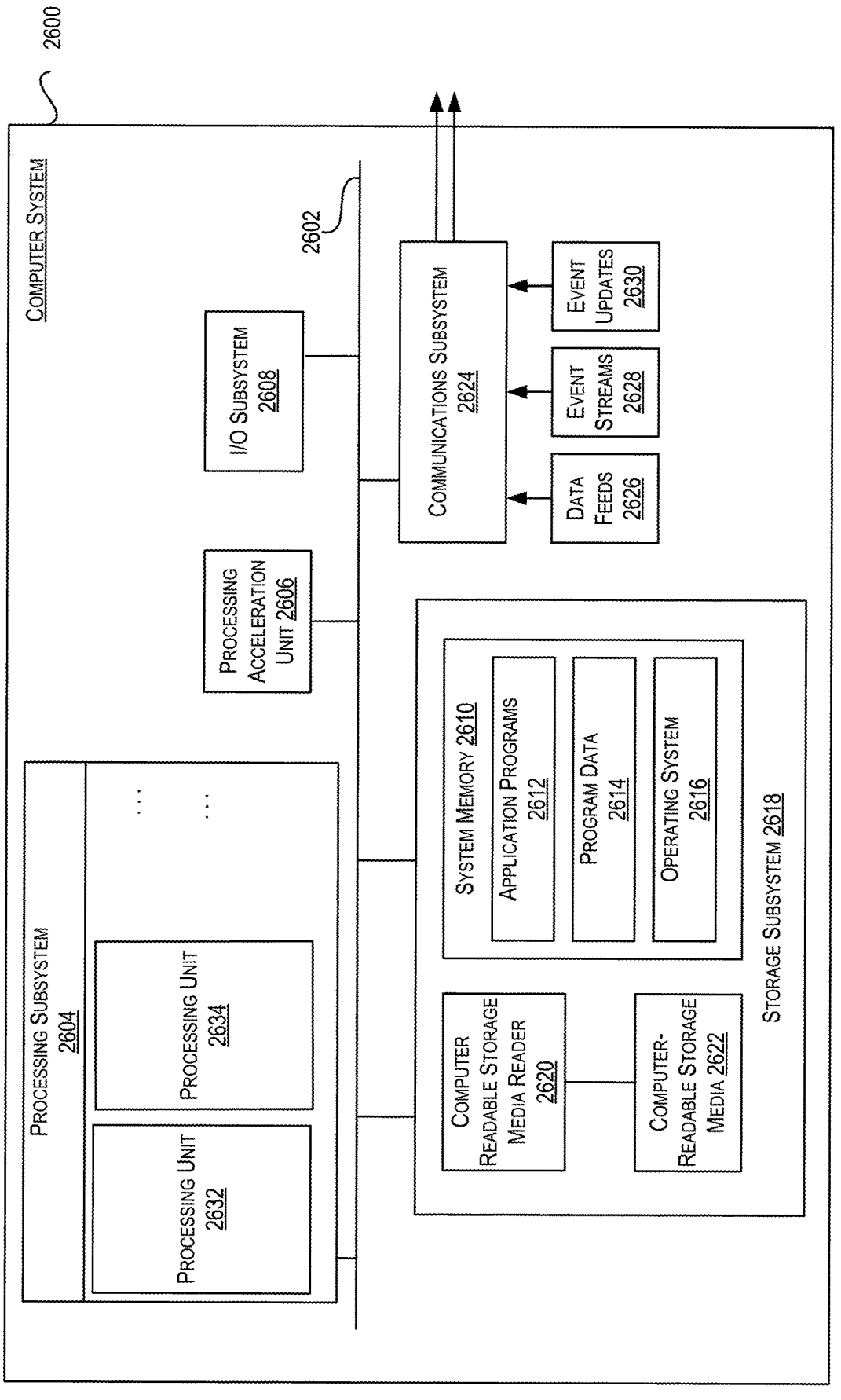
FIG. 26 is a diagram of an example of a computer system that may be used to implement some embodiments described herein.

FIG. 26 illustrates an exemplary computer system 2600 that may be used to implement certain embodiments. For example, in some embodiments, computer system 2600 may be used to implement any of the system and subsystems of a chatbot system, and various servers and computer systems described above. As shown in FIG. 26, computer system 2600 includes various subsystems including a processing subsystem 2604 that communicates with a number of other subsystems via a bus subsystem 2602. These other subsystems may include a processing acceleration unit 2606, an I/O subsystem 2608, a storage subsystem 2618, and a communications subsystem 2624. Storage subsystem 2618 may include non-transitory computer-readable storage media including storage media 2622 and a system memory 2610.

Bus subsystem 2602 provides a mechanism for letting the various components and subsystems of computer system 2600 communicate with each other as intended. Although bus subsystem 2602 is shown schematically as a single bus, alternative embodiments of the bus subsystem may utilize multiple buses. Bus subsystem 2602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2604 controls the operation of computer system 2600 and may comprise one or more processors, application specific integrated circuits (ASICs), or field programmable gate arrays (FPGAs). The processors may include be single core or multicore processors. The processing resources of computer system 2600 can be organized into one or more processing units 2632, 2634, etc. A processing unit may include one or more processors, one or more cores from the same or different processors, a combination of cores and processors, or other combinations of cores and processors. In some embodiments, processing subsystem 2604 can include one or more special purpose co-processors such as graphics processors, digital signal processors (DSPs), or the like. In some embodiments, some or all of the processing units of processing subsystem 2604 can be implemented using customized circuits, such as application specific integrated circuits (ASICs), or field programmable gate arrays (FPGAs).

In some embodiments, the processing units in processing subsystem 2604 can execute instructions stored in system memory 2610 or on computer readable storage media 2622. In various embodiments, the processing units can execute a variety of programs or code instructions and can maintain multiple concurrently executing programs or processes. At any given time, some or all of the program code to be executed can be resident in system memory 2610 and/or on computer-readable storage media 2622 including potentially on one or more storage devices. Through suitable programming, processing subsystem 2604 can provide various functionalities described above. In instances where computer system 2600 is executing one or more virtual machines, one or more processing units may be allocated to each virtual machine.

In certain embodiments, a processing acceleration unit 2606 may optionally be provided for performing customized processing or for off-loading some of the processing performed by processing subsystem 2604 so as to accelerate the overall processing performed by computer system 2600.

I/O subsystem 2608 may include devices and mechanisms for inputting information to computer system 2600 and/or for outputting information from or via computer system 2600. In general, use of the term input device is intended to include all possible types of devices and mechanisms for inputting information to computer system 2600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 2600 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2618 provides a repository or data store for storing information and data that is used by computer system 2600. Storage subsystem 2618 provides a tangible non-transitory computer-readable storage medium for storing the basic programming and data constructs that provide the functionality of some embodiments. Storage subsystem 2618 may store software (e.g., programs, code modules, instructions) that when executed by processing subsystem 2604 provides the functionality described above. The software may be executed by one or more processing units of processing subsystem 2604. Storage subsystem 2618 may also provide a repository for storing data used in accordance with the teachings of this disclosure.

Storage subsystem 2618 may include one or more non-transitory memory devices, including volatile and non-volatile memory devices. As shown in FIG. 26, storage subsystem 2618 includes a system memory 2610 and a computer-readable storage media 2622. System memory 2610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2600, such as during start-up, may typically be stored in the ROM. The RAM typically contains data and/or program modules that are presently being operated and executed by processing subsystem 2604. In some implementations, system memory 2610 may include multiple different types of memory, such as static random access memory (SRAM), dynamic random access memory (DRAM), and the like.

By way of example, and not limitation, as depicted in FIG. 26, system memory 2610 may load application programs 2612 that are being executed, which may include various applications such as Web browsers, mid-tier applications, relational database management systems (RDBMS), etc., program data 2614, and an operating system 2616. By way of example, operating system 2616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 2622 may store programming and data constructs that provide the functionality of some embodiments. Computer-readable media 2622 may provide storage of computer-readable instructions, data structures, program modules, and other data for computer system 2600. Software (programs, code modules, instructions) that, when executed by processing subsystem 2604 provides the functionality described above, may be stored in storage subsystem 2618. By way of example, computer-readable storage media 2622 may include non-volatile memory such as a hard disk drive, a magnetic disk drive, an optical disk drive such as a CD ROM, DVD, a Blu-Ray® disk, or other optical media. Computer-readable storage media 2622 may include, but is not limited to, Zip® drives, flash memory cards, universal serial bus (USB) flash drives, secure digital (SD) cards, DVD disks, digital video tape, and the like. Computer-readable storage media 2622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 2618 may also include a computer-readable storage media reader 2620 that can further be connected to computer-readable storage media 2622. Reader 2620 may receive and be configured to read data from a memory device such as a disk, a flash drive, etc.

In certain embodiments, computer system 2600 may support virtualization technologies, including but not limited to virtualization of processing and memory resources. For example, computer system 2600 may provide support for executing one or more virtual machines. In certain embodiments, computer system 2600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 2600. Accordingly, multiple operating systems may potentially be run concurrently by computer system 2600.

Communications subsystem 2624 provides an interface to other computer systems and networks. Communications subsystem 2624 serves as an interface for receiving data from and transmitting data to other systems from computer system 2600. For example, communications subsystem 2624 may enable computer system 2600 to establish a communication channel to one or more client devices via the Internet for receiving and sending information from and to the client devices.

Communication subsystem 2624 may support both wired and/or wireless communication protocols. For example, in certain embodiments, communications subsystem 2624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802. XX family standards, or other mobile communication technologies, or any combination thereof), global positioning system (GPS) receiver components, and/or other components. In some embodiments communications subsystem 2624 can provide wired network connectivity (e.g., Ethernet) in addition to or instead of a wireless interface.

Communication subsystem 2624 can receive and transmit data in various forms. For example, in some embodiments, in addition to other forms, communications subsystem 2624 may receive input communications in the form of structured and/or unstructured data feeds 2626, event streams 2628, event updates 2630, and the like. For example, communications subsystem 2624 may be configured to receive (or send) data feeds 2626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2624 may be configured to receive data in the form of continuous data streams, which may include event streams 2628 of real-time events and/or event updates 2630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2624 may also be configured to communicate data from computer system 2600 to other computer systems or networks. The data may be communicated in various different forms such as structured and/or unstructured data feeds 2626, event streams 2628, event updates 2630, and the like to one or more databases that may be in communication with one or more streaming data source computers coupled to computer system 2600.

Computer system 2600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 2600 depicted in FIG. 26 is intended only as a specific example. Many other configurations having more or fewer components than the system depicted in FIG. 26 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:
accessing an input utterance;
determining that the input utterance includes a word that is not included in a plurality of training utterances;
in response to determining that the input utterance includes a word that is not included in the plurality of training utterances, processing the input utterance to generate an input feature vector for the input utterance;
providing the input feature vector to a trained classifier model;

using the trained classifier model to determine that the input utterance is unrelated to any skill bot of a plurality of skill bots based on the input feature vector, wherein the trained classifier model determines that the input utterance is unrelated to any skill bot of the plurality of skill bots by comparing the input feature vector to each set representation of a plurality of set representations, wherein each set representation of the plurality of set representations represents a cluster of training feature vectors associated with training data used to train the trained classifier model, a composite feature vector that is an aggregate of one or more of the training feature vectors, or a combination thereof; and
in response to determining that the input utterance is unrelated to any skill bot of the plurality of skill bots, outputting an indication representing that the input utterance cannot be handled by any skill bot of the plurality of skill bots.

2. The method of claim 1, further comprising:
accessing the training data, wherein the training data comprises the training utterances;
generating training feature vectors from the training utterances, the training feature vectors comprising respective training feature vectors associated with each skill bot of the plurality of skill bots;
generating the plurality of set representations; and
training a classifier model to result in the trained classifier model based on the plurality of set representations.

3. The method of claim 2, wherein:
generating the plurality of set representations comprises generating clusters to which the training feature vectors are assigned.

4. The method of claim 3, further comprising:
accessing a second input utterance as a second user input;
generating a second input feature vector from the second input utterance;
determining that the second input feature vector falls inside a boundary of a respective cluster of training feature vectors of the plurality of clusters of training feature vectors; and
in response to determining that the second input feature vectors falls inside the boundary of the respective cluster of training feature vectors, forwarding the second input utterance to a skill bot associated with the respective cluster of training feature vectors for processing.

5. The method of claim 2, wherein generating the plurality of set representations:
dividing the training utterances into conversation categories; and
generating a plurality of composite feature vectors, wherein the plurality of composite feature vectors correspond to the conversation categories, wherein generating the plurality of composite feature vectors comprises, for each conversation category of the conversation categories, generating a respective composite feature vector of the plurality of composite feature vectors as an aggregate of respective training feature vectors of the training feature vectors.

6. The method of claim 5, further comprising:
accessing a second input utterance as a second user input;
generating a second input feature vector from the second input utterance;
determining that the second input feature vector is sufficiently similar to a respective composite feature vector of the plurality of composite feature vectors; and in response to determining that the second input feature vector is sufficiently similar to the composite feature vector, forwarding the second input utterance to a skill bot associated with the respective composite feature vector for processing.

7. The method of claim 1, further comprising:

processing the input utterance to perform an action responsive to the input utterance.

8. A system comprising:

one or more processors; and one or more computer readable storage media storing instructions that, when executed by the one or more processors, cause the system to perform operations comprising:

accessing an input utterance;

determining that the input utterance includes a word that is not included in a plurality of training utterances;

in response to determining that the input utterance includes a word that is not included in the plurality of training utterances, processing the input utterance to generate an input feature vector for the input utterance;

providing the input feature vector to a trained classifier model;

using the trained classifier model to determine that the input utterance is unrelated to any skill bot of a plurality of skill bots based on the input feature vector, wherein the trained classifier model determines that the input utterance is unrelated to any skill bot of the plurality of skill bots by comparing the input feature vector to each set representation of a plurality of set representations, wherein each set representation of the plurality of set representations represents a cluster of training feature vectors associated with training data used to train the trained classifier model, a composite feature vector that is an aggregate of one or more of the training feature vectors, or a combination thereof; and in response to determining that the input utterance is unrelated to any skill bot of the plurality of skill bots, outputting an indication representing that the input utterance cannot be handled by any skill bot of the plurality of skill bots.

9. The system of claim 8, wherein the operations further comprise:

accessing the training data, wherein the training data comprises the training utterances;

generating training feature vectors from the training utterances, the training feature vectors comprising respective training feature vectors associated with each skill bot of the plurality of skill bots;

generating the plurality of set representations; and training a classifier model to result in the trained classifier model based on the plurality of set representations.

10. The system of claim 9, wherein:

generating the plurality of set representations comprises generating clusters to which the training feature vectors are assigned.

11. The system of claim 10, wherein the operations further comprise:

accessing a second input utterance as a second user input;

generating a second input feature vector from the second input utterance;

determining that the second input feature vector falls inside a boundary of a respective cluster of training feature vectors of the plurality of clusters of training feature vectors; and in response to determining that the second input feature vectors falls inside the boundary of the respective cluster of training feature vectors, forwarding the second input utterance to a skill bot associated with the respective cluster of training feature vectors for processing.

12. The system of claim 9, wherein generating the plurality of set representations comprises:

dividing the training utterances into conversation categories; and generating a plurality of composite feature vectors, wherein the plurality of composite feature vectors correspond to the conversation categories, wherein generating the plurality of composite feature vectors comprises, for each conversation category of the conversation categories, generating a respective composite feature vector of the plurality of composite feature vectors as an aggregate of respective training feature vectors of the training feature vectors.

13. The system of claim 12, wherein the operations further comprise:

accessing a second input utterance as a second user input;

generating a second input feature vector from the second input utterance;

determining that the second input feature vector is sufficiently similar to a respective composite feature vector of the plurality of composite feature vectors; and in response to determining that the second input feature vector is sufficiently similar to the composite feature vector, forwarding the second input utterance to a skill bot associated with the respective composite feature vector for processing.

14. The system of claim 8, further comprising the skill bot, wherein the skill bot is configured to process the input utterance to perform an action responsive to the input utterance.

15. One or more non-transitory computer-readable media storing computer-readable instructions that, when executed by a processing system, cause a system to perform operations comprising:

accessing an input utterance;

determining that the input utterance includes a word that is not included in a plurality of training utterances;

in response to determining that the input utterance includes a word that is not included in the plurality of training utterances, processing the input utterance to generate an input feature vector for the input utterance;

providing the input feature vector to a trained classifier model;

using the trained classifier model to determine that the input utterance is unrelated to any skill bot of a plurality of skill bots based on the input feature vector, wherein the trained classifier model determines that the input utterance is unrelated to any skill bot of the plurality of skill bots by comparing the input feature vector to each set representation of a plurality of set representations, wherein each set representation of the plurality of set representations represents a cluster of training feature vectors associated with training data used to train the trained classifier model, a composite feature vector that is an aggregate of one or more of the training feature vectors, or a combination thereof; and in response to determining that the input utterance is unrelated to any skill bot of the plurality of skill bots, outputting an indication representing that the input utterance cannot be handled by any skill bot of the plurality of skill bots.

16. The one or more non-transitory computer-readable media of claim 15, wherein the operations further comprise:

accessing the training data, wherein the training data comprises the training utterances;

generating training feature vectors from the training utterances, the training feature vectors comprising respective training feature vectors associated with each skill bot of the plurality of skill bots;

generating the plurality of set representations; and training a classifier model to result in the trained classifier model based on the plurality of set representations.

17. The one or more non-transitory computer-readable media of claim 16, wherein:

generating the plurality of set representations comprises generating clusters to which the training feature vectors are assigned.

18. The one or more non-transitory computer-readable media of claim 17, wherein the operations further comprise:

accessing a second input utterance as a second user input;

generating a second input feature vector from the second input utterance;

determining that the second input feature vector falls inside a boundary of a respective cluster of training feature vectors of the plurality of clusters of training feature vectors; and in response to determining that the second input feature vectors falls inside the boundary of the respective cluster of training feature vectors, forwarding the second input utterance to a skill bot associated with the respective cluster of training feature vectors for processing.

19. The one or more non-transitory computer-readable media of claim 16, wherein generating the plurality of set representations comprises:

dividing the training utterances into conversation categories; and generating a plurality of composite feature vectors, wherein the plurality of composite feature vectors correspond to the conversation categories, wherein generating the plurality of composite feature vectors comprises, for each conversation category of the conversation categories, generating a respective composite feature vector of the plurality of composite feature vectors as an aggregate of respective training feature vectors of the training feature vectors.

20. The one or more non-transitory computer-readable media of claim 19, wherein the operations further comprise:

accessing a second input utterance as a second user input;

generating a second input feature vector from the second input utterance;

determining that the second input feature vector is sufficiently similar to a respective composite feature vector of the plurality of composite feature vectors; and in response to determining that the second input feature vector is sufficiently similar to the composite feature vector, forwarding the second input utterance to a skill bot associated with the respective composite feature vector for processing.

* * * * *